United States Patent
Kim

(10) Patent No.: US 10,547,733 B2
(45) Date of Patent: Jan. 28, 2020

(54) SYSTEM, A COMPUTER READABLE MEDIUM, AND A METHOD FOR PROVIDING AN INTEGRATED MANAGEMENT OF MESSAGE INFORMATION

(71) Applicant: NHN Entertainment Corporation, Seongnam-si (KR)

(72) Inventor: Dong Wook Kim, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 0 days.

(21) Appl. No.: 15/902,945

(22) Filed: Feb. 22, 2018

(65) Prior Publication Data

US 2018/0248998 A1 Aug. 30, 2018

(30) Foreign Application Priority Data

Feb. 28, 2017 (KR) .......... 10-2017-0026030

(51) Int. Cl.
  *H04M 1/725* (2006.01)
  *G06F 3/0482* (2013.01)
  *G06F 17/24* (2006.01)

(52) U.S. Cl.
  CPC ....... *H04M 1/72547* (2013.01); *G06F 3/0482* (2013.01); *G06F 17/24* (2013.01); *H04M 2203/2072* (2013.01); *H04M 2250/60* (2013.01)

(58) Field of Classification Search
  CPC .. G06F 3/04842; G06F 16/7834; H04W 4/14; H04W 4/18; H04W 4/12; H04W 4/16
  See application file for complete search history.

(56) References Cited

U.S. PATENT DOCUMENTS

2016/0065731 A1* 3/2016 Kurstak ............ H04M 1/72519
455/414.1

FOREIGN PATENT DOCUMENTS

KR 10-2007-0065976 6/2007
KR 10-2013-0112296 10/2013
(Continued)

OTHER PUBLICATIONS

Product Guide for Microsoft Outlook 2010, published on Dec. 31, 2010.
(Continued)

*Primary Examiner* — Kwasi Karikari
(74) *Attorney, Agent, or Firm* — H.C. Park & Associates, PLC

(57) ABSTRACT

A mobile device including a voice call management part configured to manage a voice call, a text message management part configured to manage text messages exchanged through a mobile telephone switching network, a display part, an integrated message management unit, and an additional function process part configured to process at least one additional function in association with the integrated message management unit, in which the integrated message management unit includes a message monitoring unit configured to monitor voice call information and text message information in association with the voice call management part and the text message management part, a message information managing unit configured to generate integrated message information, which is to be provided to a user, based on the voice call information and the text message information, and an interface managing unit configured to generate an integrated message management user interface displaying the integrated message information.

17 Claims, 51 Drawing Sheets

(56) References Cited

FOREIGN PATENT DOCUMENTS

KR  10-2014-0032679  3/2014
KR  10-2014-0096896  8/2014

OTHER PUBLICATIONS

PCPINSIDE—Essential app 'Smart delivery', published on Jun. 14, 2016.

* cited by examiner

SYSTEM, A COMPUTER READABLE MEDIUM, AND A METHOD FOR PROVIDING AN INTEGRATED MANAGEMENT OF MESSAGE INFORMATION

CROSS REFERENCE TO RELATED APPLICATIONS

This application claims priority from and the benefit of Korean Patent Application No. 10-2017-0026030, filed on Feb. 28, 2017, which is hereby incorporated by reference for all purposes as if fully set forth herein.

BACKGROUND

Field

Exemplary embodiments of the invention relate generally to an apparatus and method for managing information on voice calls and text messages exchanged through a mobile telephone switching network, and more specifically, to an apparatus and a method for providing an integrated message management service that manages information on a voice call and a text message.

Discussion of the Background

The mobile telephone system supports voice call and text message exchange between mobile terminals. Recently, smartphones can send and receive voice calls and text messages through the mobile phone switching network. A smartphone generally has a voice call management application for controlling the voice call function and managing voice call information, such as the time of receiving and sending a voice call, the counterpart of the voice call, total call duration, etc. The user can execute the voice call management application to inquire the voice call history and the detailed information of the voice call, and delete the inquired voice call information. On the other hand, a smartphone generally also has a text message management application that controls a text message function and stores information, for example, the time for receiving and sending a text message, the counterpart of the text message, contents of the text message, etc. The user can execute the text message management application to inquire the text message history and the detailed information of the text message, and delete the inquired text message information.

However, since the voice call application and the text message application in a conventional smartphone are executed independently, the voice call information and the text message information cannot be managed at once. In addition, the conventional voice call application and the text message application do not provide any additional functions other than its functions of receiving/transmitting a voice call/text message and managing voice call/text message information. Therefore, even when other additional functions in association with voice calls and text messages sent and received by the user were desired, it may be difficult to immediately execute the additional functions.

The above information disclosed in this Background section is only for understanding of the background of the inventive concepts, and, therefore, it may contain information that does not constitute prior art.

SUMMARY

Exemplary embodiments of the present invention provide a method and a mobile device for providing a user interface for managing voice call information and text message information.

Additional features of the inventive concepts will be set forth in the description which follows, and in part will be apparent from the description, or may be learned by practice of the inventive concepts.

An exemplary embodiment provides a mobile device including a voice call management part configured to manage a voice call, a text message management part configured to manage text messages exchanged through a mobile telephone switching network, a display part, an integrated message management unit, and an additional function process part configured to process at least one additional function in association with the integrated message management unit. The integrated message management unit includes a message monitoring unit configured to monitor voice call information and text message information in association with the voice call management part and the text message management part, a message information managing unit configured to generate integrated message information, which is to be provided to a user, based on the voice call information and the text message information, and an interface managing unit configured to generate an integrated message management user interface displaying the integrated message information.

An exemplary embodiment provides a non-transitory computer-readable storage medium including computer-executable instructions executed by a mobile device to perform a method of providing a user interface for integrated management of voice call information and text message information, the instructions control a processor of the mobile device to perform steps including: accessing a voice call management unit and a text message management unit to retrieve the voice call information and the text message information; editing the retrieved voice call information and the text message information according to a predetermined message block format to generate integrated message information; generating message blocks including the integrated message information; and arranging the message blocks according to the receiving and transmitting time included in the voice call information and the text message information to display the message blocks on a first message management user interface.

The foregoing general description and the following detailed description are exemplary and explanatory and are intended to provide further explanation of the claimed subject matter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
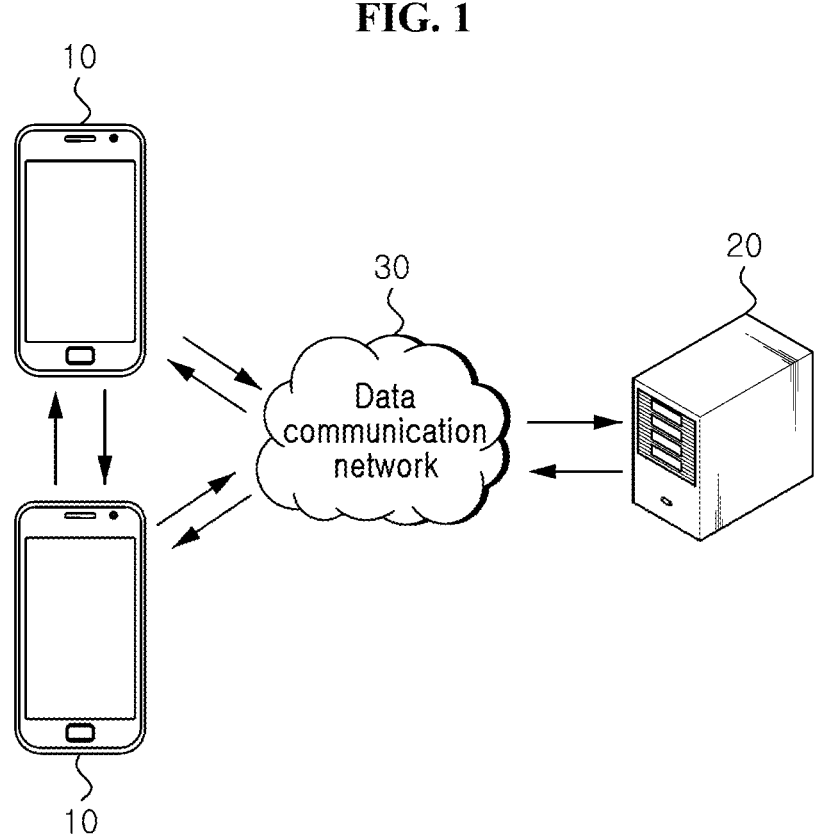
FIG. 1 is a block diagram illustrating a configuration of an integrated message management service system according to an exemplary embodiment of the present invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalties between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In exemplary embodiments, one or more components thereof may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, one or more components thereof may include or otherwise be associated with one or more memories (not shown) including code (e.g., instructions) configured to cause information management, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram illustrating a configuration of an integrated message management service system according to an exemplary embodiment of the present invention.

The integrated management service system according to an exemplary embodiment may include a plurality of mobile terminals 10, an integrated message management service server 20, and data communication network 30. The mobile terminals 10 and the integrated message management service server 20 may be in communication with each other to transmit signals or data for providing an integrated message information management service via the data communication network 30. The mobile terminal 10 may be a telecommunication device that may transmit and receive a voice call and a text message via a communication network, and exchange data via wireless communication network. The mobile terminal 10 may include a display device configured to display various graphical user interfaces.

An integrated message management service system according to an exemplary embodiment of the present invention may have various system configurations. Hereinafter, an integrated message information management system and an integrated message information management service provided by the system will be described with reference to exemplary embodiments of the present invention.

First System Configuration

Figure 2:
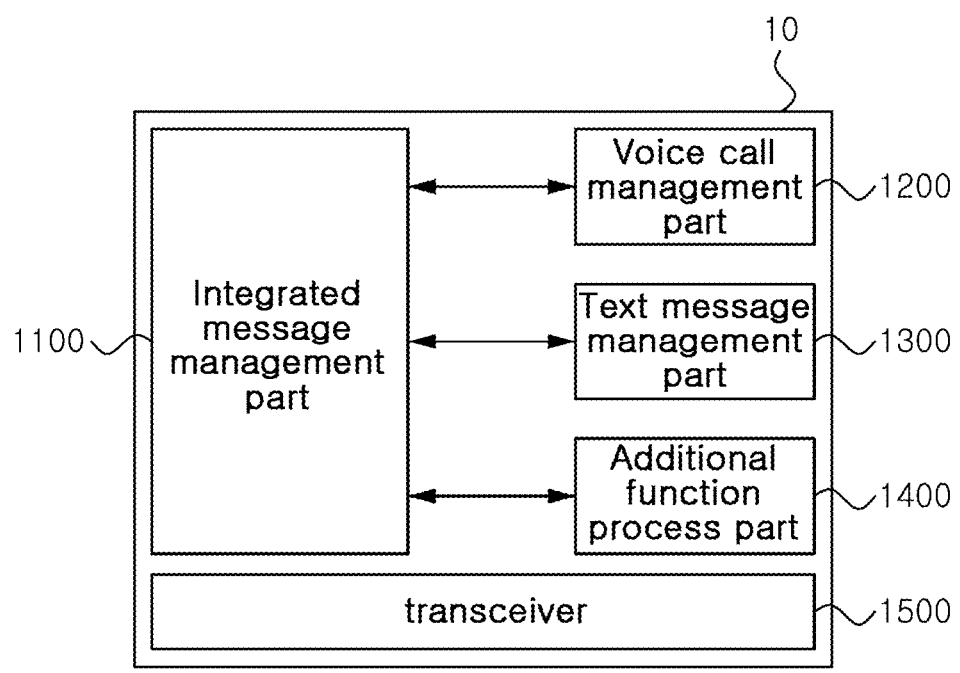
FIG. 2 is a block diagram illustrating a configuration of a mobile terminal according to an exemplary embodiment of the present invention.

FIG. 2 is a block diagram illustrating a configuration of a mobile terminal according to an exemplary embodiment of the present invention.

The mobile terminal 10 according to an exemplary embodiment of the present invention includes an integrated message management part 1100, a voice call management part 1200, a text message management part 1300, an additional function process part 1400, and a transceiver 1500.

The voice call management part 1200 may be a software, hardware, or a combination of hardware and software, each of which is configured to process a voice call exchanged through the mobile-phone switching network, and to manage information on the voice call (hereinafter, referred to as "voice call information"). The voice call information may include, for example, a receiving and transmitting time of a voice call, a counterpart of a voice call, a total call time, success or failure of the voice call connection, and the like. The voice call management part 1200 collects the voice call information on all of the voice calls received or transmitted by the mobile terminal 10 and stores the voice call information. The management of the voice call information may be performed in conjunction with the address book management application installed in the mobile terminal 10. For example, if caller identification (CID) is included in the incoming voice call, the received CID is compared with the phone numbers stored in the address book. If the same number is stored in the address book, the voice call information management part 1200 retrieves the contact name of the CID and records it in the voice call information. Otherwise, the phone number (CID) is recorded in the voice call information.

The text message management part 1300 may be a software, hardware, or a combination of hardware and software, which is configured to transmit/receive a text message exchanged through a mobile telephone switching network, such as a Short Message Service (SMS) and a Multimedia Messaging Service (MMS), and to manage information about a text message (hereinafter, "text message information"). The text message information managed by the text message management part 1300 may include, for example, a receiving and transmitting time, a receiver/sender (phone number), content of the text message, and the like. In addition, management of the text message information may be performed in cooperation with an address book application installed in the mobile terminal 10. For example, if there is caller identification (CID) included in the received text message, the received CID is compared with the phone numbers stored in the address book. If the same number is stored in the address book, the text message information management part 1300 retrieves a contact name having the CID and records the contact name in the text message information. Otherwise, the phone number (CID) is recorded in the text message information.

The transceiver 1500 performs a function of receiving and transmitting a voice call and a text message through the mobile telephone switching network. The transceiver 1500 also functions to receive and transmit signals related to packet data communication, other than voice communication and text messages, through a wireless data communication network.

The additional function process part 1400 may be hardware, software, or a combination of hardware and software configured to provide various additional functions. For example, the additional function process part 1400 may be a combination of a software including instructions necessary for performing the additional functions, and a processor performing processes according to the instructions. At this time, the software, as a part of the additional function process part 1400, may be installed in the mobile terminal 10 in a form of an application. The additional function process part 1400 may be configured to perform one or more functions. Hereinafter, the operation of the additional function process part 1400 will be described for each function.

The mobile terminal 10 according to an exemplary embodiment of the present invention may include a schedule information management application, as an exemplary part of the additional function process part 1400. The schedule information management application is configured to manage schedule information of the user. The schedule information management application provides a schedule management user interface through which a user creates, modifies, and deletes his or her schedule. The schedule information input through the schedule management user interface may include, for example, a scheduled date and time, a place, a scheduled entry, and the like. The schedule information is stored in a memory device 1600 (see FIG. 3).

The schedule information management application may be configured to provide an alarm function for informing a user of an upcoming schedule based on the schedule information. For example, if a user activates the alarm function through the schedule management user interface to select an alarming time, the selected alarming time is stored in association with the schedule information, and then the schedule is notified to the user at the stored alarming time via the mobile terminal 10. More specifically, for example, a user may create a schedule information indicating that a specific task is scheduled at a specific place at 3 PM on May 5, 2017 through the scheduling user interface, and activate the alarm function to notify the schedule 4 hours before the scheduled time. In this case, the schedule information management application calculates the alarming time to 11:00 AM on May 5, 2017 based on the user input, and stores the alarming time in association with the schedule information. Thereafter, the mobile terminal 10 monitors the time with a clock built in the mobile terminal 10, and reminds the user of the stored schedule information user through a stimulus recognizable by the user at the predetermined notification time. In this case, stimulus used for the alarm may include vibration, a sound, blinking of the screen, etc. When the user touches the screen of the mobile terminal 10 in response to the stimulus, all or a part of the schedule information stored in association with the alarm is provided through the screen.

The mobile terminal 10 according to an exemplary embodiment of the present invention may include a memo application as an example of the additional function process part 1400. The memo application provides a memo user interface for creating, modifying, deleting, and viewing a memo, and stores the created memo in the memory 1600 of the mobile terminal 10.

The mobile terminal 10 according to an exemplary embodiment of the present invention may include a social network service (SNS) application as an example of the additional function processor 1400. An SNS application is used to share a variety of content over a data network for social relationships among multiple users.

The above-mentioned additional functions may be provided by an additional function processing unit 1400 embedded in the integrated message information management part 1100.

The integrated message management part 1100 manages voice call information and text message information in association with the voice call management part 1200 and the text message management part 1300, and provides an additional function in association with the additional function process part 1400 (e.g., a schedule information management application, a memo managing unit, and an SNS application).

Figure 3:
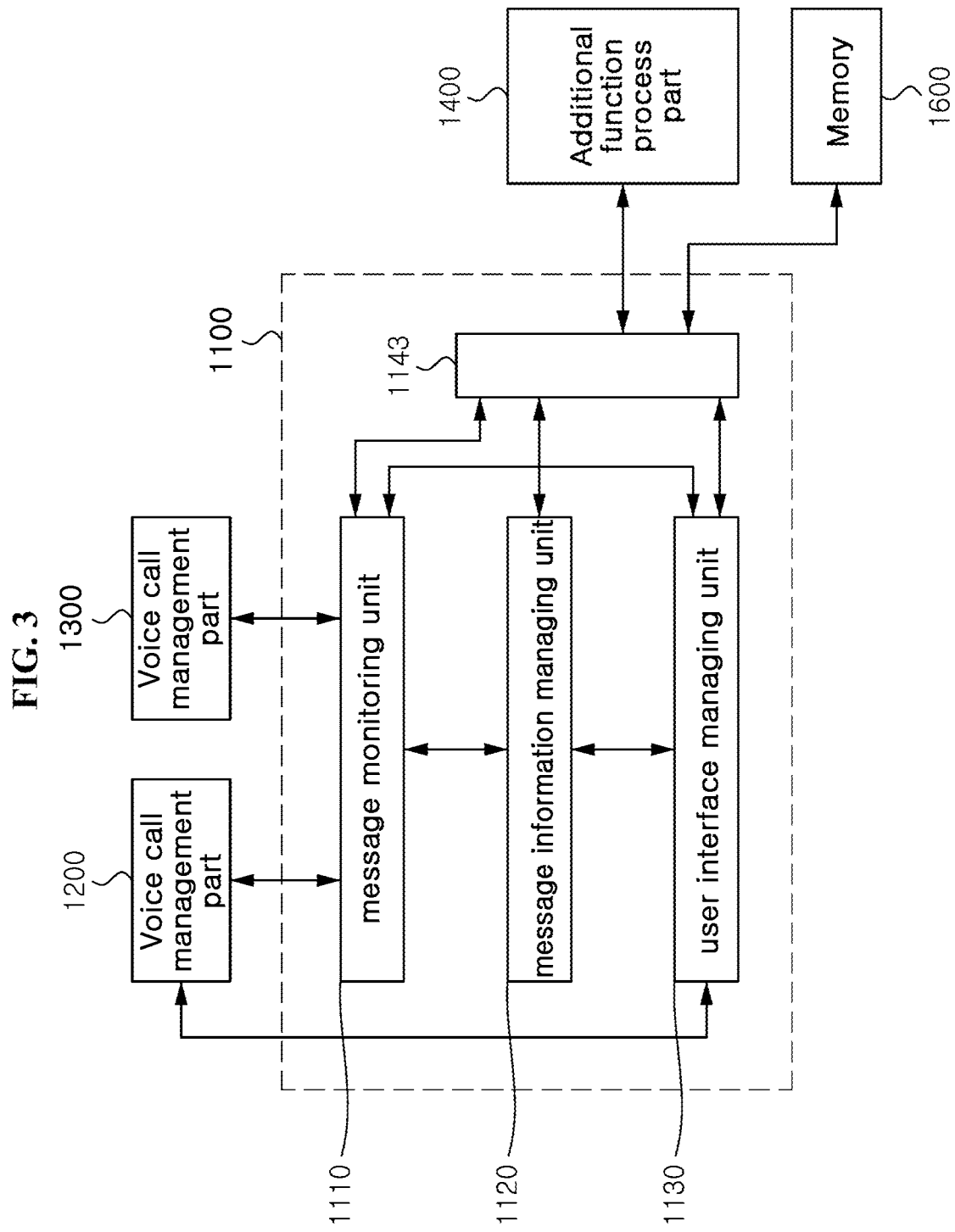
FIG. 3 is a detailed block diagram illustrating a mobile terminal according to an exemplary embodiment of the present invention.

FIG. 3 is a detailed block diagram illustrating a mobile terminal according to an exemplary embodiment of the present invention.

Referring to FIG. 3, the integrated message information management part 1100 includes a message monitoring unit 1110, a message information managing unit 1120, and a user interface managing unit 1130.

The message monitoring unit 1110 monitors, in association with the voice call management part 1200 and the text message management part 1300, updates of information on voice calls and/or text messages received or transmitted by the mobile terminal 10.

When the mobile terminal 10 receives a voice call, the voice call management part 1200 stores information on the incoming voice call, such as counterpart (phone number or contact name) and a receiving time of the incoming voice call, in the memory 1600 of the mobile terminal 10. In addition, when the user of the mobile terminal 10 has actually answered the incoming voice call, the total conversation time and/or the call termination time may be recorded in the memory 1600. On the other hand, if the user of the mobile terminal 10 does not respond to the incoming voice call, that is, if a voice call connection fails, the voice call connection failure may be recorded in the memory 1600. As such, the voice call management part 1200 stores the information on the incoming voice call in the memory 1600 every time a voice call is received.

The message monitoring unit 1110 accesses the memory 1600 to look up voice call information stored therein. The message monitoring unit 1110 monitors whether the incoming voice call information is updated in various manners. For example, the message monitoring unit 1110 may be configured to periodically access the memory 1600 to monitor whether new incoming voice call information is updated. Alternatively, the message monitoring unit 1110 may be configured to monitor updates of incoming voice call information in real-time. Still alternatively, the message monitoring unit 1110 may be configured to access to the memory 1600 to monitor an update of incoming voice call information only upon activation of the integrated message management part 1100.

The above-described monitoring update of incoming voice call information performed by the message monitoring unit 1110 may also be performed for outgoing voice call. In particular, the message monitoring unit 1110 monitors updates of information on outgoing voice calls originating from the user through the mobile terminal 10 in substantially the same manner as described above for the incoming voice call information.

Monitoring of updates of information on text messages, performed by the monitoring unit 1110, is described in detail below.

When a text message is received by the user's mobile terminal 10, the text message management part 1300 stores information on incoming text message in the memory 1600 of the mobile terminal 10. The incoming text message information may include, for example, a sender, a receiving time, content of the message, and the like. The message monitoring unit 1110 may access the memory 1600 to monitor an update of incoming text message information. The message monitoring unit 1110 can monitor whether the received text message information is updated in various manners. For example, the message monitoring unit 1110 may be configured to periodically access the memory 1600 to monitor whether new incoming text message information is updated. Alternatively, the message monitoring unit 1110 may be configured to detect an update of incoming text message information in real-time. Still alternatively, the message monitoring unit 1110 may be configured to access the memory 1600 to monitor an update of incoming text message information only upon activation of the integrated message information management part 1100.

The above-described monitoring update of incoming text message information performed by the message monitoring unit 1110 may also be performed for outgoing text message. In particular, the message monitoring unit 1110 monitors updates of information on outgoing text messages transmitted from the user through the mobile terminal 10 in substantially the same manner as described above for the incoming text message information.

The message information managing unit 1120 is configured to retrieve the updated voice call information and updated text message information detected by the message monitoring unit 1110, and to generate integrated message information which will be provided for the user through an integrated message management user interface 1100. For example, when the message monitoring unit 1110 detects a new incoming voice call, the message information managing unit 1120 retrieves the incoming voice call information, and generates integrated message information based on the retrieved incoming voice call information. The generated integrated message information may be stored in the memory 1600.

The above described operation of the integrated message information managing unit 1120 may be performed in synchronization with the message monitoring operation of the message monitoring unit 1110.

For example, when the message monitoring unit 1110 is configured to periodically monitor updates of voice call information and the text message information, the message information managing unit 1120 may be configured to retrieve the voice call information and text message information with the same time period, and generate integrated message information based on the retrieved information. In this case, if there is no updated voice call information and text message information within the monitoring period, no integrated message information may be generated. Alternatively, when the message monitoring unit 1110 is configured to monitor updates of voice call information and the text message information in real-time, the message information managing unit 1120 may retrieve information on the updated voice call and the text message, and generate the integrated message information in real-time. Still alternatively, if the integrated message information monitoring unit 1100 is configured to operate only at the activation of the integrated message information management application, the message information managing unit 1120 may also be configured to operate in synchronization with the activation of the integrated message information management application.

On the other hand, the message information managing unit 1120 may be configured to operate asynchronously with the operation of the message monitoring unit 1110. More particularly, regardless of configuration of message monitoring operation, the message information managing unit 1110 may be configured to retrieve the update of the voice call information and the text message information at a different time period than the monitoring period, or may be configured to operate only when integrated message information management application is activated.

In accordance with one exemplary embodiment of the invention, the integrated message management part 1100 may provide an alarm function to inform that the voice calls and text messages are received. Such an alarm function can be performed by the message monitoring unit 1110. In particular, the message monitoring unit 1110 may perform the alarm function when it detects a new voice call or text message received by the voice management part 1200 and/or the text message management part 1300. The stimulus used for the alarm may include vibration, a sound, blinking of the screen, etc. In addition, a graphic indicating that a new message is received may be displayed on a status bar. When the user touches the screen of the mobile terminal 10 in response to the stimulus, all or a part of the voice call information and/or the text message information may be provided through a screen.

The integrated message information generated by the message information managing unit 1120 may have a format suitable for an integrated message management user interface provided by the interface managing unit 1130. More specifically, the message information managing unit 1120 may edit the voice call information and the text message information to generate integrated message information suitable for an integrated message management user interface created by the interface managing unit 1130. This will be described in more detail in connection with the operation of the interface managing unit 1130.

The interface managing unit 1130 generates and displays an integrated message management user interface, receives various user inputs through the integrated message management user interface, and performs processes corresponding to the user input. For example, the interface managing unit 1130, in response to a user input, generates a first message management user interface and displays it on a screen of the mobile terminal 10. In addition, the interface managing unit 1130, in response to a user input, may generate a second message management user interface and displays it on a screen of the mobile terminal 10. In addition, the interface managing unit 1130 may access the additional function process part 1400 to process an additional function in association with the first and second message management user interfaces, and display the processed results on the first and second message management user interface.

The integrated message management part 1100 may be hardware, software, or a combination of hardware and software configured to perform the above-described processes. For example, the integrated message management part 1100 may be a combination of a software including instructions necessary to perform the above-described message monitoring/message managing user interface managing functions, and a processor performing processes corresponding to the instructions. In this case, the software which is a part of the integrated message information management part 1100 may be installed in the mobile terminal 10 in the form of an application. The message monitoring unit 1110, the message managing unit 1120, and the interface managing unit 1130 may be independent software and hardware, respectively. On the other hand, each function of the integrated message management part 1100 may be performed in a form of distributed process.

The operation of the integrated message information management part 1100 according an exemplary embodiment of the present invention will be described in more detail.

First, the process of generating the first message management user interface by the interface managing unit 1130 will be described in detail with reference to FIG. 4 to FIG. 10.

Figure 4:
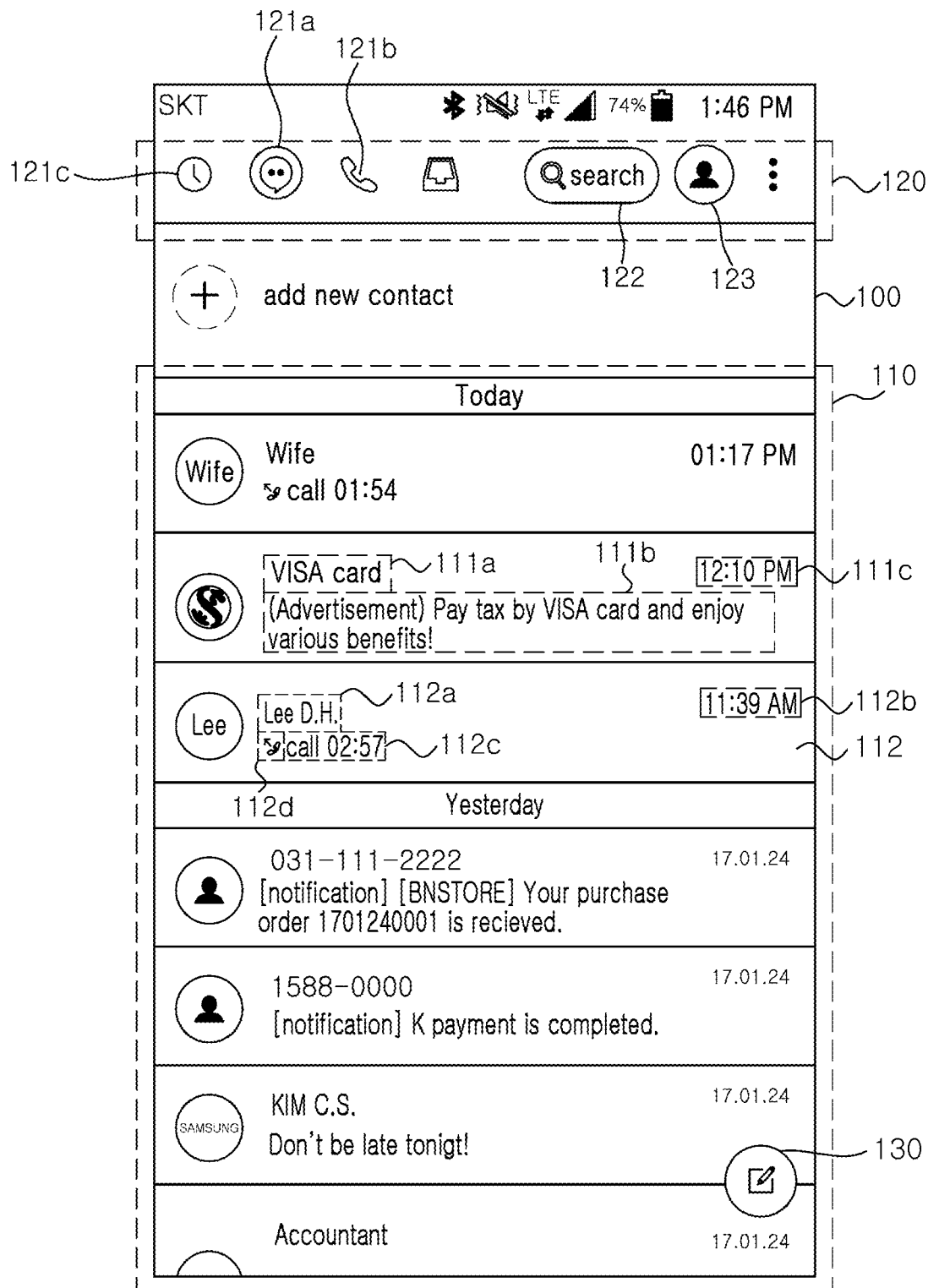
FIG. 4 is a screenshot illustrating an example of a first message management user interface displayed on a mobile terminal.
Figure 5:
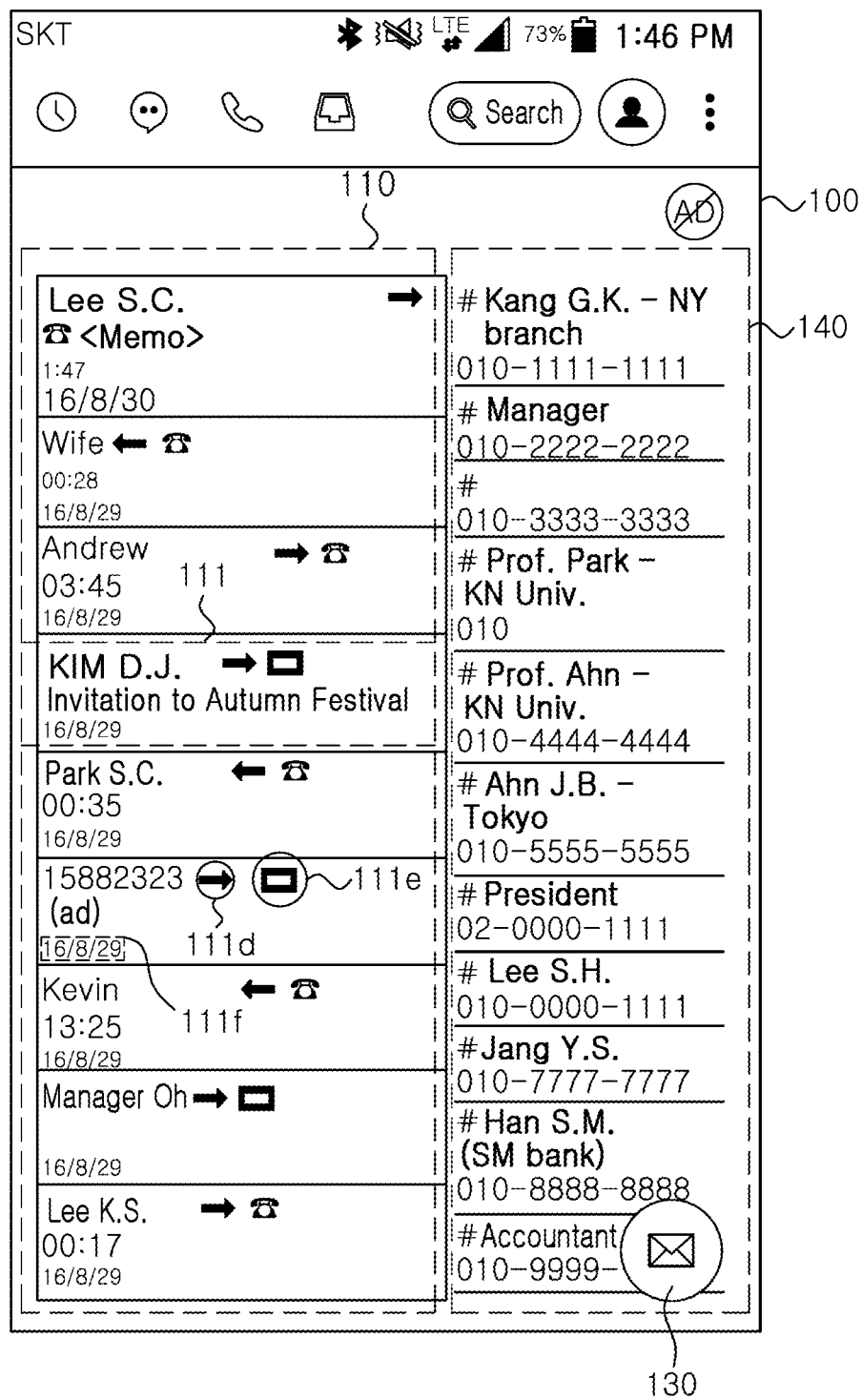
FIG. 5 is a screenshot showing another example of the first message management user interface.

FIG. 4 is a screenshot illustrating an example of a first message management user interface displayed on a mobile terminal, and FIG. 5 is a screenshot illustrating another example of the first message management user interface.

Referring to FIG. 4, a first message management user interface 100 according to an exemplary embodiment includes a message information display area 110 and a menu bar 120. The message information display area 110 includes a plurality of message blocks 111 and 112. Each of the message blocks 111 and 112 includes integrated message information corresponding to a voice call or a text message. The integrated message information is information generated from voice call information or text message information stored in the memory 1600, and may include all or part of the entries included in the voice call information and the text message information.

For example, the message block 111 and 112 display recipient or sender information. The recipient or sender information may be provided with reference to the address book. In addition, the message blocks 111 and 112 may include an incoming/outgoing indicator indicating whether a message was received or sent. For example, whether a voice call and a text message are received or transmitted may be indicated by direction of an arrow. The integrated message information may also include a message type indicator indicating whether the message is a voice call or a text message. Referring to FIG. 4, a message block 111 for a text message includes a counterpart 111a of the text message, a content 111b of a text message, a receiving/sending time 111c. On the other hand, in the message block 112 for a voice call includes a counterpart 112a, the receiving/sending time 112b, the total call time 112c, and receiving/sending indicator 112d.

According to an exemplary embodiment, other entries may be further displayed in the message blocks 111 and 112. For example, the call connection failure indicator, the date of the text message/voice call, and the place where the message is received and sent may be further be displayed. In other words, all entries included in the voice call information and the text message information may be displayed in the message blocks 111 and 112. The user or integrated message management service server 20 may select and set the entries of the integrated message information to be displayed in the message blocks 111 and 112.

The interface managing unit 1130 may sort the message blocks 111 and 112 in the order of time. For example, the message blocks 111 and 112 may be arranged in descending order according to the receiving/transmitting time. Accordingly, message blocks 111 and 112 of the most recently received or transmitted message are displayed at the top of the message information display area 110.

The first message management user interface 100 shown in FIG. 5 has a different structure from the first message management user interface 100 shown in FIG. 4. Referring to FIG. 5, the first message management user interface 100 according to an exemplary embodiment is configured to include an address book display area 140, in which a contact information is provided in addition to the configuration shown in FIG. 4. More particularly, the message information display area 110 includes a plurality of message blocks 111 and 112. Each of the message blocks 111 and 112 includes information of one message (voice call or text message). The basic structure of the message information display area 110 and the message blocks 111 and 112 are substantially the same as that described in the example of FIG. 4, but the message type indicator 111e and the reception and transmission date 111f are further displayed. In the text message block 111, the origination identification mark 111d for identifying whether the text message was received or transmitted is further displayed.

In the address book display area 140 of the first message management user interface 100, contact information is provided. The contact information displayed in the address book display area 140 may be managed by a separate address book application. The address book display area 140 may be expanded or hidden by a user input. When generating the first message management user interface 100, the interface managing unit 1130 accesses the address book application, reads the address book information, and displays it in the address book display area 140. At this time, only a part of the contact information managed by the address book application may be retrieved and displayed in the address book display area 140. As shown in FIG. 5, for example, only the contact names and telephone numbers stored in the address book are retrieved and displayed in the address book display region 140. The user may access original content of the contact through a user input, for example, a touch input for selecting any one of the contacts displayed in the address book display area 140. At this time, in response to the user's contact selection input, the interface managing unit 1130 may execute the address book application to provide the original content of the selected contact for the user.

Figure 6:
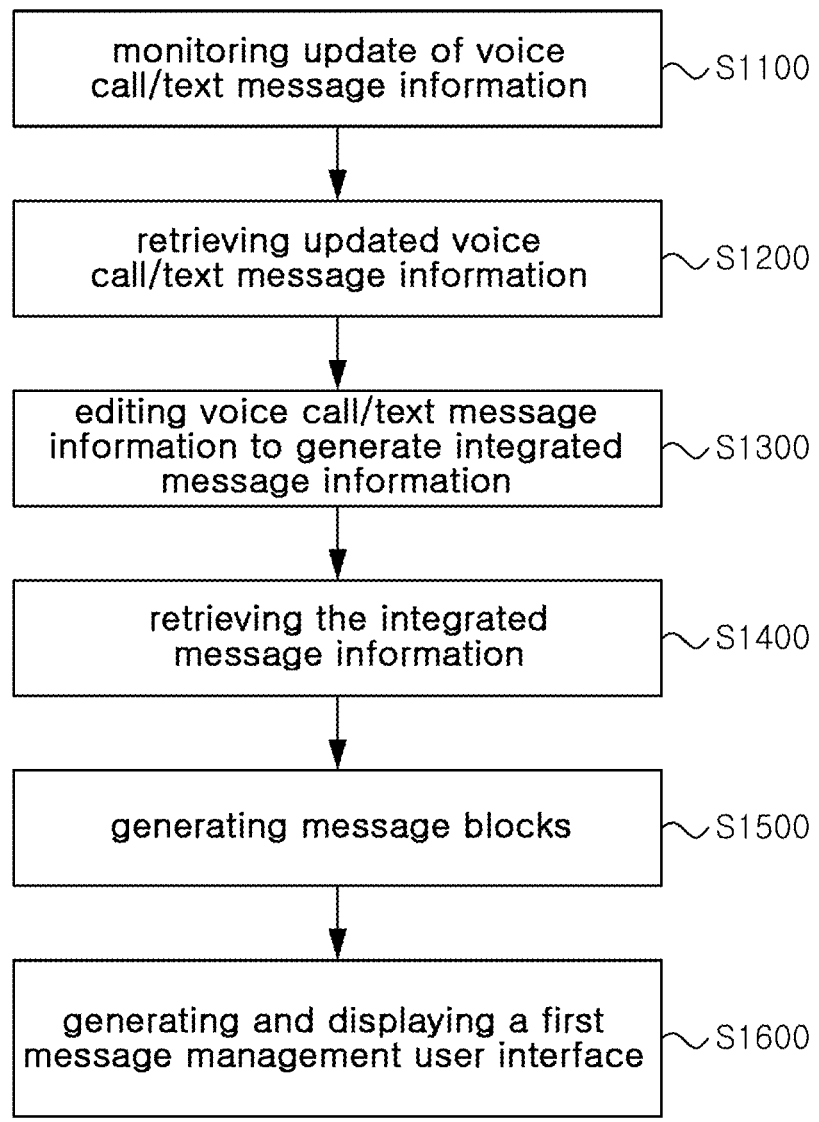
FIG. 6 is a flowchart illustrating a process for generating a first message management user interface having the configuration shown in FIG. 4.

FIG. 6 is a flowchart illustrating a process of generating a first message management user interface having the configuration shown of FIG. 4.

Referring to FIGS. 4 and 6, in step S1100, the message monitoring unit 1110 monitors whether voice call information/text message information is updated in association with the voice communication part 1200 and text message management part 1300.

When the message monitoring unit 1110 detects that voice call information or text message information is updated (e.g., new voice call and/or text message is received or transmitted), in step S1200, the message managing unit 1120 retrieves the updated voice call information and/or text message information. In step S1300, the message managing unit 1120 edits the call information and/or text message information according to a message block format to generate the integrated message information.

The message block format may define the entries of the message information to be included in the message blocks 111 and 112. The message block format may be set by the user or the integrated message management service server 20. Referring back to FIG. 4, the text message block 111 includes a recipient/sender (counterpart) contact 111a, receiving/transmitting time 111b, and message body 111c. In addition, the voice call block 112 includes the recipient/sender(counterpart) contact 112a, receiving/transmitting time 112b, total talk time (or call connection failure indication) 112c, and receiving/sending indicator 112d. Referring to FIG. 5, the message block format may define that both the text message and the voice call information include the origination indicator 111d and the message type indicator 111e in addition to the entries shown in FIG. 4. The message managing unit 1120 may extract only the entries defined by the message block format from the voice call information and the text message information, to generate the integrated message information.

The message block format may further define a display form for each of the entries to be displayed in the first message management user interface 100. For example, as in the example of FIG. 5, the origination of a message is displayed using an arrow image 111d indicating a direction of the message, and the text message body 111*b* displays a predetermined number of letters, e.g., 36 characters. According to the display forms defined by the message block format, the interface managing unit 1130 displays the integrated message information generated by the message information managing unit 1120. In the example of FIG. 5, the interface managing unit 1130 displays, in accordance with the display format defined in the message block format, an arrow image corresponding to the receiving/sending indicator, and edits the integrated message information to show the first 36 characters.

The message managing unit 1120 extracts only the entries defined by the message block format from the voice call information and the text message information, and edits the extracted entries according to the message block format to generate the integrated message information.

When a user input of executing the integrated message information management application is received, in step S1400, the interface managing unit 1130 retrieves the integrated message information.

In step S1500, the interface managing unit 1130 then generates message blocks 111 and 112, in which the respective entries of the integrated message information are arranged, according to an arrangement rule defined by the message block format. The arrangement rule defines the position of each entry of the retrieved integrated message information to be displayed in the message blocks 111 and 112. In the example of FIG. 4, the counterpart identification information 111*a*, the message body 111*b*, and the receiving/transmitting time 111*c* may be defined to be displayer at a specific location of the message blocks 111 and 112, respectively. According to the arrangement rule, the interface managing unit 1130 generates message blocks 111 and 112, in which the each entry of the retrieved integrated message information is arranged, at a position as shown in FIG. 4.

Then, in step S1600, the interface managing unit 1130 generates a first message management user interface 100, in which voice call information and text message information are arranged, in the order of receiving/transmitting time.

The integrated message information generated by the message managing unit 1120, and/or the message blocks 111 and 112 generated by the interface managing unit 1130 may be stored in the memory 1600. Once the integrated message information and/or message blocks 111 and 112 are stored in the memory 1600, the interface managing unit 1130 may retrieve the stored integrated message information and/or message blocks 111 and 112 to generate the first massage management user interface 100 without repeating the above processes. In this case, for a new voice call and/or text message, the above-described processes may be performed to display the newly generate the message blocks 111 and 112 in the first message management user interface 100.

As mentioned above, the message block format may be changed according to user configuration. In particular, the user can change at least one of the entries, the display format, and the arrangement rule of information to be displayed in the message blocks 111 and 112. The interface managing unit 1130 may be configured to modify the integrated message information stored in the memory 1600 corresponding to the changed message block format. Modification of the integrated message information may be performed through the same process as the above-described processing. In other words, the message managing unit 1120 performs substantially the same process as described above for the stored integrated message information, and then replaces the stored integrated message information with the modified integrated message information. Alternatively, the message managing unit 1120 compares the pre-existing message block format with the changed message block format, and then performs some or all of the above-described processing only for the changed portion to update the stored integrated message information.

For example, in the example of FIG. 5, when the message block format is changed to exclude the receiving/sending indicator from the display entry, the interface managing unit 1130 performs a process for deleting only the receiving/sending indicator from the pre-stored integrated message information. Even when the entry is added or the display format is changed, the two message block formats before and after the change are compared, and only the changed portions are processed, and then the result is updated to the stored integrated message information.

In the above examples, the message managing unit 1120 edits of voice call information and text message information to generate and edit the integrated message information. However, the above processes may be performed by the interface managing unit 1130 partially or entirely. For example, when a message block format defines that an entry related to the receiving/sending indicator is to be displayed using an arrow image, in step S1600, the interface managing unit 1130 may replace the receiving/sending indicator with the arrow image when generating the first message management user interface 100.

Figure 7:
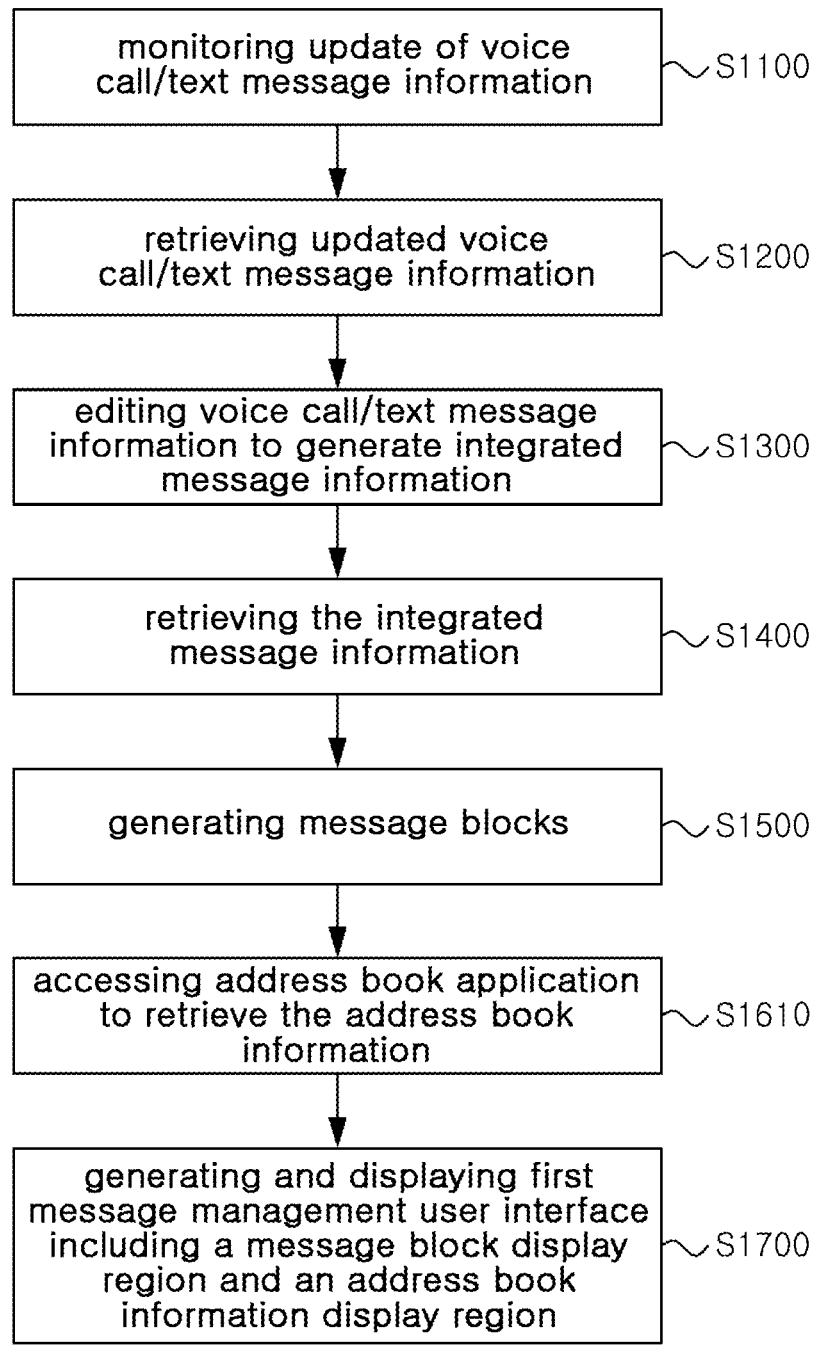
FIG. 7 is a flowchart illustrating a process for generating a first message management user interface having the configuration shown in FIG. 5.

FIG. 7 is a flowchart illustrating a process for generating a first message management user interface having the configuration of FIG. 5.

In FIG. 7, the steps S1100 to S1500 are the same as those shown FIG. 6, and therefore, repeated description thereof will be omitted to avoid redundancy.

Following the process of S1500, in step S1610, the interface managing unit 1130 accesses the address book managing unit of the mobile terminal 10 to read the address book information. According to an exemplary embodiment, the step S1610 may be performed simultaneously with or before any one of the steps S1100 to S1400.

In step S1700, the interface managing unit 1130 then generates and displays the first message management user interface 100 including a first region where message blocks 111 and 112 generated in step S1400 are listed and a second region where the retrieved address book information is displayed. As shown in FIG. 5, the first message management user interface 100 includes a first area where voice call information and text message information are displayed in a time-series manner, and a second area where address book information is displayed.

The first message management user interface 100 of FIG. 4 includes a menu bar 120. The first message management user interface mode selection icons 121*a*, 121*b* and 121*c*, a search tool 122, and an address book icon 123 are displayed on the menu bar 120.

When the input window of the search tool 122 is touched, the interface managing unit 1130 provides a character input user interface. When the user inputs a search word through the character input user interface, the interface managing unit 1130 looks for the integrated message information including the input search word through a search engine built in the integrated message information managing part 1100, and displays the search result on the first message management user interface 100.

When the user touches the address book icon 123 of the menu bar 120, the interface managing unit 1130 accesses the address book application and retrieves the contact information. At the same time, the interface managing unit 1130 converts the first message management user interface 100 into an address book user interface, and displays it on a screen of the mobile terminal 10.

Figure 8:
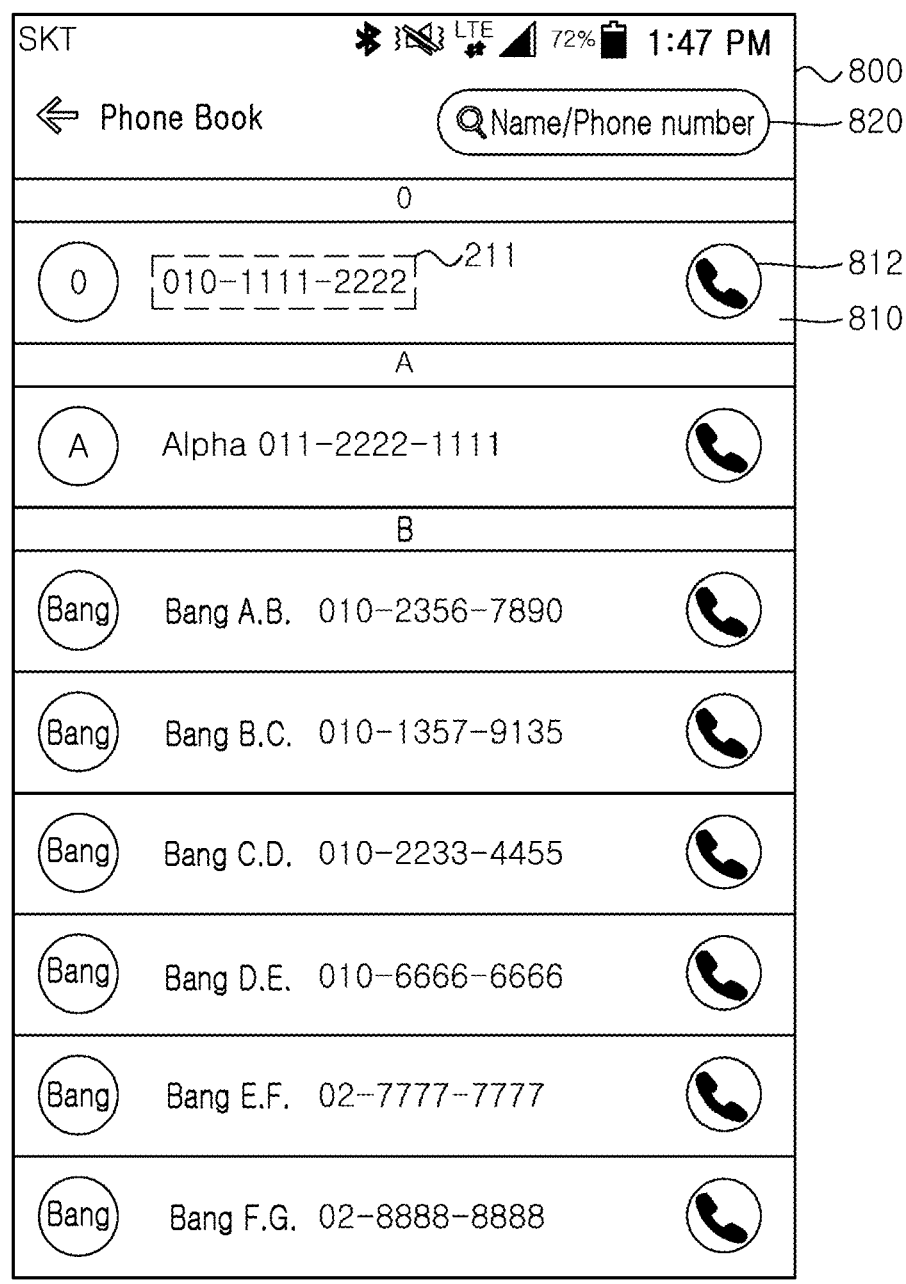
FIG. 8 is a screenshot showing an example of the address book user interface generated by the interface managing unit.

FIG. 8 is a screenshot showing an example of the address book user interface generated by the interface managing unit.

The address book interface 800 is configured to include a contact information block 810 including contact information, a search tool 820, and a dialing graphical user interface 812. The contact information block 810 is listed according to the name of the contact.

The first message management user interface 100 may be provided in a plurality of modes capable of being mutually switchable. The configuration of the message blocks 111 and 112 of the first message management user interface 100 may be changed at the time of a mode switching. The mode switching process of the first message management user interface 100 of the integrated message information management part 1100 may be performed as follows.

When the interface managing unit 1130 detects the mode switching user input, the interface managing unit 1130 checks the message block format for a new mode selected by the user. Subsequently, the interface managing unit 1130 reconstructs the message blocks 111 and 112 according to the message block format information. The reconstruction process of the message blocks 111 and 112 may be performed in a manner substantially similar to that in the message block reconstruction process performed when the message block format is changed. As the message block reconstruction processing, which may occur when the message block format has been changed, has already been described above in detail, repeated description of the reconstruction process of the message blocks 111 and 112 will be omitted to avoid redundancy.

In the example shown in FIG. 4, the first message management user interface 100 is configured to provide three modes, each mode being selectable by selecting one of mode icons 121a to 121c included in the menu bar 120. In the example of FIG. 4, a timeline mode 121c, an integrated message information mode 121a, and a voice call information mode 121b are selectable. The integrated message information mode is provided as a default. When the user touches the integrated message information mode icon 121a of the menu bar 120 in the first message management user interface 100, the mode is switched to the default mode shown in FIG. 4. The default mode has been described above with reference to FIG. 4.

Figure 9:
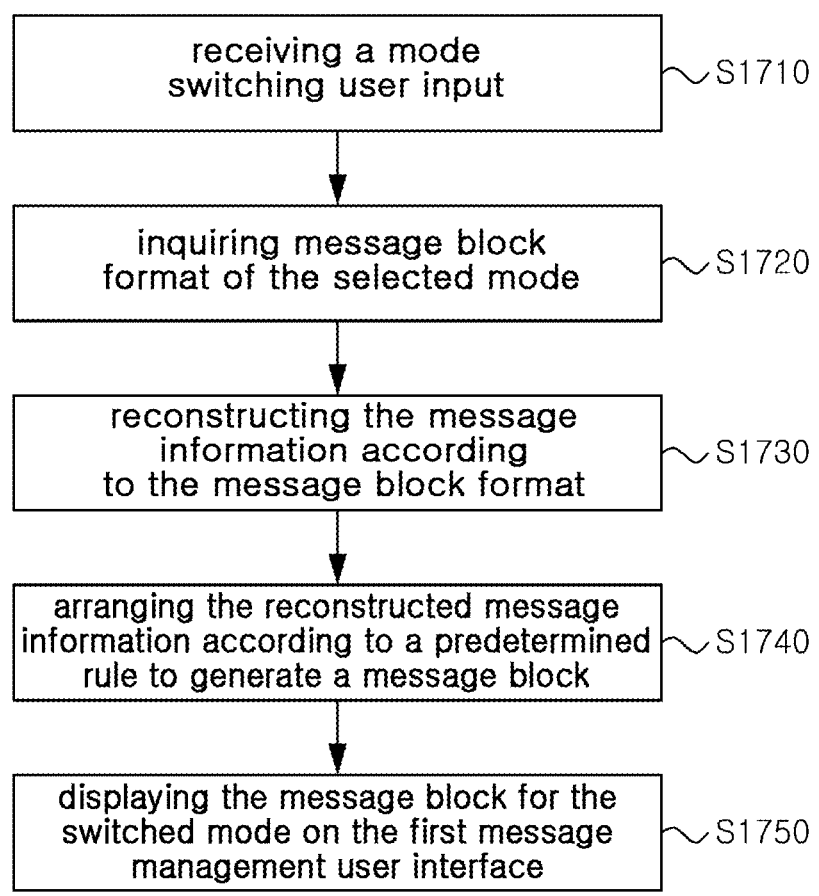
FIG. 9 is a flowchart showing mode switching processes of the first message management user interface.

FIG. 9 is a flowchart showing mode switching processes of the first message management user interface.

Referring to FIG. 9, in step S1710, the interface managing unit 1130 receives a mode switching user input. The mode switching user input may occur when the user touches a mode selection graphical user interface (icon) 121a to 121c displayed on the menu bar 120 of the first message management user interface 100 as described above. In step S1720, the interface managing unit 1130 inquires the message block format of the mode selected by the mode switching user input. The message block format includes information related to entries, display forms, and arrangements of information to be displayed in the message block. The details of the message block format are the same as the message block format described with reference to FIGS. 4 and 6. In step S1730, the message managing unit 1120 reconstructs the information to be displayed in the message block according to the message block format. At this time, the process for reconstructing the message information performed by the message managing unit 1120 is similar to the above-described process for reconstructing the message block, and thus a detailed description thereof will be omitted.

In step S1740, the interface managing unit 1130 arranges the reconstructed message information according to a predetermined rule to generate a message block. In step S1750, the interface managing unit 1130 displays the message block for the switched mode on the first message management user interface 100. The message block of the mode-switched first message management user interface 100 includes entries defined by the message block format for the switched mode. Although the above description has been made with respect to the example in which the message block information is reconfigured by the message managing unit 1120, inventive concepts are not limited thereto, and, such process may be performed by the interface managing unit 1130.

Figure 10:
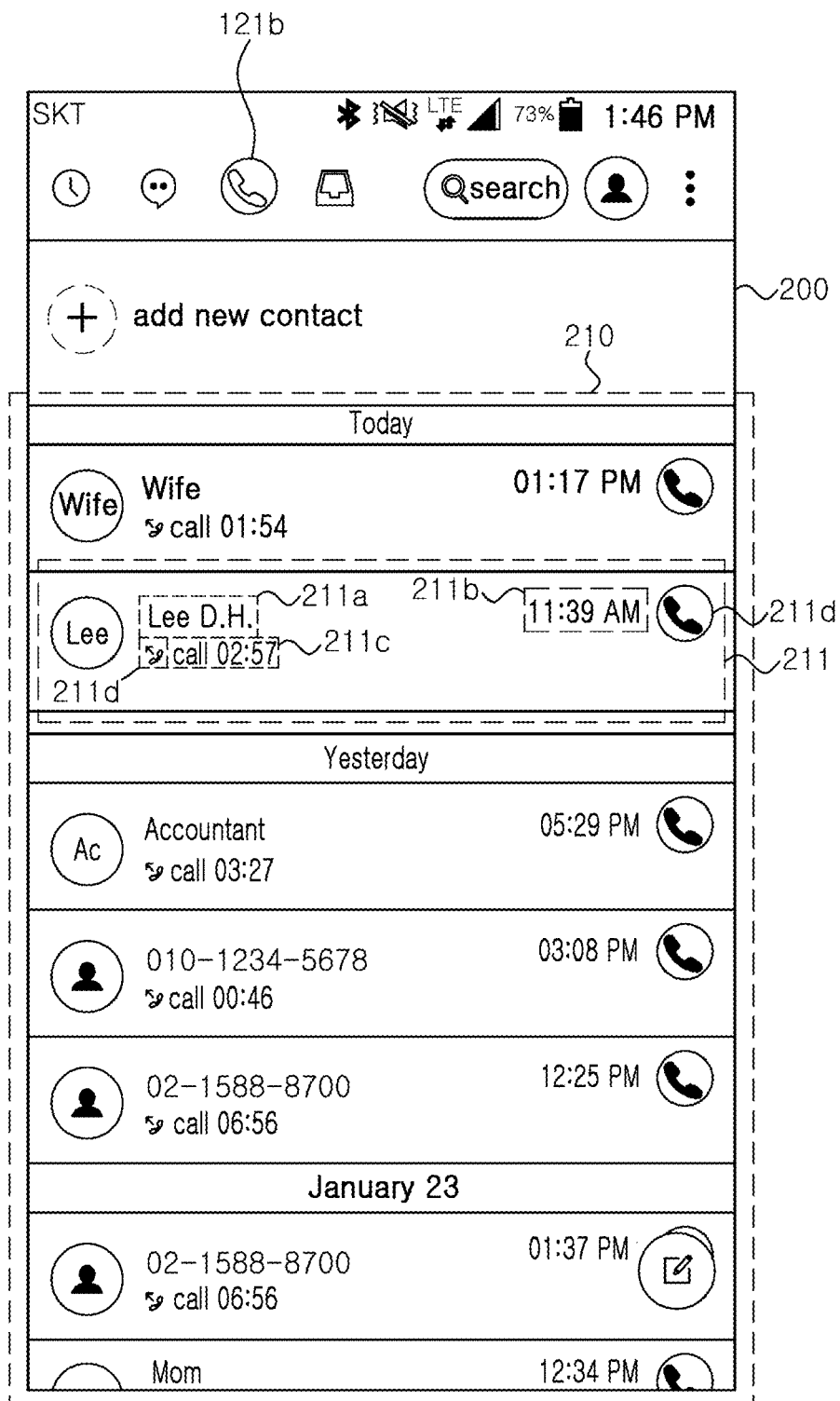
FIG. 10 is a screenshot illustrating an example of a first message management user interface in a voice call information mode.

FIG. 10 is a screenshot illustrating an example of a first message management user interface in a voice call information mode.

When the user touches the voice call information mode icon 121b of the menu bar 120, the first message management user interface 100 is switched to the voice call information mode 200. The voice call information mode 200 of the first message management user interface is configured to include only voice call information among the integrated message information. More particularly, the message block 211 of the voice call information mode 200 includes only the voice call information. Accordingly, the interface managing unit 1130 does not display the message block for the text message on the voice call information mode 200 of the first message management user interface. The message block 211 may be configured differently from the message block in integrated message mode. In other words, the message block format may be changed according to the mode.

The message block 211 of FIG. 10 may further include a dialing icon 211d in addition to the entries of the message block of FIG. 4. Accordingly, when switching the mode to the voice call information mode, the interface managing unit 1130 inquires the message block format for the voice call information mode, and reconstructs the message block 211 for a voice call information according to the message block format, so that the dialing icon 211d is added. As described above, the process for reconstructing the message block is performed in substantially the same manner as the message reconstruction process that occurs when the message block format is changed.

According to an exemplary embodiment of the present invention, the interface managing unit 1130 may be configured to provide a timeline user interface for collectively displaying integrated message information collected during a specific period. The specific period can be adjusted according to the user selection. All information provided through the integrated message management part 1100 may be displayed on the timeline user interface. However, according to the user selection, only a part of information processed by the integrated message information management part 1100 may be displayed.

Figure 11:
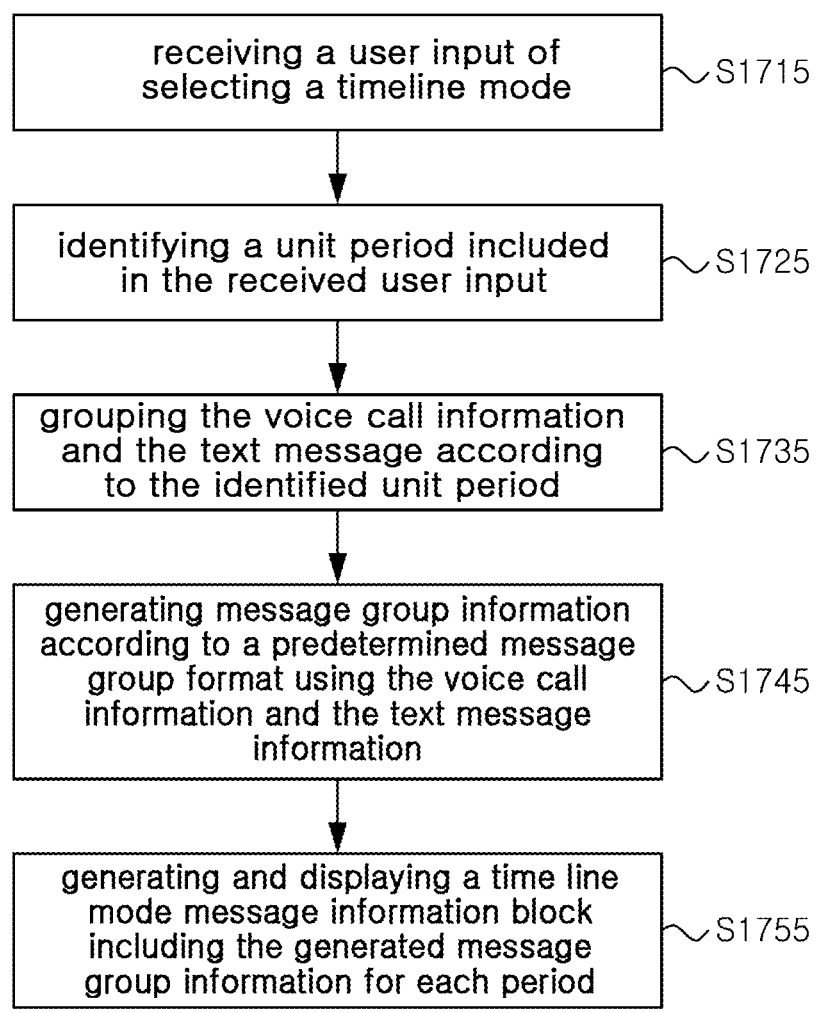
FIG. 11 is a flowchart showing an example of a process for switching to a time line mode according to an exemplary embodiment of the present invention.

FIG. 11 is a flowchart showing an example of a process for switching to the timeline mode according to an exemplary embodiment of the present invention.

Referring to FIG. 11, in step S1715, the interface managing unit 1130 receives a user input of selecting a timeline mode. The timeline mode selection user input may occur when the user touches the timeline mode selection icon 121c of the menu bar 120 of the first message management user interface shown in FIG. 4. In step S1725, the interface managing unit 1130 identifies a unit period included in the received user input. In step S1735, the message managing unit 1120 groups the voice call information and the text message according to the identified unit period. More specifically, the message managing unit 1120 performs a process of grouping the voice call information and the text message information received or transmitted for the same unit period into one group. Then, in step S1745, the interface managing unit 1130 generates message group information according to a predetermined message group format using the voice call information and the text message information. At this time, the predetermined message group format includes an information related to entries to be displayed in a message block for each unit period, and a display form, which will be described later. Then, in step S1755, the interface managing unit 1130 generates a message block including the generated message group information for each period, and displays the generated timeline mode message blocks for each unit period.

Figure 12:
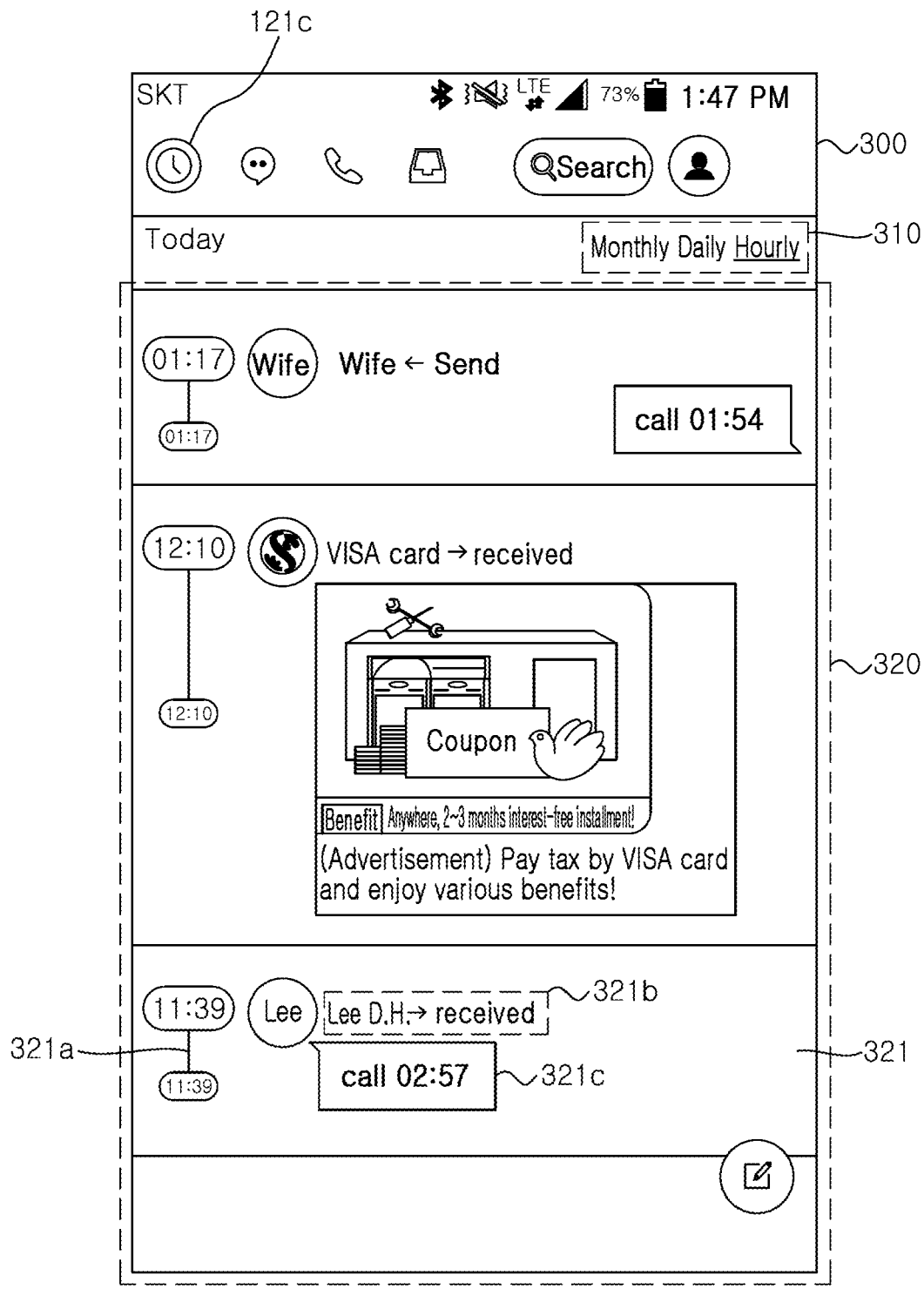
FIG. 12, FIG. 13, and FIG. 14 are screenshots illustrating an example of a time line user interface provided by the integrated message management part.
Figure 13:
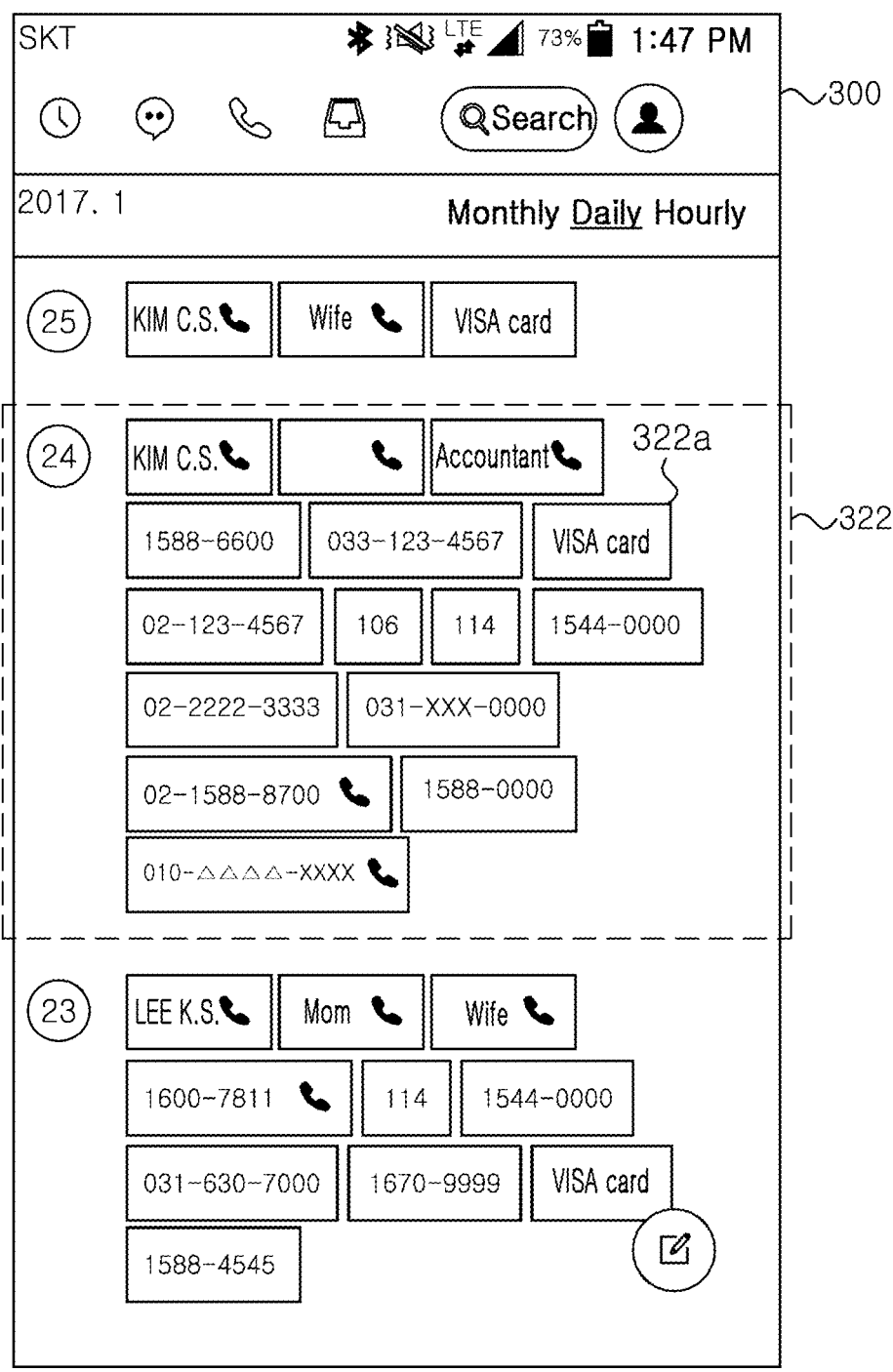
Figure 14:
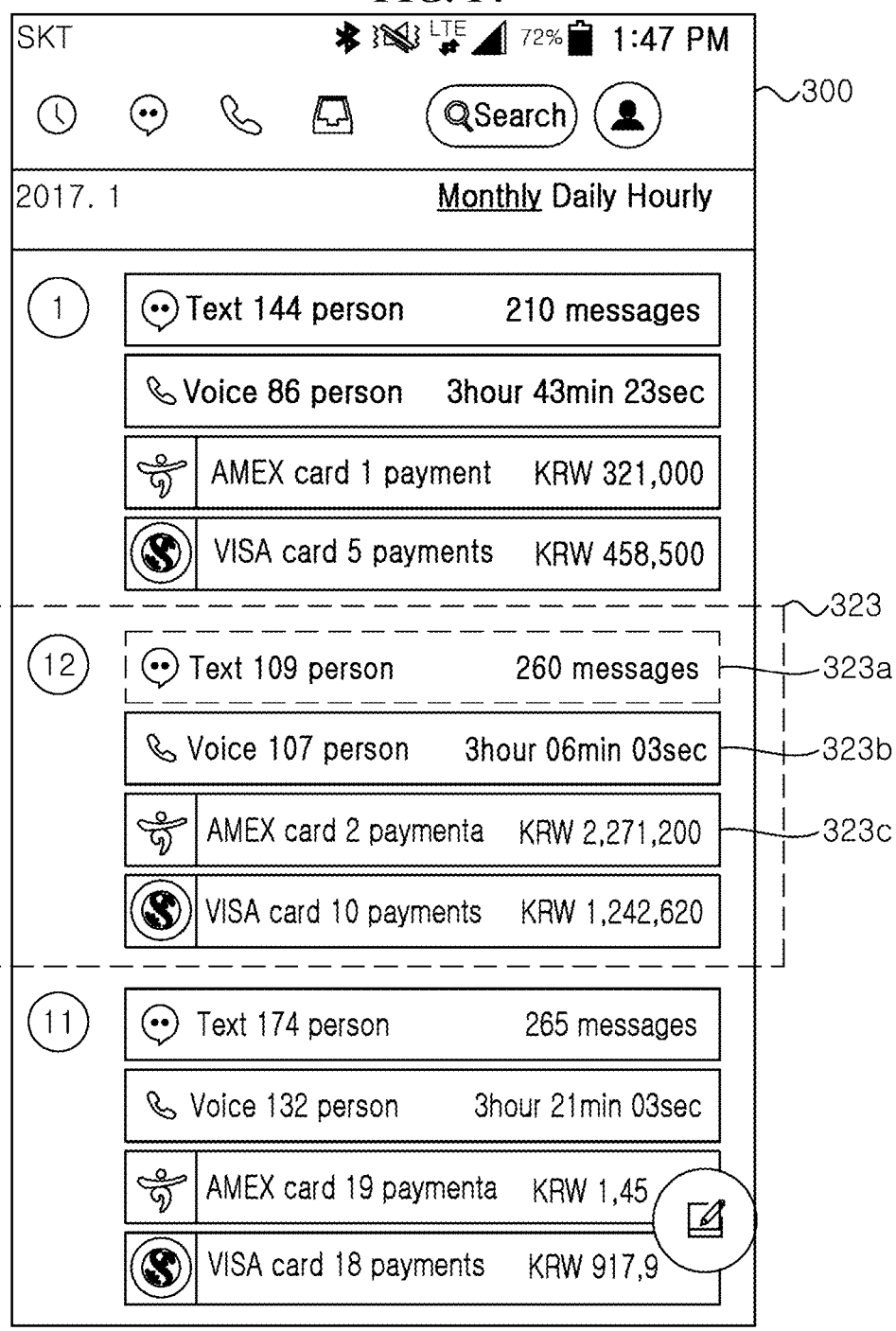

FIGS. 12 to 14 are screenshots showing an example of the timeline mode interface 300 provided in the integrated message information management part 1100.

When the user touches the timeline mode icon 121c of the menu bar of the first message management user interface, the timeline user interface 300 is displayed on the mobile terminal 10. At the top of the timeline interface 300, a period selection bar 310 is provided. For example, three different periods are selectable, i.e., "hourly" for listing and displaying message information on an hourly basis, "daily" for listing and displaying message information on a daily basis, and "monthly" for listing and displaying message information on a monthly basis. However, different periods, e.g., weekly, may be provided in the period selection bar 310, and various periods may be selected depending on the user configuration.

FIG. 12 is a screenshot showing a timeline user interface 300 when the "hourly" is selected. The timeline user interface 300 includes a plurality of unit blocks 321. Each unit block 321 is generated for messages (voice calls and text messages) received or transmitted during each hour. In each unit block 321, message information and additional information processed by the integrated message management part 1100 are displayed. The interface managing unit 1130 may display all or a part of the message information and additional information on the timeline user interface 300 according to a predetermined format. For example, as shown in FIG. 12, the start and end time 321a, the incoming/outgoing indicator 321b, the total communication time 321c, and the like are displayed.

FIG. 13 is a screenshot showing the timeline user interface 300 on the daily basis. The timeline user interface 300 includes a plurality of unit blocks 322. Each unit block 322 is generated for messages received or transmitted for each day, and each unit block 322 includes summary information summarizing each message received/transmitted for each day. The interface managing unit 1130 may display all or a part of the message information and additional information on the timeline user interface 300 according to a predetermined format. For example, as shown in FIG. 13, a plurality of sub-blocks 322a are displayed in the unit block 322. In each sub-block 322a, only contact information is displayed as a summary for each voice call and text message. That is, the interface managing unit 1130 is configured to extract only the information on the counterpart (receiver or sender) from among the voice call/text message information, and display the sub-blocks 322a including the extracted information on the unit block 322 of the daily view user interface 300. When the user selects a specific message block, the interface managing unit 1130 access the voice call management part 1200 or the text message management part 1300 to display details of the integrated message information corresponding to the selected block.

FIG. 14 is a screenshot showing the timeline user interface 300 on the "monthly" basis. The monthly timeline user interface includes a plurality of unit blocks 323. Each unit block 323 is generated for each month. The interface managing unit 1130 may display all or a part of the message information and additional information on the timeline user interface 300 according to a predetermined format. For example, as shown in FIG. 14, a plurality of message statistical information blocks 323a, 323b, and 323c are displayed in the unit block 323. Each of the message statistical information blocks 323a, 323b, and 323c includes statistical information on voice calls and text messages received or transmitted during a month. When the user selects a specific unit block 323, the interface managing unit 1130 executes the voice call management part 1200 or the text message management part 1300 to display details of the integrated message information corresponding to the selected block.

Upon receiving a user inputs selecting a message block of FIGS. 4 and 5, e.g., touching a message block 111, 112, details of the selected message block may be displayed on the terminal 10. The interface managing unit 1130 may be configured to provide a second message management user interface, which displays details of a message in response to the user input of selecting the message blocks 111 and 112 of the first message management user interface 100. The second message management user interface will be described later. Alternatively, the interface managing unit 1130 may be configured to generate a message object separate from the first message management user interface 100, and display all entries of the integrated message information corresponding to the message block selected by the user. The message object may be displayed in a pop-up window.

Figure 15:
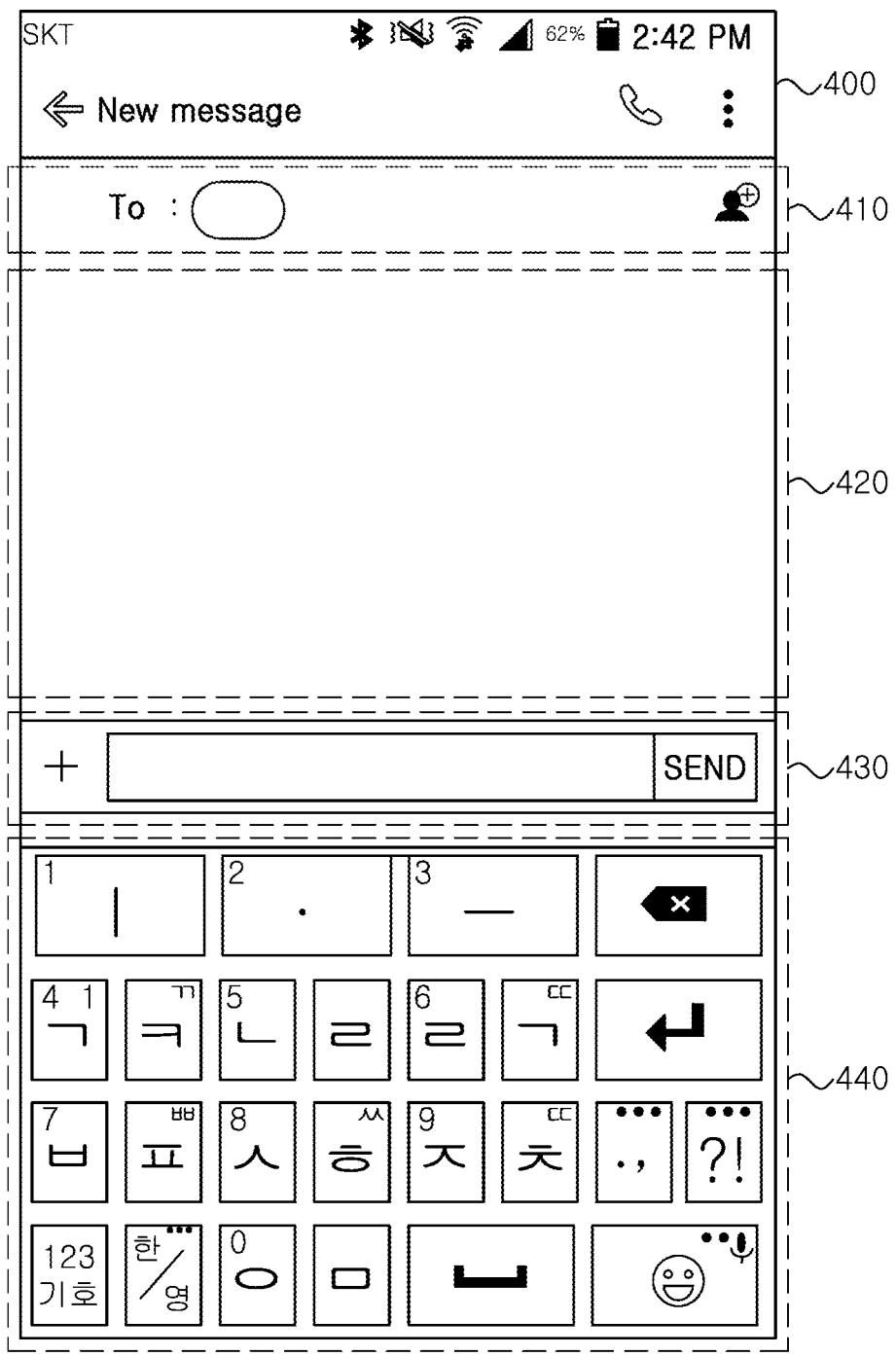
FIG. 15 is a screenshot illustrating a text message creating user interface provided on the first message management user interface.

The first message management user interface 100 may include an icon 130 (see FIG. 5) for creating a text message. FIG. 15 is a screenshot illustrating a text message creating user interface provided by a user input of selecting a text message icon 130 of the first message management user interface 100 of FIG. 4 or FIG. 5.

Upon receiving the user input of selecting the text message icon 130, the interface managing unit 1130 activates the text message creating user interface 400. The text message creating user interface 400 includes a recipient input window 410, a message display window 420, a character input window 430, and a keypad user interface 440 for inputting characters. The key pad user interface 440 may support various language. Hereinafter, the keypad user interface 440 is described as being selected with Korean language. When the user inputs characters through the keypad interface 440, the interface managing unit 1130 generates a character string corresponding to the user input and simultaneously displays the character string in the character input window 430 and the message display window 420. The character input window 430 includes a 'send' icon for transmitting the input character to a counterpart (recipient). Upon receiving user input of sending the message (user's touch of 'send' icon), after the character input is completed, the interface managing unit 1130 transfers the character string displayed in the character input window 430 to the text message management part 1300. The text message management part 1300 transmits the received character string to the counterpart in a form of SMS or MMS through the mobile telephone switching network, and stores information on the transmitted text message in the memory 1600.

The stored text message information is processed through the message monitoring unit 1110 and the message information managing unit 1120 to be displayed on the first message management user interface 100 by the interface managing unit 1130. That is, a user can create a text message on the first message management user interface 100 without executing a text message management application, and transmit the text message to the counterpart directly through the mobile telephone switching network. At this time, generating a message block information as described above may also be performed on the text message transmitted to the counterpart through the first message management user interface 100.

The first message management user interface 100 may be configured to further include a telephone dialing function in addition to the text message transmission. For example, the interface managing unit 1130 may be configured to display a dialer icon on the first message management user interface 100 when a user touches a message block displayed in the first message management user interface 100. Then, when the user touches the telephone dialing icon, the interface managing unit 1130 accesses the voice call management part 1200 and makes a call to the counterpart of the selected message block. As another example, when a message block is touched for a long time, the interface managing unit 1130 accesses the voice call management part 1200 to make a call to the counterpart of the selected message block. In this manner, the user can immediately make a voice call on the first message management user interface 100 without having to execute the voice call management application and enter the phone number. The voice call management part 1200 stores information on the voice call attempted on the first message management user interface 100. The stored text message information is processed through the message monitoring unit 1110 and the message information managing unit 1120 to be displayed on the first message management user interface 100 by the interface managing unit 1130. In other words, the integrated message information management process as described above may also be performed on the voice call attempted through the first message management user interface 100.

As described above, the interface managing unit 1130 may configured to provide a second message management user interface in response to a user input selecting the message blocks 111 and 112 displayed in the first message management user interface 100. As such, the first message management user interface 100 may be switched to a second message management user interface by user input.

Hereinafter, the process of generating the second message management user interface will be described in detail with reference to FIG. 16 and FIG. 17.

Figure 16:
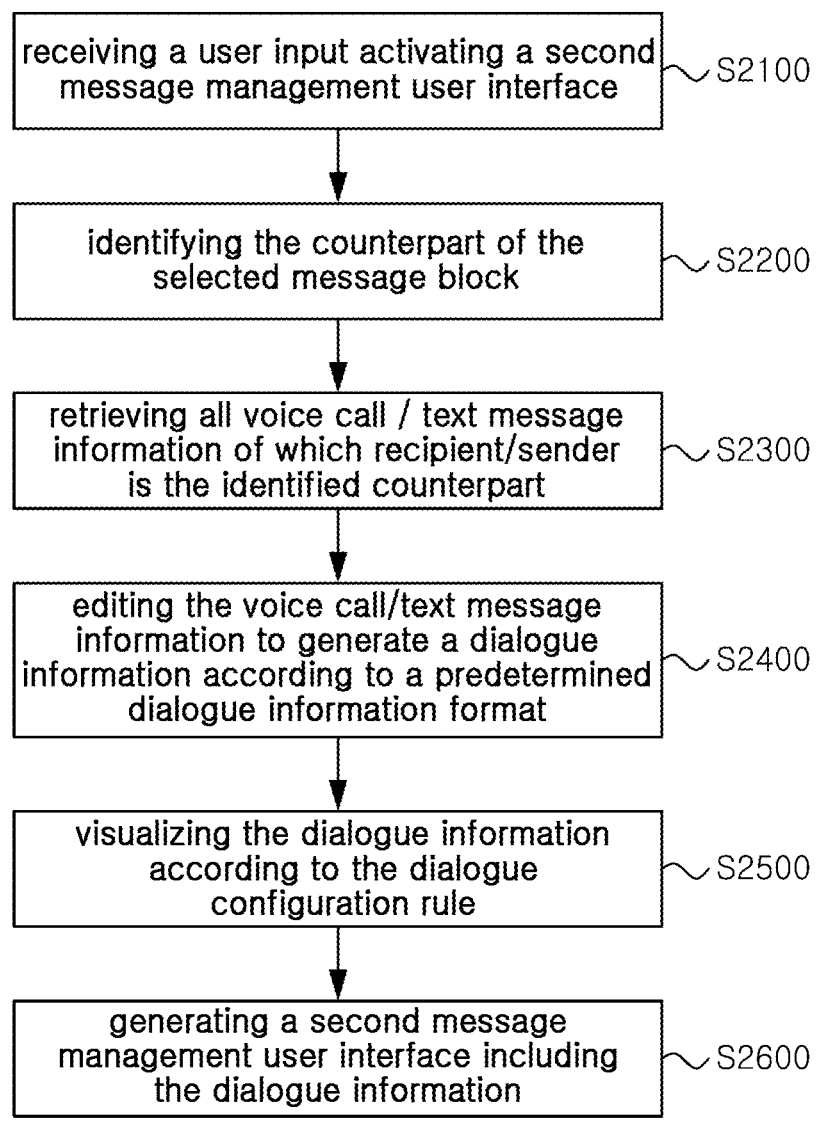
FIG. 16 is a flowchart illustrating a process of generating a second message management user interface.
Figure 17:
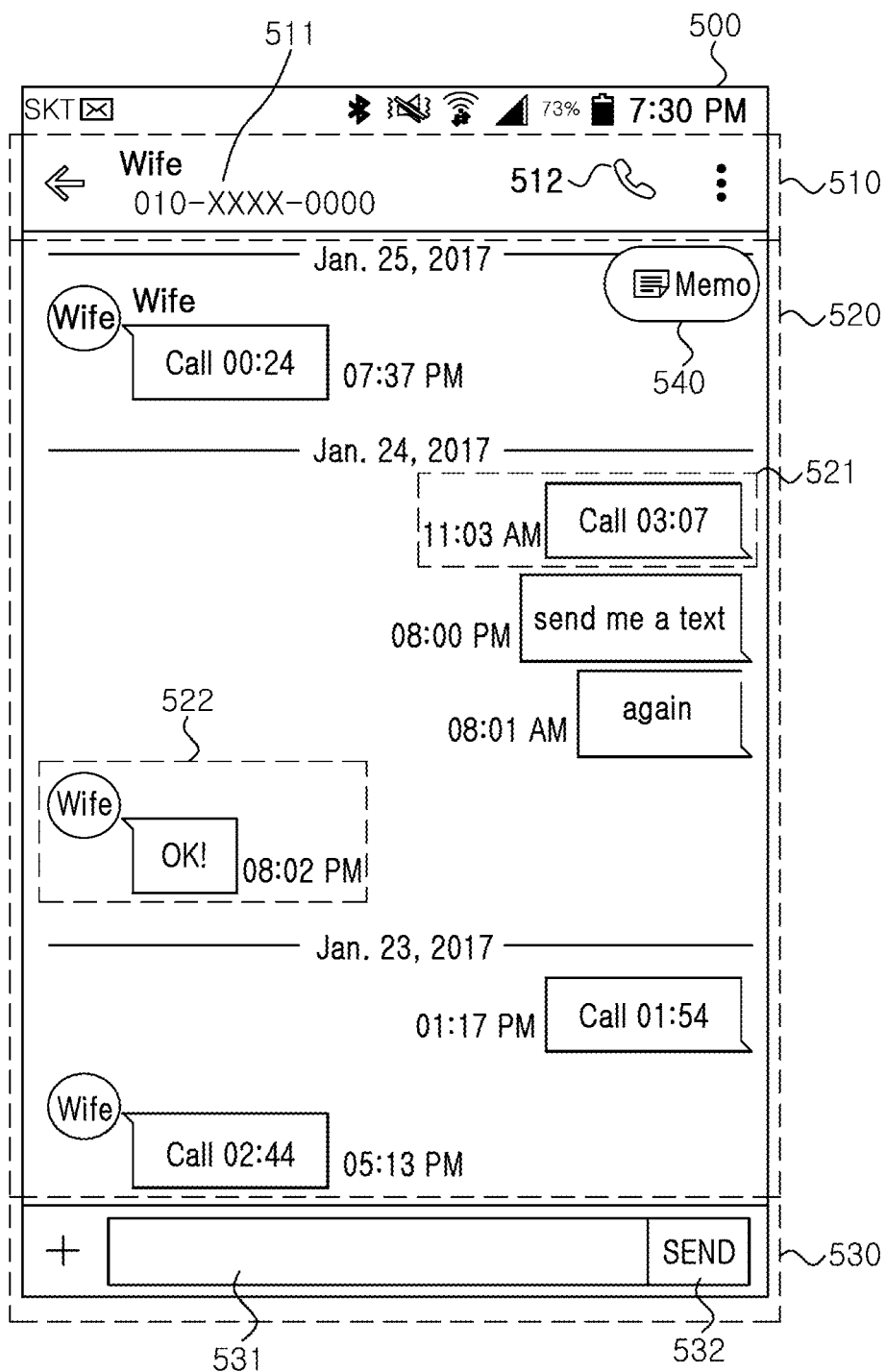
FIG. 17 is a screenshot showing an example of a second message management user interface provided by the integrated message management part.

FIG. 16 is a flowchart illustrating a process of creating a second message management user interface, and FIG. 17 is a screenshot illustrating an example of a second message management user interface provided by the integrated message management part 1100.

In step S2100, the interface managing unit 1130 receives a user input activating a second message management user interface. The user input activating a second message management user interface may be, for example, the user touching the message blocks 111 and 112 of the first message management user interface 100, as described above. In addition, the user input activating the second message management user interface may be the user touching the message notification displayed on the status bar of the mobile terminal 10 when the integrated message information management application is not activated.

In step S2200, when a user input activating the second message management user interface is received, the interface managing unit 1130 identifies the counterpart (recipient/sender) of the selected message block. In step S2300, the message managing unit 1120 retrieves all of the voice call information and the text message information of which recipient/sender is the identified counterpart. In step S2400, the message managing part 1120 edits the voice call information and the text message information to generate a dialogue information according to a predetermined dialogue information format. The dialogue information format defines entries to be displayed and a notation of each entry. For example, the dialogue information format for a voice call may be defined as displaying receiving/sending time in a form of "HH: MM AM (or PM)" and total conversation time in a form of "HH:MM:SS". On the other hand, the dialogue format for the text message may be defined as displaying receiving/sending time in a form of "HH: MM AM (or PM)" and message body in a form of full-text of the message. The message managing unit 1120 extracts only the entries defined by the dialogue information format from the voice call information and the text message information, and edits the extracted entries in the form defined by the dialogue information format to generate the dialogue information.

In the above described example, the step S2400 of generating dialogue information is described as being performed by the message managing unit 1120. However, according to an exemplary embodiment, all or a part of the process in step S2400 may be performed by the interface managing unit 1130.

Next, in step S2500, the interface managing unit 1130 visualizes the dialogue information according to the dialogue configuration rule, and in step S2600, generates a second message management user interface including the dialogue information. The dialogue configuration rule defines the arrangement and display form of each entry of the dialogue information. For example, the dialogue information rule may define: 1) dialogue information of the incoming voice call and the text message is placed on the left side of the interface and dialogue information of the outgoing voice call and the text message is placed on the right side of the second message management user interface 500; 2) total conversation time of a voice call and full text of a message is provided in a form of a speech bubble; 3) the receiving/sending time is displayed outside the speech bubble; and 4) all the dialogue information is listed in descending order according to the receiving/sending time. The interface managing unit 1130 processes and visualizes each entry of dialogue information according to the dialogue configuration rule, and generates a second message management user interface displaying the visualized results.

The second message management user interface generated according to the above exemplary dialog information format and dialog configuration rule is as shown in FIG. 17.

Referring to FIG. 17, the second message management user interface 500 includes a dialogue title region 510, a dialogue display region 520, and a character input region 530. In the title region 510, counterpart information and a telephone dialing icon is provided. In the dialogue display region 520, the dialogue information is displayed. For example, the unit dialogue 521 corresponds to an outgoing voice call. In accordance with the dialogue information format and the dialogue configuration rule, the total call time entry is inserted into a speech bubble in the form of "voice call 03:07" and sending time entry is displayed at left side of the speech bubble in a form of text string "11:03 AM". The unit dialogue 522 relates to a received text message. In accordance with the dialogue information format and the dialogue configuration rule, the received text is inserted into a speech bubble in the form of full text "OK!", and receiving time is displayed at right side of the speech bubble in a form of text string "08:02 PM". In addition, the unit dialogue 522 related to the received text message is arranged on the left side of the interface, the unit dialogue 521 related to the outgoing voice dialogue is arranged on the right side of the interface, and the dialogues are arranged in order of receiving/transmitting time.

The second message management user interface 500 is configured to provide detailed information on messages exchanged with a specific person (counterpart). For example, the second message management user interface 500 may be configured to provide information on voice calls and text messages exchanged with a specific user in an interactive manner. While the first message management user interface 100 lists information on all message in a time series, the second message management user interface 500 displays more detailed contents of messages exchanged with a specific entity.

The second message management user interface 500 may be provided in response to various user inputs. First, as described above, when the interface managing unit 1130 detects a user input, such as touching a specific message block displayed on the first message management user interface 100 ("message block selection input"), the interface managing unit 1130 identifies the counterpart (recipient or sender) of the selected message block. The interface managing unit 1130 accesses the memory 600 to retrieve integrated message information on voice calls/text messages received from and transmitted to the corresponding counterpart, generates the second message management user interface 500 by listing the retrieved integrated message information in a time series, and displays it on the mobile terminal 10. As such, in response to the user's message block selection input, the interface managing unit 1130 switches the first message management user interface 100 to the second message management user interface 500.

The second message management user interface 500 may display and provide each message information in an interactive format. For example, referring to FIG. 17, the information on a received message is displayed on the left side, and the information on a transmitted message is displayed on the right side. The incoming speech bubble 522 and the outgoing speech bubble 521 may have different colors or fonts for easy identification.

The second message management user interface 500 may be configured to include a character input region 530. The character input region 530 may be disposed at the lower end of the second message management user interface 500, as shown in FIG. 17. The character input region 530 includes a character input window 531 and a "send" graphical user interface 532.

Figure 18:
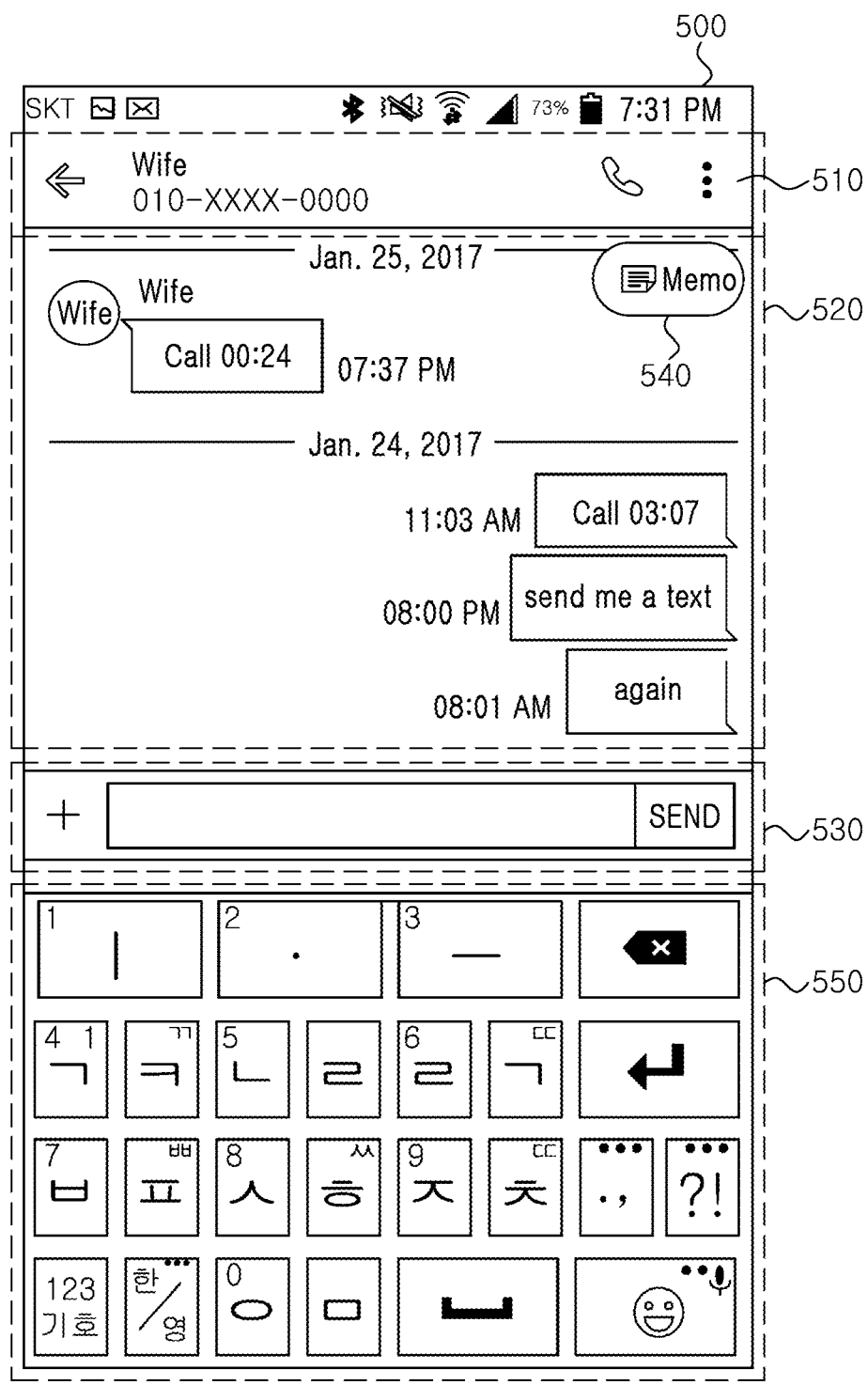
FIG. 18 is a screenshot illustrating a text message creating user interface provided on a second message management user interface.

FIG. 18 is a screenshot showing an example in which a user input interface for creating a text message is activated in the second message management user interface 500 of FIG. 17.

When a user input occurs, such as when the user touches the character input window 531, the interface managing unit 1130 provides a keypad interface 550 over the second message management user interface 500, and displays the texts input through the keypad interface 550 on the character input window 531.

The character input region 530 includes a send icon 532 for sending the input text to the counterpart. When the send request is input, such as by touching the send icon 532, after the text creating is completed, the interface managing unit 1130 transfers the text displayed in the character input window 531 to the text message management part 1300. The text message management part 1300 transmits the received text to the counterpart in a form of SMS or MMS through the mobile telephone switching network and stores information on the transmitted text message in the memory 1600. The stored text message information is processed through the message monitoring unit 1110 and the message information managing unit 1120, and is displayed on the second message management user interface 500 by the interface managing unit 1130. As such, the user can create a text message on the second message management user interface 500 and send the text message to the counterpart directly through the mobile telephone switching network without executing the text message management application. In this case, the above-described processes for generating and visualizing dialog information may also be performed for the text message transmitted through the second message management user interface 500.

In the above description, the character input region 530 is provided in the second message management user interface 500. However, according to an exemplary embodiment, the same icon as the icon 130 of FIGS. 4 and 5 may be provided in the second message management user interface 500, instead of the character input region 530, for creating a text message. When the user touches this icon, the interface managing unit 1130 activates a character input user interface similar to FIG. 15 to receive a text from the user. The input texts are displayed on the second message management user interface 500 through the processes described above.

The second message management user interface 500 may be configured to further include a dialing function in addition to text message transmission. For example, the second message management user interface 500 may include a dialer graphical user interface 512 as shown in FIG. 17. When the user touches the dialer graphical user interface 512, the interface managing unit 1130 accesses the voice call management part 1200 to dial to the counterpart of the second message managing user interface 500. At this time, since the interface managing unit 1130 transfers the phone number of the counterpart to the voice call management part, the user can immediately make a voice call without separately inputting the phone number of the counterpart. The voice call management part stores the voice call information, e.g., calling time, the recipient, the call connection, the call end time, the total call time, and the like in the memory 1600. The stored voice call information is processed through the message monitoring unit 1110 and the message information managing unit 1120, and is displayed on the second message management user interface 500. As such, the user can directly make a voice call to the counterpart through the second message management user interface 500 without executing the voice call management application. The above described processes for generating and visualizing the voice call information may also be performed for text message transmitted through the second message management user interface 500.

According to an exemplary embodiment of the present invention, the integrated message management part 1100 may provide various additional functions in association with the first and second message management user interfaces 100 and 500, in addition to integrated management of voice call and text message.

The process for each additional function is performed by the additional function process part 1400. The additional function process part 1400 may be a hardware, a software, or a combination of hardware and software configured to provide various additional functions. For example, the additional function process part 1400 may include a software including instructions necessary for processing additional functions, and a processor that performs processes according to the instructions. In this case, the software of the additional function process part 1400 may be installed on the mobile terminal 10 in the form of an application. The additional function process part 1400 may be configured to perform one or more functions. FIGS. 2 and 3 show that the additional function process part 1400 is provided separately from the integrated message information management part 1100. However, inventive concepts are not limited thereto, and some of additional functions may be provided by other element of the integrated message information management part 1100.

When the additional function process part 1400 is separate from the integrated message information management part 1100, the additional function process part 1400 and the integrated message information management part 1100 may be interfaced with one another. According to an exemplary embodiment of the present invention, as shown in FIG. 3, the integrated message management part 1100 may further include an additional function interface 1143, which may interface between the hardware and/or software of the integrated message information management part 1100 and the hardware and/or software of the additional function process part 1400.

According to an exemplary embodiment of the present invention, the integrated message management part 1100 may configured to provide functions, such as memo creating, schedule management, authentication code copy, and customized text message, for the first and second message management user interfaces 500.

Each of the additional functions will be described in detail below.

[Memo Creating Function]

According to an exemplary embodiment of the present invention, the integrated message information management part 1100 may be configured to provide a function of creating a memo during exchanging voice call or text message, and a function of managing the created memo. The memo function may be provided by a memo application, which may be a part of the additional function process part 1400.

Hereinafter, the memo function will be described in detail with reference to FIGS. 19 to 24.

Figure 19:
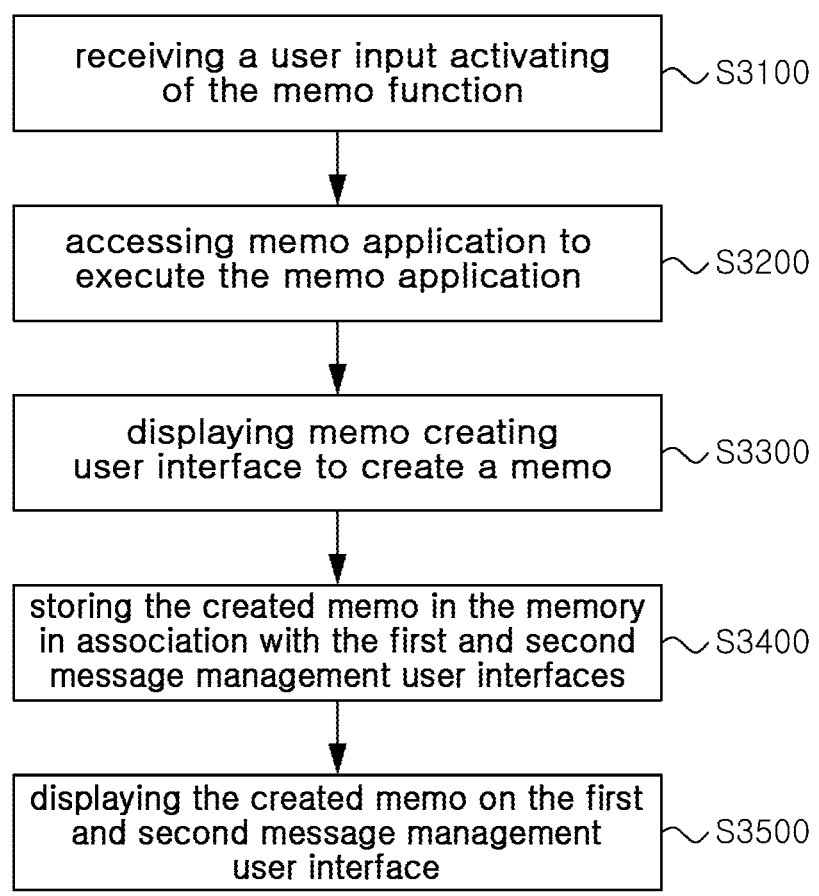
FIG. 19 is a flowchart illustrating a process for providing a memo function according to an exemplary embodiment of the present invention.

FIG. 19 is a flowchart showing a process of providing a memo function according to an exemplary embodiment of the present invention.

Referring to FIG. 19, in step S3100, when a user input activating of the memo function is received, the interface managing unit 1130 accesses the memo application in response thereto and executes the memo application in step S3200. For receiving the user input, the first message management user interface 100 or the second message management user interface 500 may include means for activating the memo function. More particularly, the interface managing unit 1130 generates a graphical user interface, e.g., a memo icon, for activating of the memo application, and displays the graphical user interface on the first message management user interface 100 or the second message management user interface 500.

In step S3300, the interface managing unit 1130 then displays the memo creating user interface provided by the memo application on the mobile terminal 10 to create a memo according to user input. If the memo application is an external application independent of the integrated message information management part 1100, the interface managing unit 1130 accesses the memo application through the additional function interface 1143.

In step S3400, the memo information created by the memo application is stored in the memory 1600 in association with the first and second message management user interfaces 100 and 500. For example, when the user activates the memo function on the second message management user interface 500 and creates a memo, the memo is stored in association with the dialogue managed by the second message management user interface 500. Then, in step S3500, the interface managing unit 1130 displays the created memo on the first and second message management user interfaces 100 and 500. The process of storing the created message in the memory 1600 at step S3400, and the process of displaying on the interface at step S3500 may be performed simultaneously or individually.

Figure 20:
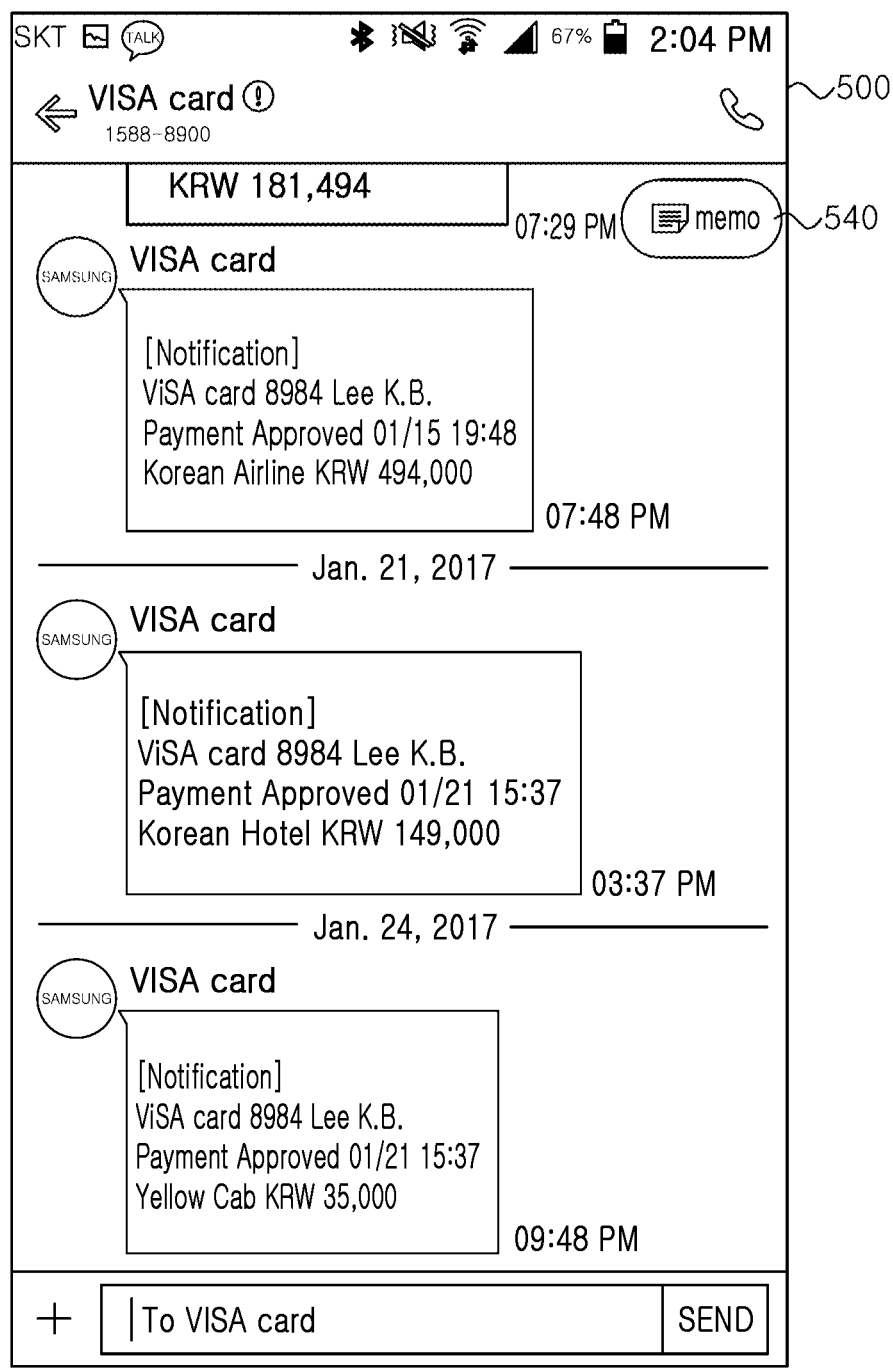
FIG. 20 is a screenshot showing a second message management user interface displaying voice call information and text message information exchanged with a specific conversation partner.

FIG. 20 is a screenshot showing a second message management user interface 500 displaying voice call information and text message information exchanged with a specific party (VISA card). At the top of the second message management user interface 500, a memo activating icon 540 is displayed. When the user touches the memo activating icon 540, the interface managing unit 1130 displays a memo creating interface on the mobile terminal 10. When the memo function is provided by a memo application outside the integrated message information management part 1100, the interface managing unit 1130 accesses the memo application through the additional function interface 1143 to execute the memo application, and displays the memo creating user interface on the mobile terminal 10.

Figure 21:
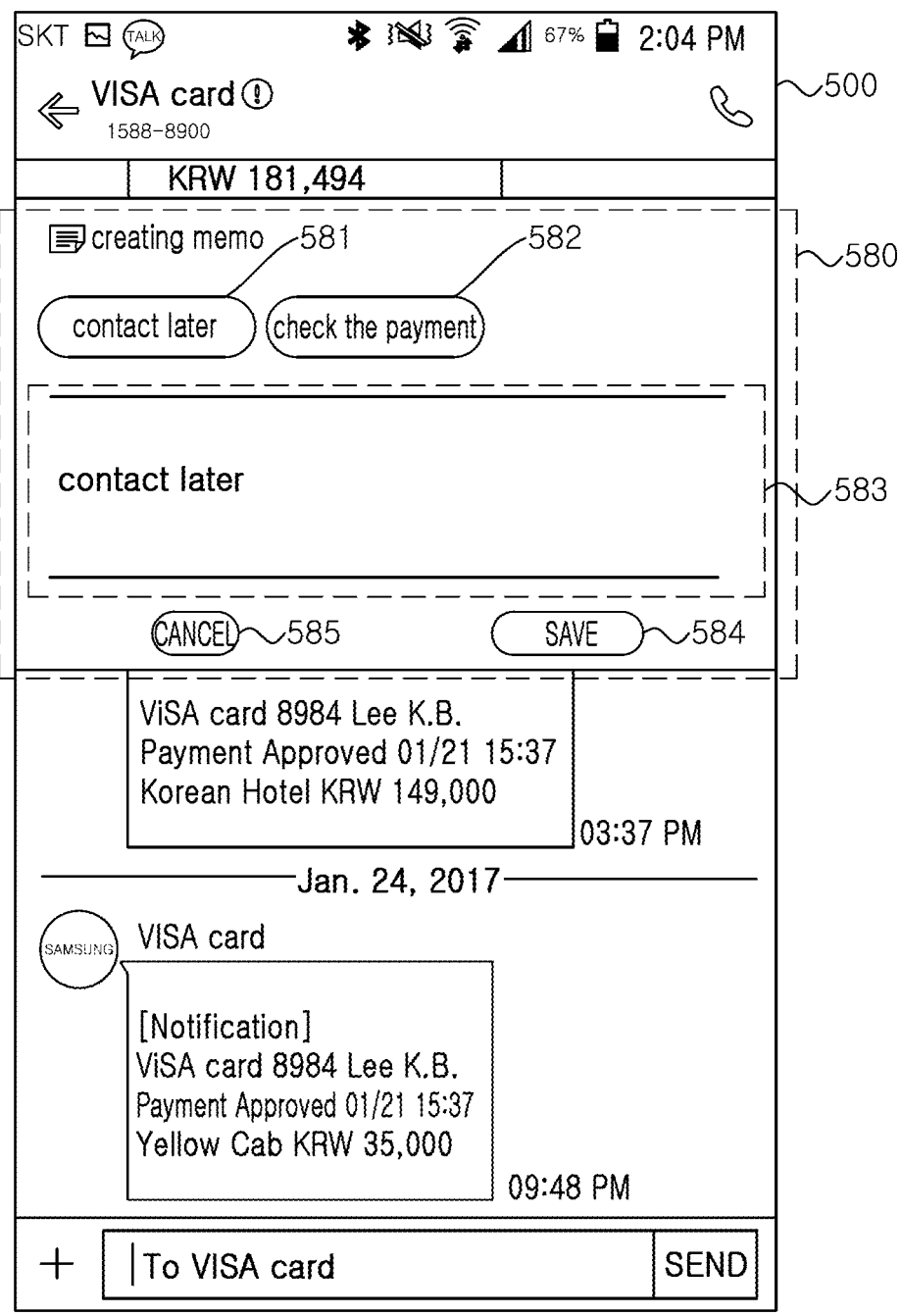
FIG. 21 is a screenshot showing an example of a memo creating user interface provided by the user interface unit.

FIG. 21 is a screenshot showing an example of a memo creating user interface provided by the interface managing unit. Referring to FIG. 21, the memo creating user interface 580 includes a memo input window 583, a shortcut input button 581 and 582, a "CANCEL" button 585, and a "SAVE" button 584.

The shortcut input buttons 581 and 582 are provided for facilitating input of specific phrases frequently used. Each shortcut input button 581 and 582 is associated with a shortcut phrase. In other words, each shortcut phrase may be stored in the memory 1600 in association with one of the shortcut input buttons 581 and 582, respectively. The interface managing unit 1130 retrieves the shortcut phrases stored in association with the selected buttons 581 and 582 from the memory 1600, and insert the shortcut phrases into the input window 583 in response to user touch of the shortcut input buttons 581 and 582. The selected shortcut phrase is displayed on the shortcut input button such that the user may view each phrase. For example, if the user touches the "contact later" button 581 of FIG. 21, the interface managing unit reads out the shortcut phrase "contact later" stored in association with this button from the memory 1600. The number and shortcut phrases of the shortcut buttons may be set by the user or the integrated message management service server 20. For example, the user may edit a shortcut phrase pre-assigned to a shortcut input button, or may add additional shortcut input button for other phrases frequently used by the user. Such changing configurations of the shortcut button may be performed by the integrated message management service server 20.

The memo creating application supports memo creation using the input window 583.

Figure 22:
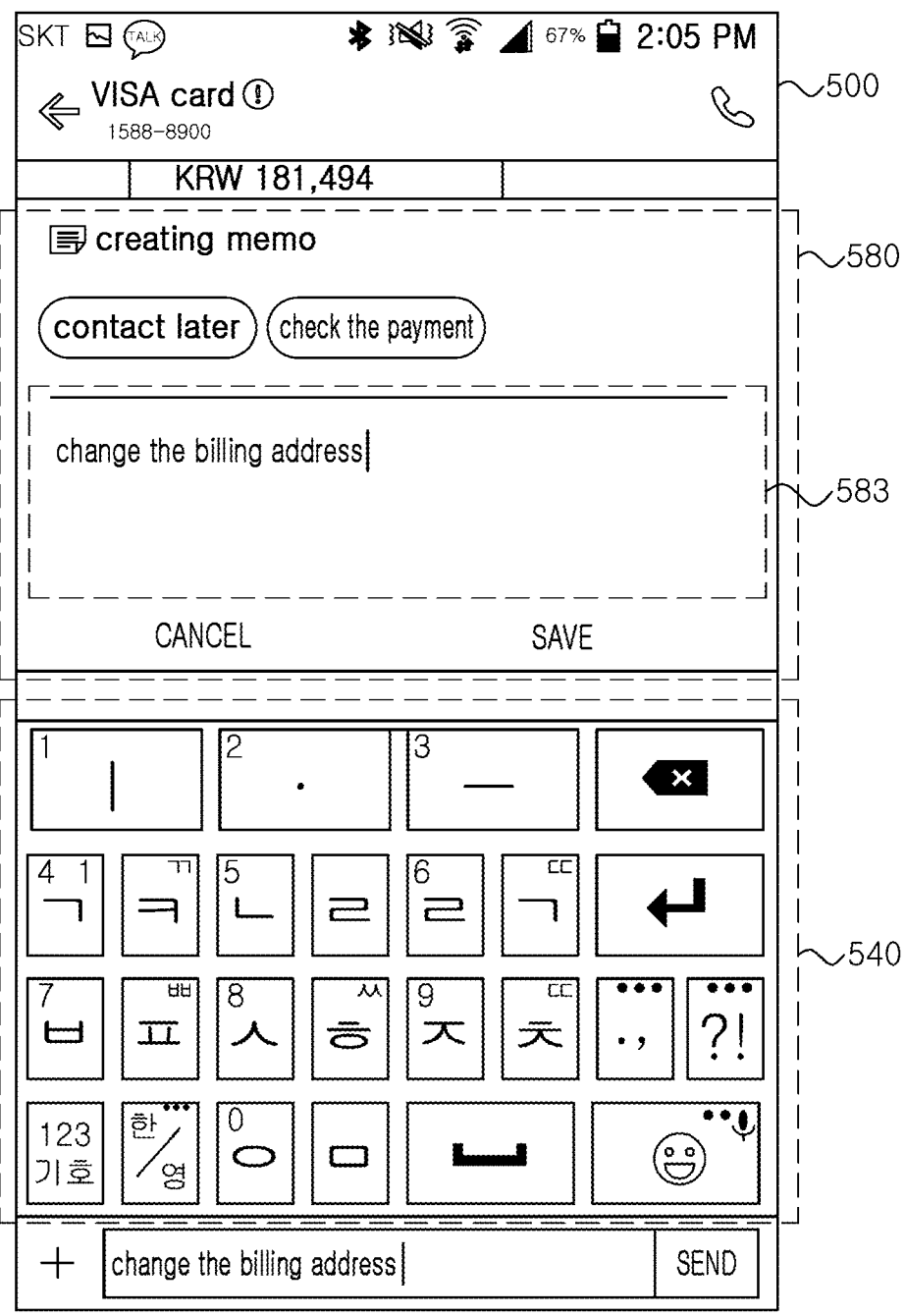
FIG. 22 is a screenshot showing an example in which a character input interface is provided by a memo creating user interface.

FIG. 22 is a screenshot showing an example of creating a memo through the input window 583. When the user's input is received, such as when the user touches the input window 583, the interface managing unit 1130 activates a keypad interface 540 for character input. Subsequently, the interface managing unit 1130 displays the character string input by the user through the keypad interface 540 in the character input window 583. In the example of FIG. 22, the "change the billing address" input by the user through the keypad interface 540 is displayed on the input display window 583.

When the user completes the memo creation through the memo creation interface, and touches the "SAVE" button 584 (see FIG. 21), the interface managing unit 1130 displays the created memo on the second message management user interface 500. The memo may be provided to the second message management user interface 500 in various forms. For example, the interface managing unit 1130 may create a separate object displaying the contents of the created memo and insert the object into the second message management user interface 500. As another example, the interface managing unit 1130 may generate a speech bubble for the created memo and display it on the second message management user interface 500. As another alternative, the interface managing unit 1130 may create a graphical user interface (e.g., a memo file icon), which can load the created memo, and insert the graphical user interface into the second message management user interface 500.

Figure 23:
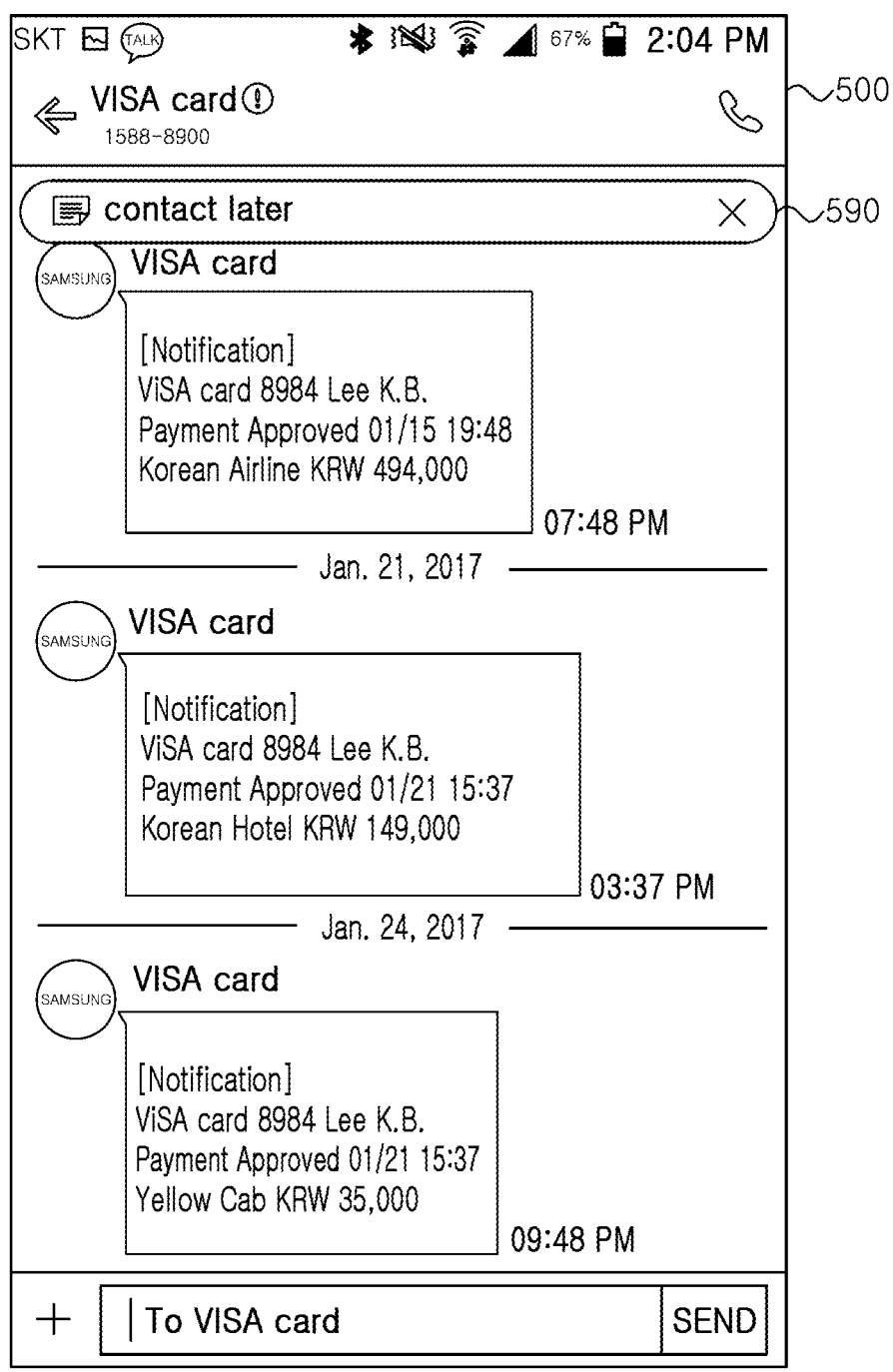
FIG. 23 is a screenshot of the second message management user interface displaying the memo created by the shortcut button of FIG. 21.
Figure 24:
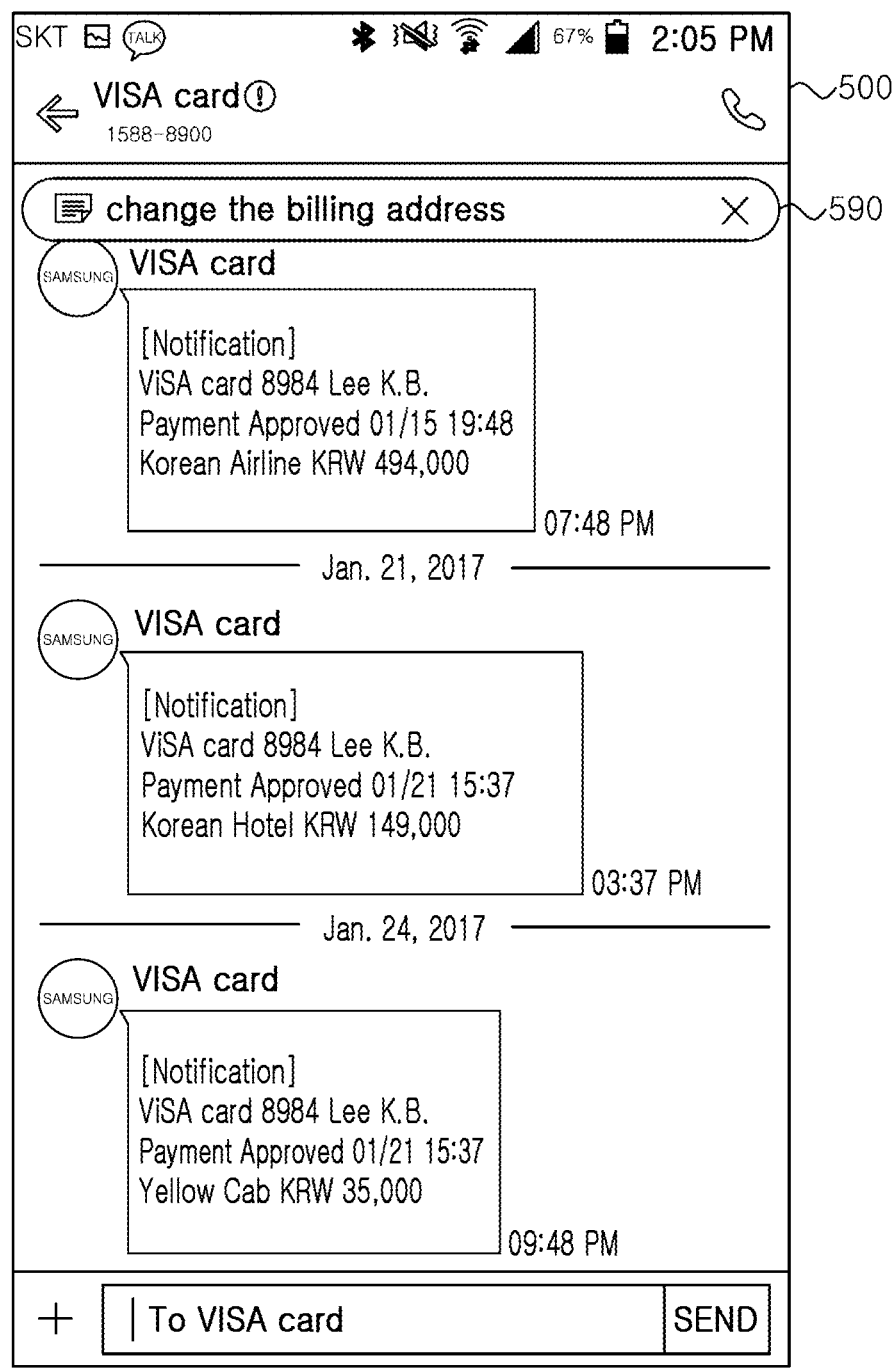
FIG. 24 is a screenshot of the second message management user interface displaying a memo created by the character input interface of FIG. 22.

FIG. 23 is a screenshot of the second message management user interface 500 displaying a memo object created by the shortcut input button 581, FIG. 24 is a screenshot of the second message management user interface 500 displaying a memo object created using the input window 583.

The interface managing unit 1130 stores the created memo in the memory 1600 in association with the counterpart (or recipient) of the second message management user interface 500 where the memo was created. For example, in the example of FIGS. 21 to 24, the memo is created on the second message management user interface 500 for a counterpart VISA card. As such, the created memo is indexed and stored in association with VISA card. Accordingly, when the second message management user interface 500 for the VISA card is activated, memos stored in association with this index can retrieved and displayed.

According to an exemplary embodiment of the present invention, the integrated message management part 1100 may be configured to automatically create a memo with respect to the integrated message information having a specific attribute, and to display it on the first and second message management user interfaces 100 and 500. For example, the integrated message information management part 1100 may be configured to automatically create a memo for failed incoming/outgoing voice calls and display the memo on the first and second message management user interfaces 100 and 500. The integrated message information about incoming voice call received while the user is absent or while other voice call is connected, includes information indicating that the call connection has failed. Similarly, the integrated message information regarding the outgoing voice call that is not connected, for example, due to the absence of the recipient or the recipient's rejection, includes information indicating that the call connection has failed.

When the integrated message information having the attribute of 'incoming/outgoing voice call failed in connection' is generated, the interface managing unit 1130 executes the memo application automatically without a user intervention to create a memo. The contents of the automatically generated memo may be set in advance by the user or the integrated message management service server 20. For example, phrases such as "make a call again" and "return a call" may be provided by default. The memo may be created so as to further include counterpart information of the failed voice call, for example, in a form such as "make a return call to XXX" may be provided for the first message management user interface 100. The automatically generated memo may be stored in association with the counterpart information included in the voice call information, and may be provided on the second message management user interface 500. The automatic creation of memo may be performed in the background. That is, when failed voice call information is received from the voice call management part 1200, the interface managing unit 1130 creates and stores a memo using the memo application in the background, regardless of whether the integrated message information management application is executed, and then displays the created memo on the first and second message management user interfaces 100 and 500 when the integrated message information management application is executed.

[Schedule Management Function]

According to an exemplary embodiment of the present invention, the integrated message information management part 1100 may be configured to provide a function of managing user schedule information during voice call or text message exchange. The management of the user schedule information is performed by the schedule information management application, which is a part of the additional function process part 1400.

Hereinafter, the schedule management function will be described in detail with reference to FIG. 25 to FIG. 29.

Figure 25:
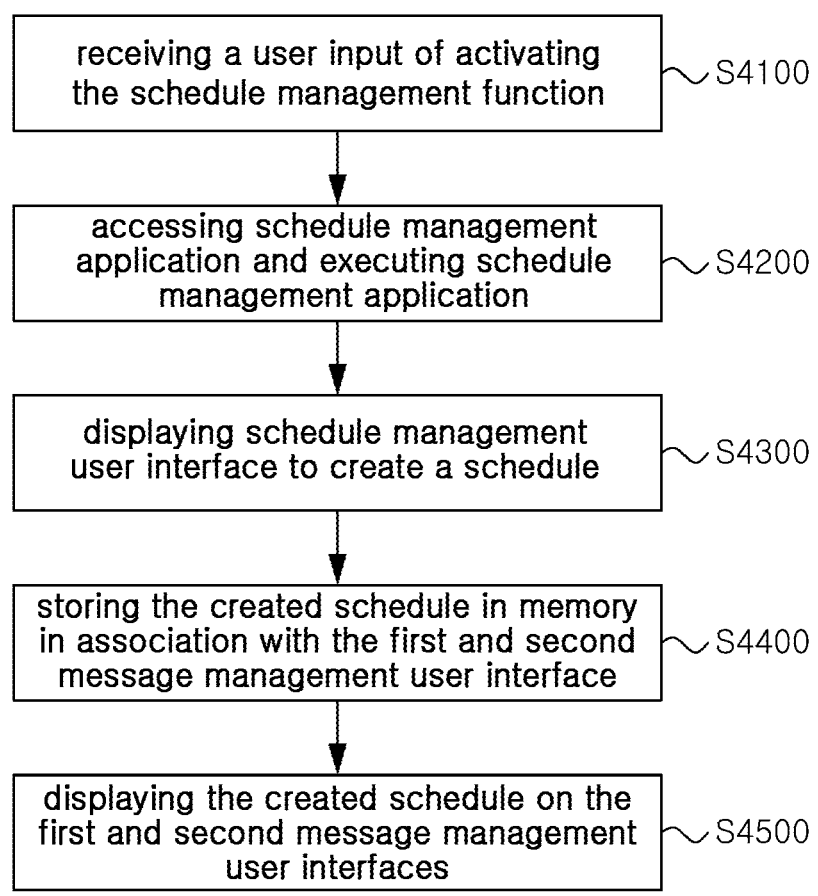
FIG. 25 is a flowchart illustrating a process for providing a schedule management function according to an exemplary embodiment of the present invention.

FIG. 25 is a flowchart illustrating a process for providing a schedule management function according to an exemplary embodiment of the present invention.

Referring to FIG. 25, in step S4100, when a user input of activating the schedule management function is received, in step S4200, the interface managing unit 1130 accesses the schedule management application and executes the schedule management application. The first message management user interface 100 or the second message management user interface 500 may include an icon or a button for activating the schedule management function. For example, the interface managing unit 1130 may generate a user interface, such as a scheduler icon on the first message management user interface 100 or the second message management user interface 500. The scheduler icon is associated with activating a schedule management application for providing the schedule management function inside or outside the integrated message information management part 1100.

Then, in step S4300, the interface managing unit 1130 displays the schedule management user interface, which is provided by the schedule management application, on the mobile terminal 10 to create a schedule according to user input. At this time, when the schedule management application is an external application independent of the integrated message information management part 1100, the interface managing unit 1130 accesses the schedule management application via the additional function interface 1143.

The user can create a schedule or retrieve the stored schedule to edit or delete the schedule through the schedule management user interface.

In step S4400, the schedule information created through the schedule management application is stored in the memory 1600 in association with the first and second message management user interfaces 100 and 500. For example, when the user activates the schedule management function on the second message management user interface 500 and creates a schedule, the schedule is stored in association with the counterpart of the second message management user interface 500. In step S4500, the interface managing unit 1130 displays the created schedule information on the first and second message management user interfaces 100 and 500. The process of storing the created schedule information in the memory 1600 at step S4400, and the process of displaying on the user interface at step S4500 may be performed simultaneously or independently.

Figure 26:
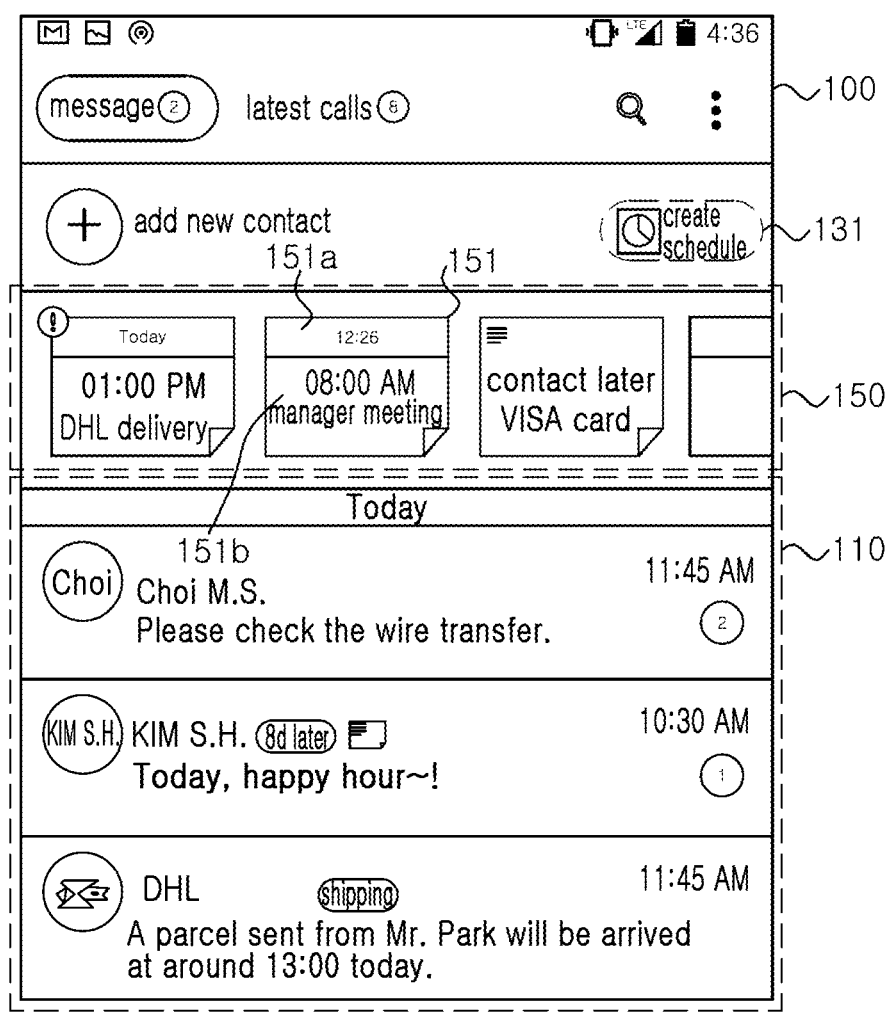
FIG. 26 is a screenshot showing a first message management user interface in which the schedule management function is executed.
Figure 27:
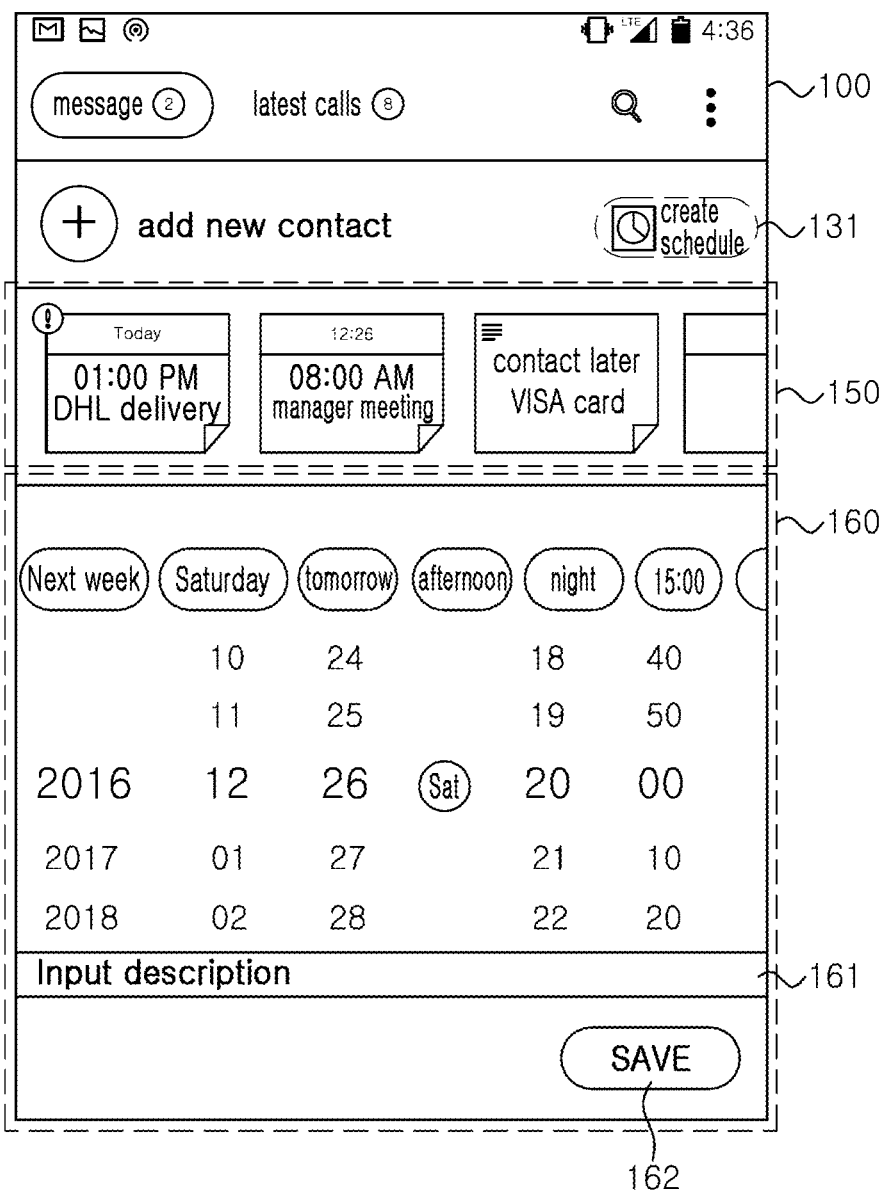
FIG. 27 is a screenshot illustrating a schedule management user interface provided on the first message management user interface.

FIG. 26 is a screenshot illustrating a first message management user interface 100 including a scheduler icon, and FIG. 27 is a screenshot illustrating a schedule management user interface provided on the first message management user interface 100.

The first message management user interface 100 of FIG. 26 includes a first event panel 150 and a scheduler icon 131, in addition to the configuration of FIG. 4. When the user selects the scheduler icon 131, the interface managing unit 1130 executes the schedule information management application through the additional function interface 1143 and, as in the example shown in FIG. 27, displays the schedule management user interface 160 on the first message management user interface 100. The schedule management user interface 160 includes a time input user interface, a detailed description input window 161, a graphical user interface for generating schedule information, and a save button 162. The user can create a new schedule through the schedule management user interface 160, retrieve the created schedule, modify or delete the schedule. For example, when the user selects the date and time through the time input user interface, inputs the detailed description of the schedule through the detailed description input window 16, and then touches the "save" button 162, a schedule information including the selected date and detailed description is generated and stored.

The interface managing unit 1130 stores the created schedule information and displays the schedule information on the first message management user interface 100. For example, the interface managing unit 1130 may be configured to generate a message block for the created schedule information, and display the message block on the first message management user interface 100. At this time, the process of generating the message blocks 111 and 112 including the schedule information is performed in substantially the same manner as the process of generating the message blocks 111 and 112 described above. As another example, the interface managing unit 1130 may be configured to generate a graphic user interface (e.g., an icon, including a link for access to the contents of the schedule information) and display the generated graphic user interface on the first message management user interface 100.

[Event Panel]

According to an exemplary embodiment of the present invention, the first message management user interface 100 may further include a first event panel 150 for displaying user schedule information managed by the schedule information management application. The first message management user interface 100 shown in FIG. 27 includes a first event panel 150 that displays information related to a user's schedule as a graphic object, such as a form of a card. Referring to FIG. 27, the first event panel 150 is provided in the upper area of the first message management user interface 100, and the first event panel 150 includes a plurality of schedule cards 151, each of which displays information on a schedule.

In order to provide the first event panel 150, the integrated message information management part 1100 may be configured to receive the user schedule information from the schedule information management application, and to reconstruct the received schedule information into a predetermined format. For example, the schedule information of a user may include entries, such as a start date and time, an end date and time of a scheduled task, a place, a related person, and description of the schedule. The integrated message management part 1100 may be configured to generate summary information only for some of these entries.

Figure 28:
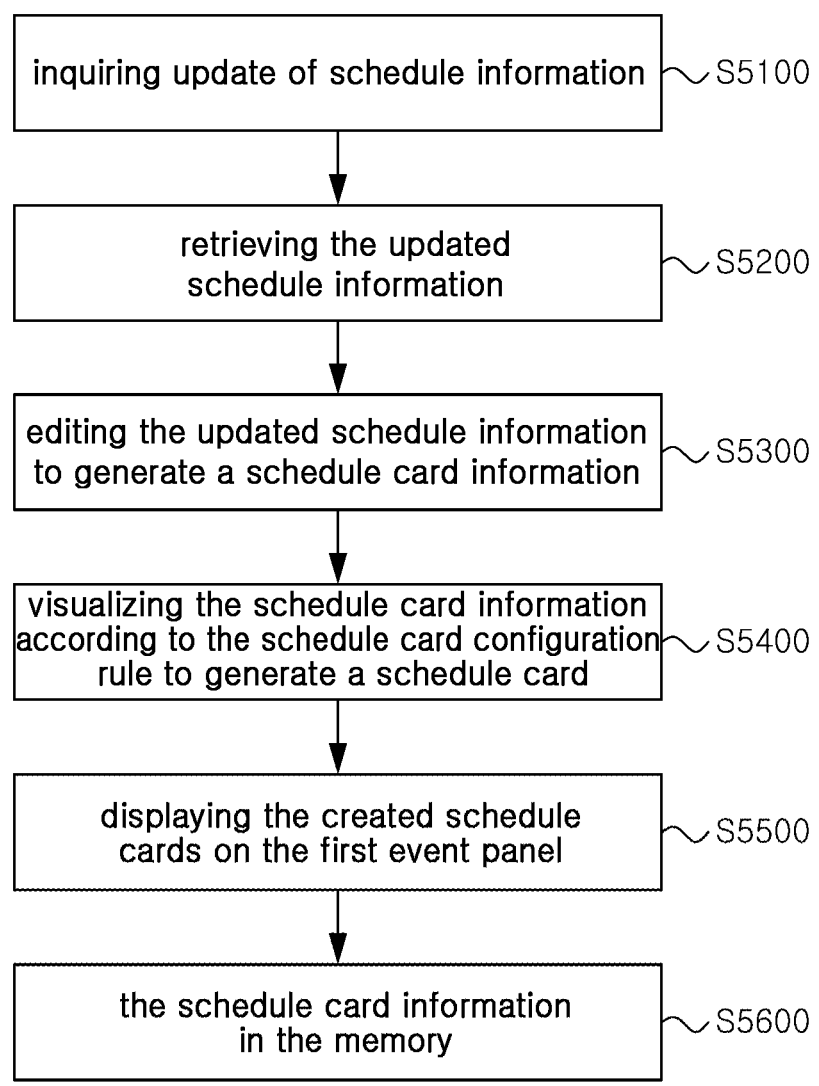
FIG. 28 is a flowchart illustrating a process for generating a first event panel according to an exemplary embodiment of the present invention.

FIG. 28 is a flowchart illustrating processes for providing a first event panel according to an exemplary embodiment of the present invention.

Referring to FIG. 28, in step S5100, the message monitoring unit inquires whether the schedule information created by the schedule management application is updated. The schedule information update inquiry process of step S5100 of the message monitoring unit may be performed at the time when the first message management user interface 100 is activated or in real-time (e.g., immediately after schedule information is generated by the schedule management application).

If an update of the schedule information is detected in the schedule information update inquiry step S5100, in step S5200, the message managing unit 1120 retrieves the updated schedule information, and in step S5300, edits the updated schedule information according to the schedule card information format. The schedule card information format defines entries to be displayed on a schedule card and notation of entries. For example, the schedule card information format specifies the date in the form of "MM.DD.", time the in form "hh:mm AM (or PM)", and headline in the form of full text of the title of the schedule, as display entries. In this case, the message managing unit 1120 extracts only the entries defined by the schedule card information format from the schedule information, and edits the entries according to the display format defined in the schedule card information format to generate the schedule card information.

In the above description, the generation of the schedule card information is performed by the message managing unit 1120. However, the inventive concepts are not limited thereto, and all or a part of such processes may be performed by the interface managing unit 1130.

Then, in step S5400, the interface managing unit 1130 visualizes the schedule card information according to the schedule card configuration rule to generate a schedule card. In step S5500, the interface managing unit 1130 arranges and displays the created schedule cards on the first event panel 150 according to a schedule card configuration rule. The schedule card configuration rule regulates display form of the schedule card information. For example, the schedule card configuration rules may be defined as follows: 1) the schedule card information is displayed on a card-shaped image divided into a small block at the top and a large block at the bottom; 2) the date is displayed in a small block, and time and title are placed in the large block; 3) the scheduled time is displayed using a large font; and 4) the title is displayed using a small font under the time. The interface managing unit 1130 processes and visualizes each entry of schedule card information according to the configuration rule as described above, and displays the result on the first event panel 150 of the first message management user interface 100.

The schedule card may include a link for access to details of the schedule information. In response to a user input, such as touching a certain schedule card, the interface managing unit 1130 accesses a schedule management application to retrieve detailed schedule information corresponding to the selected schedule card, and displays the detailed schedule information on the mobile terminal 10.

FIG. 26 illustrates the first event panel 150 including a schedule card 151 generated according to the above-described schedule card information format and schedule card configuration rules.

In the first event panel 150, a schedule card 151 generated according to a schedule card information format and a schedule card configuration rule is displayed. In the example of FIG. 26, according to the above-exemplified schedule card information format and the schedule card configuration rule, the date "12:26" is inserted into the upper small block 151a, the time "08:00 AM" is displayed in the lower large block 151b using large fonts, and the title "manager meeting" is displayed under the time "08:00 AM" in the lower large block using small fonts.

In step S5600, the schedule card information generated by the message managing unit 1120 may be stored in the memory 1600. The process of storing the schedule card information at step S5600 may be performed simultaneously with the schedule card generating process S5400 or the displaying process S5500 of the schedule card, or independently.

The schedule card information format and the schedule card configuration rule may be changed according to the user setting. That is, the user can change at least one of the entries and the display format of the schedule information card. The processes for reconstructing the schedule card according to the change of schedule card information format and the schedule card configuration rule may be performed in a substantially similar manner to the above described reconstruction process for the message block 111 and 112 according to changing the integrated message block format.

The plurality of schedule cards 151 displayed on the first event panel 150 may be arranged based on time included in the schedule information. That is, the interface managing unit 1130 may arrange the schedule card 151 so that the most up-to-date schedule is placed at the front-most of the first event panel 150. The first event panel 150 may be configured to explore schedule cards 151 in response to a user input, such as sweeping or scrolling the currently displayed schedule cards 151.

The schedule card 151 may be generated so as to be identifiable from each other based on the attributes of the schedule. For example, the schedule information may include information indicating the importance of the schedule. In this case, the interface managing unit 1130 may be configured to set the color of the card or the color of the characters differently based on the degree of importance. Such a configuration may be defined in a schedule card configuration rule.

Figure 29:
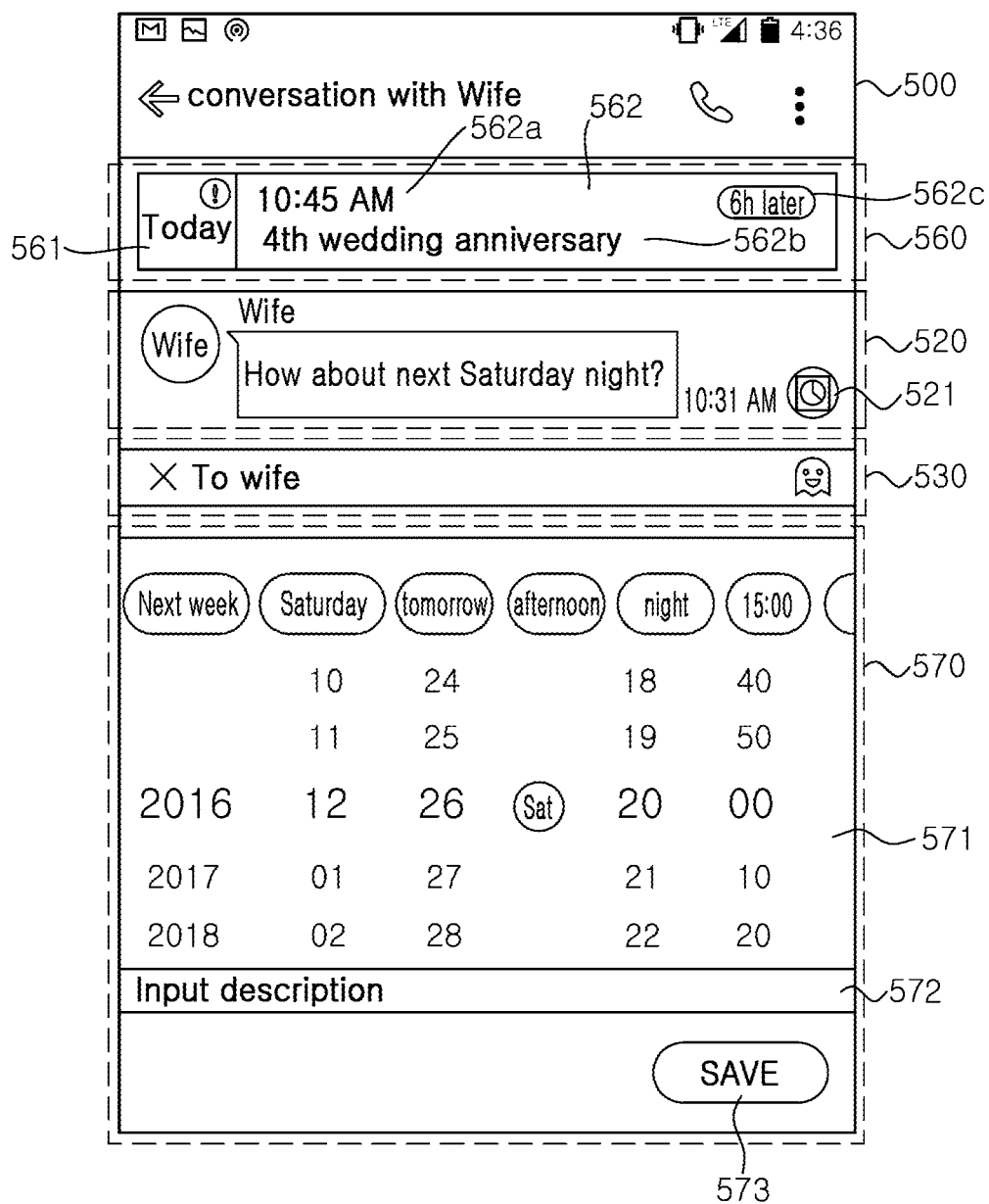
FIG. 29 is a screenshot illustrating a second message management user interface in which the schedule management function is executed.

FIG. 29 is a screenshot showing a second message management user interface 500 having the schedule management function activated. The process of activating the schedule management function on the second message management user interface 500 is performed in substantially the same manner as the process of providing the schedule management function on the first message management user interface 100 described above.

Similar to the configuration of the second message management user interface 500 shown in FIG. 27, the second message management user interface 500 of FIG. 29 includes a second event panel 560 and a scheduler icon 521. When a user touches the scheduler icon 521, the interface managing unit 1130 accesses the schedule information management application via the additional function interface 1143 to provide a schedule management user interface 570 on the second message management user interface 500. The schedule management user interface 570 includes a time input user interface 571, a detailed description input window 572, and a graphical user interface 573 ("save" button) for generating schedule information. The user can create a new schedule through the schedule management user interface 570 or retrieve the schedule for modification or deletion. For example, when the user selects the date and time through the time input user interface 571, inputs the detailed description of the schedule through the detailed description input window 572, and then touches the "save" button 573, a schedule information including the selected date and the description is generated and stored.

The schedule information are stored in the memory 1600 in association with the counterpart of the second message management user interface 500. More specifically, when the user activates the schedule management function on the second message management user interface 500, and creates the schedule information, the created schedule information is stored in association with the dialogue (voice call information and text message information) managed by the second message management user interface 500. The interface managing unit 1130 displays the created schedule information on the second message management user interface 500.

For example, the interface managing unit 1130 may be configured to generate a dialogue box including the created schedule information, and display the dialogue box on the second message management user interface 500. At this time, the process of generating the dialogue box including the schedule information is performed in substantially the same manner as the process of visualizing the dialogue information in the second message management user interface 500. As another example, the interface managing unit 1130 may be configured to generate a graphic user interface (e.g., an icon) including a link for access to the contents of the schedule information, and to display the generated graphic user interface on the second message management user interface 500.

As described above, the second message management user interface 500 may include the second event panel 560 for displaying a user schedule information managed by the schedule information management application. As shown in FIG. 29, the second event panel 560 may be configured to display only the earliest arriving schedule among the schedule associated with the counterpart of the second message management user interface 500.

Figure 30:
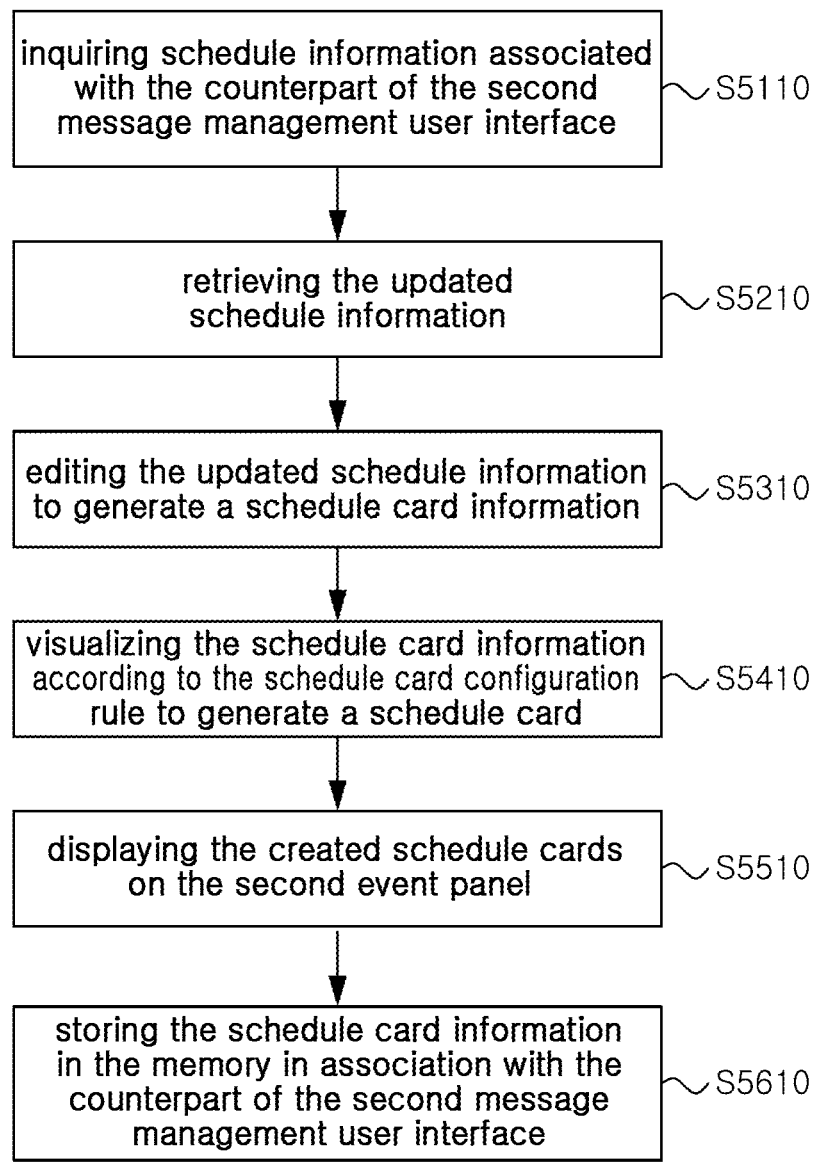
FIG. 30 is a flowchart illustrating a process for providing a second event panel according to an exemplary embodiment of the present invention.
Figure 31:
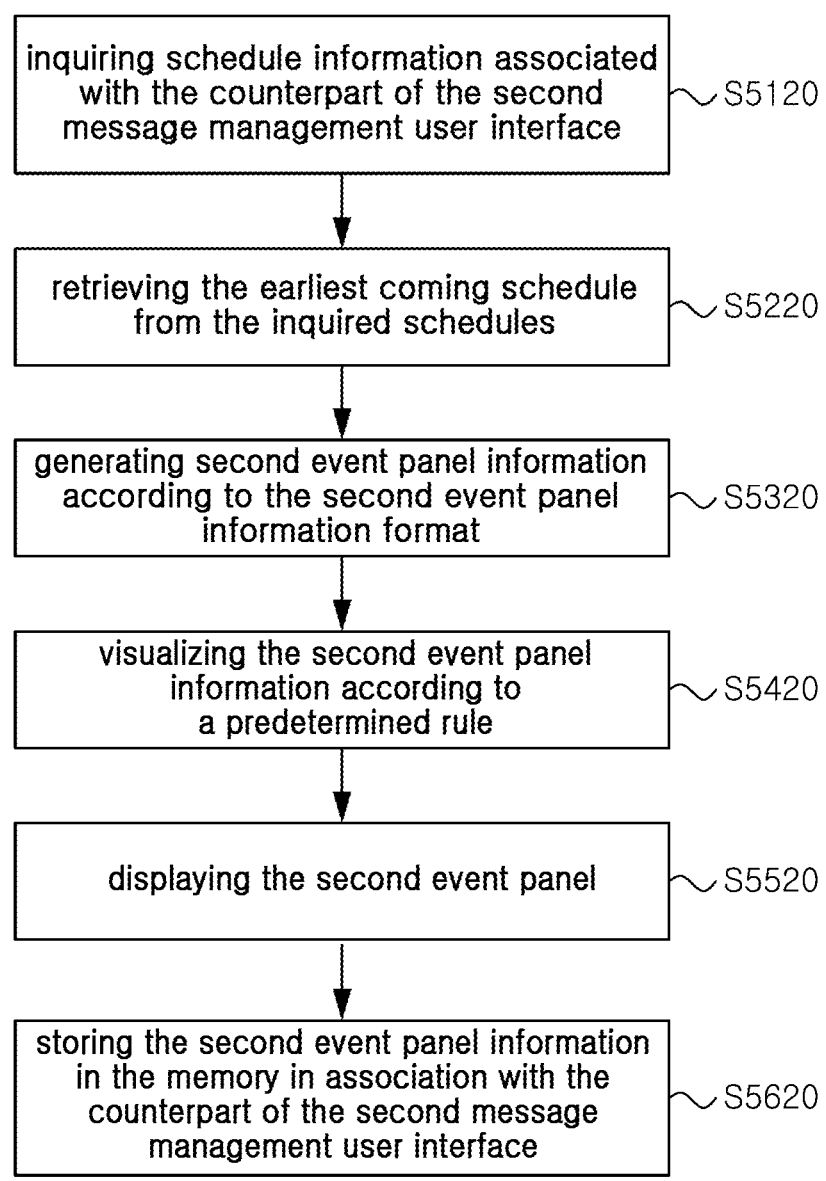
FIG. 31 is a flowchart illustrating a process for providing a second event panel according to another exemplary embodiment of the present invention.

FIG. 30 is a flowchart illustrating an example of processes for providing a second event panel, and FIG. 31 is a flowchart showing another example of processes for providing a second event panel.

Referring to FIG. 30, in step S5110, the interface managing unit 1130 inquires schedule information associated with the counterpart of the second message management user interface 500. Here, the counterpart refers to the other party of the conversations (voice calls and text messages) displayed on the second message management user interface 500. The schedule information associated with the counterpart refers to schedule information created on the second message management user interface 500 related to the conversation with the counterpart. Even if the schedule information is not created on the second message management user interface 500, if identification information (e.g., related person tag) specifying the counterpart is inserted into the schedule information, it may be considered as schedule information associated with the counterpart. The step S5110 of making an inquiry processing of the schedule information associated with the counterpart may be performed at the activation of the second message management user interface 500 or may be performed in real-time (e.g., immediately after schedule information is generated by the schedule management application).

The process performed after the step S110 may depend on the configuration of the second message management user interface 500.

For example, when the second event panel 560 of the second message management user interface 500 has the same configuration as the first event panel 150 of FIG. 26 (e.g., including a plurality of schedule cards), substantially the same processes as steps S5120 to S5510 of FIG. 30 may be performed. In other words, the integrated message information management part 1100 performs substantially the same processes as the steps of S5200 to S5500 shown in FIG. 28, with respect to the schedule information associated with the counterpart identified at S5100. In step S5610, the created schedule card information is stored in the memory 1600 in association with the counterpart of the second message management user interface 500. In this case, the configuration and features of the second event panel 560 and schedule cards are substantially the same as those of the first event panel 150 and the schedule cards described above with reference to FIG. 26.

When the second event panel 560 has a configuration shown in FIG. 29, the processes after S5110 are performed as shown in FIG. 31.

In step S5220, when the schedule information associated with the counterpart of the second message management user interface 500 is inquired at the step S5120, the message managing unit 1120 retrieves the earliest coming schedule from the inquired schedules, and in step S5320, generates second event panel information according to the second event panel information format. The second event panel information format defines entries to be displayed on a second event panel 560 and notation of entries. For example, in the second event panel information format, a scheduled date in the form of "MM. DD", scheduled time in the form of "hh:mm AM (or PM)", a headline in the form of full text or title of the schedule, and remaining time until scheduled time in the form of "n days later", "n hours later", or "n minutes later" are specified as display entries. In this case, the message managing unit 1120 extracts only the entry defined by the second event panel information format from the schedule information, and edits it according to the second event panel information format to generate the second event panel information.

In the above description, the generation of the second event panel information is described as being performed by the message managing unit 1120. However, the inventive concepts are not limited thereto, and all or a part of such processes may be performed by the interface managing unit 1130.

Then, in step S5420, the interface managing unit 1130 visualizes the second event panel information according to a predetermined rule to generate a second event panel 560 including the visualized second event panel information, and in step S5520, displays the second event panel 560 on the message management user interface 500. The second event panel configuration rule may define display form of the second event panel information generated by the message managing unit 1120. For example, the second event panel configuration rule may define whether: 1) the second event panel information is displayed on a card-shaped image (schedule card) divided into a small block and a large block in the horizontal direction; 2) the scheduled date is displayed in the left small block, and the scheduled time, and the headline and the remaining time are displayed on the right large block; 3) the scheduled time is displayed using large fonts; 4) headline is displayed under the scheduled time using small fonts; and 5) the remaining time is inserted into an elliptical image located at the upper right of the large block. The interface managing unit 1130 processes and visualizes each entry of the second event panel information according to the above-described configuration rule, and displays the generated second event panel on the second message management user interface 500.

FIG. 29 shows a second message management user interface 500 in which a second event panel 560 is generated according to the above-described second event panel information format and the second event panel configuration rule.

The second event panel 560 displays schedule card created according to the second event panel information format and the second event panel configuration rule. In the example of FIG. 29, according to the above-described second event panel information format and second event panel configuration rule, the scheduled date "Today" is inserted into the left small block 561, the scheduled time "10:45 AM" 562a is displayed on the left side of the right large block 562 using large fonts, the headline entry "4th wedding anniversary" 562b is placed below the scheduled time 562a in the large block 562, and the remaining time "6 h later" 562c is displayed into an elliptical image at the upper right of the large block 562.

In step S5620, the second event panel information generated by the message managing unit 1120 or the second event panel generated by the interface managing unit 1130 may be stored in the memory 1600 in association with the counterpart of the second message management user interface 500. The process of storing the second event panel information at step S5620 may be performed at the same time as the generation process of the second event panel S5420 or the display process of the second event panel S5520, or independently.

The second event panel information format and the second event panel configuration rule may be changed according to the user setting. That is, the user can change at least one of an entry, a display format, and an arrangement of information to be displayed on the second event panel card. The processes for reconstructing second event panel 560 according to the changes of the second event panel information format and the second event panel construction rule may be performed in a substantially similar manner to the above described reconstruction process for the message block 111 and 112 according to changing the integrated message block format.

The interface managing unit 1130 may display the schedule information created through the second message management user interface 500 on the first event panel 150 of the first message management user interface 100. Accordingly, the schedule information created on the second message management user interface 500 may be displayed on both the first event panel 150 of the first message management user interface 100 and the second event panel 560 of the second message management user interface 500.

According to an exemplary embodiment of the present invention, the integrated message information management part 1100 may be configured to display information on the memo created by the memo application on the first event panel 150 and the second event panel 560.

Figure 32:
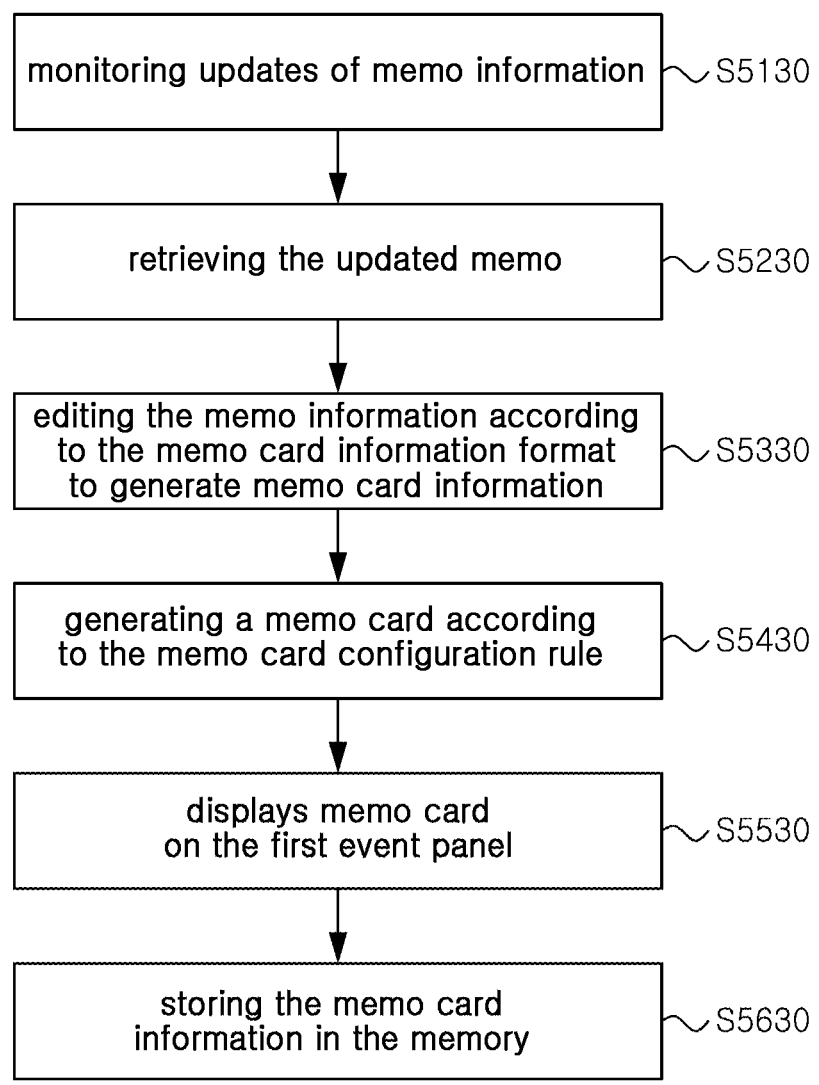
FIG. 32 is a flowchart illustrating a process for generating a memo card according to an exemplary embodiment of the present invention.

FIG. 32 is a flowchart showing processes for generating a memo card according to an exemplary embodiment of the present invention.

Referring to FIG. 32, in step S5130, the message monitoring unit 1110 monitors whether the memo information created by the memo application is updated. In particular, the message monitoring unit 1110 monitors whether any memos are a newly created memo by the memo application. The process of monitoring the update of the memo information at step S5130 may be performed at the time of activation of the first message management user interface 100 or in real-time (e.g., immediately after the memo information is generated by the memo application).

If the updated memo information is detected in the step S5130, in step S5230, the message managing unit 1120 retrieves the updated memo information, and edits the memo information according to the memo card information format to generate memo card information at step S5330. The memo card information format defines entries to be displayed on the memo card and notation of the entries. For example, memo card information format may specify a memo content and a related person as display entries, and define that the memo content shows only first 12 characters of the created memo and that the related person entry has full text of the name of the counterpart. When the memo is created on the second message management user interface 500, the related person is the counterpart of the second message management user interface 500. Even if the memo is not created on the second message management user interface 500, if the identification information (e.g., related person tag) specifies the related person of the memo, the related person may be associated with the memo. The message managing unit 1120 extracts only entries defined by the memo card information format from the memo information, and edits the extracted memo card information according to the memo card information format to generate memo card information.

In the above description, the generation of the memo card information is described as being performed by the message managing unit 1120, however, the inventive concepts are not limited thereto, and all or some of such processes may be performed by the interface managing unit 1130.

Then, in step S5430, the interface managing unit 1130 visualizes the memo card information according to the memo card configuration rule to create a memo card including the memo card information, and displays it on the first event panel at step S5530. The memo card configuration rule defines how to arrange and visualize the memo card information. For example, the memo card configuration rule may define that: 1) the memo card information is displayed on an image of a memo pad; 2) the memo content of the memo card information is displayed in the center of the card using large fonts; and 3) related person is displayed below the memo content entry using small fonts. The interface managing unit 1130 processes and visualizes each entry of memo card information according to the above configuration rule, and displays the result on the first event panel 150 of the first message management user interface 100.

Although the above description has been made with respect to the example in which the memo card is provided in the first event panel 150, the memo card may also be provided in the second event panel 560. At this time, the step of inquiring whether to update the memo information at S5130 is performed only for the memo associated with the counterpart of the second message management user interface 500.

Figure 33:
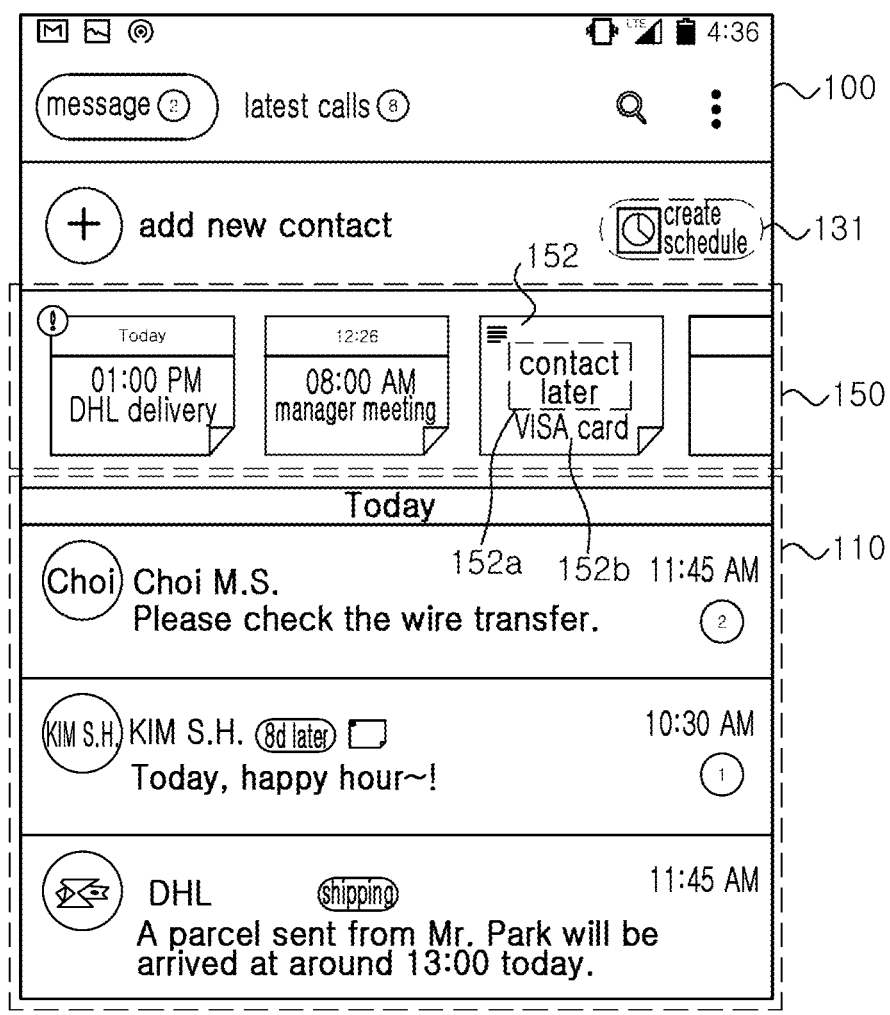
FIG. 33 is a screenshot illustrating an example of the memo card displayed on the first event panel.

FIG. 33 shows a first event panel 150 in which a memo card 152 generated according to the memo card information format and memo card configuration rule is displayed.

In the first event panel 150, a memo card 152 created according to a memo card information format and a memo card configuration rule is displayed. In FIG. 33, in accordance with the above-described memo card information format and the memo card configuration rule, the memo contents "contact later" corresponding to the first eleven letters of the memo is displayed at the center of the memo pad image using large fonts, and the related person "VISA card" is displayed under the memo content entry using small fonts.

In step S5630, the memo card information generated by the message managing unit 1120 or the memo card generated by the interface managing unit 1130 is stored in the memory 1600. The process of storing memo card information at step S5630 may be performed simultaneously with the memo card information generation process at step S5430 or the memo card display process at step S5430, or independently.

The memo card information format and the memo card configuration rule may be changed according to the user setting. That is, the user can change at least one of the entry, a display form, and an arrangement of information to be displayed on the memo card. The processes for reconstructing the memo card according to the change of the memo card information format and the memo card configuration rule may be performed in a substantially similar manner to the above described reconstruction process for the message block 111 and 112 according to changing the integrated message block format.

The memo card may have a different color from that of the schedule card. In addition, when a schedule card and a memo card are simultaneously displayed on the event panel, the arrangement order may be determined in various ways. For example, the arrangement order may be determined by comparing the date and time of the schedule included in the schedule card with the time when the memo card was created.

The user may select a schedule card or a memo card displayed on the event panel through a user input (for example, touch input) to see detailed information of the corresponding schedule or memo, or to perform additional operations, such as modification or deletion. In other words, the interface managing unit 1130 may be configured to receive the user selection of a schedule card or a memo card, and activate a schedule information management application or a memo application for providing detailed information on the selected schedule or memo.

According to an exemplary embodiment of the present invention, the interface managing unit 1130 may be configured to determine a text message having a specific purpose, and to automatically generate a message card for the corresponding message.

Figure 34:
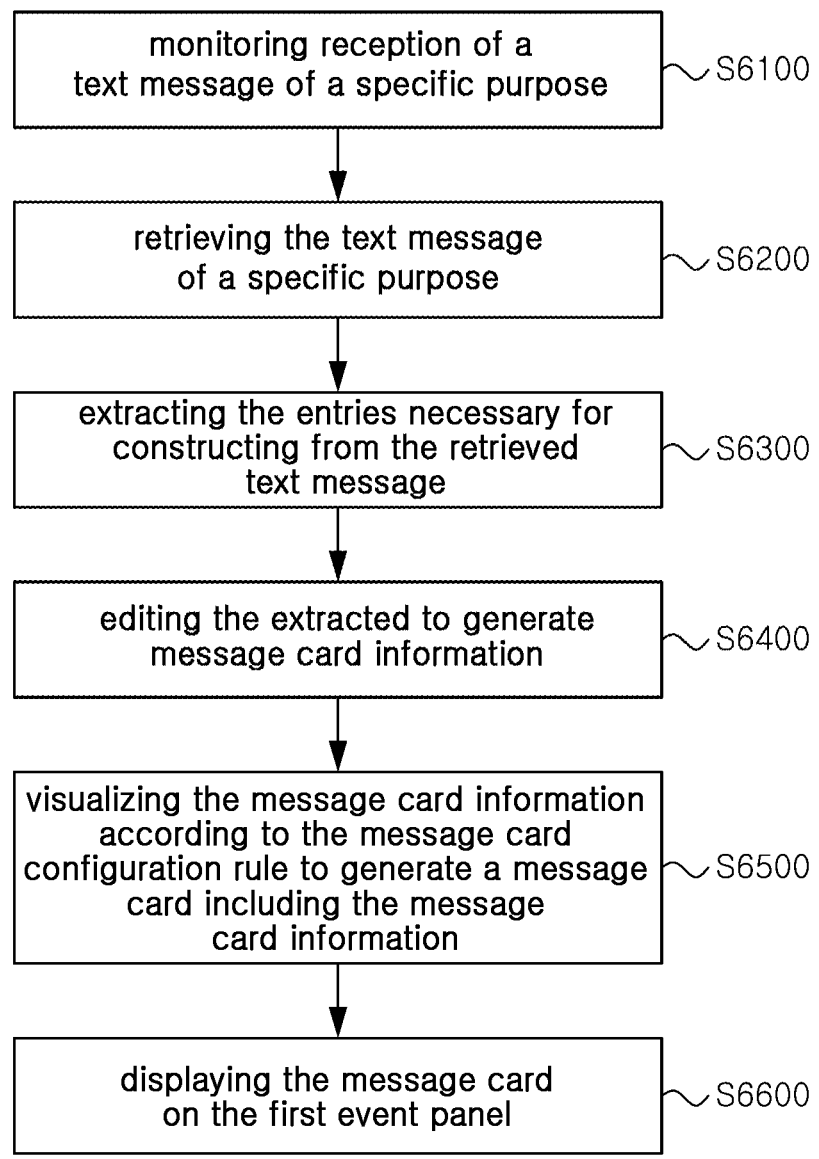
FIG. 34 is a flowchart illustrating a process for generating a notification card according to an exemplary embodiment of the present invention.

FIG. 34 is a flowchart illustrating processes for generating a message card according to an exemplary embodiment of the present invention.

Referring to FIG. 34, in step S6100, the message monitoring unit 1110 monitors whether a text message of a specific purpose is received based on received message information or integrated message information. Here, a text message of a specific purpose refers to a text message including a character string having a specific word, a character string having a specific notation type, and specific information.

Hereinafter, a text message related to the delivery of goods will be described as an example. The process of determining whether a text message having a particular purpose is received at step S6100 may be performed at the time of activation of the first message management user interface 100 or may be performed in real-time (e.g., as soon as it is received). At this time, the interface managing unit 1130 may be configured to analyze the contents of the received text message and extract necessary information to generate message card information. For example, the interface managing unit 1130 may be configured to generate a message card information, and to display the message card information on the event panel when a text message related to the delivery of goods purchased from the internet shopping mall is received. In this case, the interface managing unit 1130 may analyze the sender information of the text message or the character strings included in the text message to determine whether the received message is related to delivery of a product. More specifically, the interface managing unit 1130 may be configured to determine whether the received text message is sent from a contact of a predetermined shipping company or delivery driver. Alternatively, the interface managing unit 1130 may be configured to determine whether the received text message includes a shipping company name or a character string recognizable as related to delivery, such as "shipping", "courier", "delivery", etc. In addition, the interface managing unit 1130 may be configured to use both of the above-described determination methods. The contact and the character strings may be specified as basis of determination by the user in advance or provided by the integrated message management part 1100.

If a text message of a specific purpose is detected in the step S6100, in step S6200, the message managing unit 1120 retrieves the text message of a specific purpose, and extracts the information necessary for constructing the message card at step S6300. The information extraction process at step S6300 is performed according to a message card information format. The message card information format defines the entries to be displayed on the message card and notation of the entries. For example, the message card information format may set a date, time, and deliverer as a display entry. The message managing unit 1120 extracts information about date, time, and deliverer from the received text message. For example, the interface managing unit 1130 may extract the name of the delivery company such as "post office", "DHL", etc. from the text message, or identify the delivery company from the sender information included in the caller ID (CID). Likewise, the message managing unit 1120 may extract a character string indicating a date, such as "MM.DD" or "today", and a character string indicating a time "hh:mm" and the like. The message managing unit 1120 may generate the message card information using a reference word provided in advance, if the message includes the reference word.

Subsequently, in step S6400, the message managing unit 1120 edits the extracted entries defined by the message card information format to generate message card information. For example, the schedule message card information format may define the date in a form of "MM.DD" or "Today" (when the displaying date and extracted date entries are the same), the time in a form of "hh:mm AM (or PM)", and deliverer in a form of full text of shipping company name or driver name. As such, the message managing unit 1120 extracts only the entries defined by the message card information format from the received text message, and edits the message card information according to the message card information format to generate message card information.

In the above description, the generation of the message card is described as being performed by the message managing unit 1120. However, the inventive concepts are not limited thereto, and all or a part of such processes may be performed by the interface managing unit 1130.

Next, in step S6500, the interface managing unit 1130 visualizes the message card information according to the message card configuration rule to generate a message card including the message card information, and displays the message card on the first event panel 150 at step S6600. The message card configuration rule specifies how to display the message card information on a message card. For example, the message card configuration rules defines whether: 1) the message card information is displayed on a card-shaped image divided into a small block and a large block; 2) the date of the message card information is displayed in a small block at the top, time and deliverer are displayed in the large block at the bottom; 3) time is displayed using large fonts; and 4) deliverer is displayed under time using small fonts. The interface managing unit 1130 processes and visualizes each entry of message card information according to the above configuration rule, and displays the result through the first event panel of the first message management user interface 100.

Figure 35:
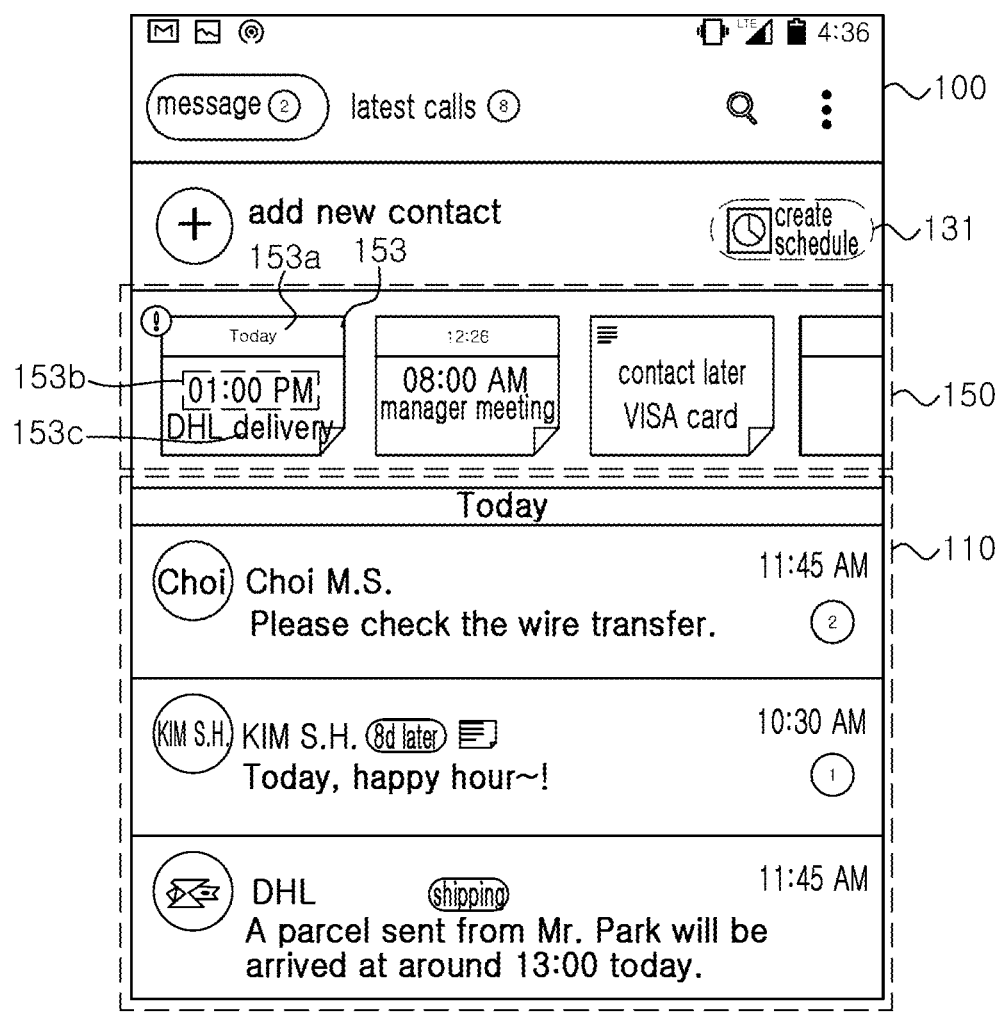
FIG. 35 is a screenshot illustrating an example where a notification card related to a delivery message is displayed on the event panel.

FIG. 35 is a screenshot showing an exemplary delivery-related message card displayed on the event panel 150. FIG. 35 shows a first event panel 150 including a message card 153 generated according to the above-described message card information format and the message card configuration rule.

In the first event panel 150, the message card 153 visualized according to a message card information format and a message card configuration rule is displayed. In FIG. 35, according to the above message card configuration rule, the date "Today" 153a is inserted in the upper small block, the predicted visit time "01:00 PM" 153b is placed at the center of the lower large block using large fonts, and the deliverer "DHL delivery" 153c is placed under predicted visit time.

The message card information generated by the message managing unit 1120 or the message card generated by the interface managing unit 1130 may be stored in the memory 1600. The storing the message card information may be performed simultaneously with either the process of generating message card information at step S6400, or process of displaying the schedule card at step S6600, or may be performed independently.

A plurality of text messages related to one order may be received several times according to the delivery process flow. Due to the update of the delivery status, the importance of the delivery-related messages already received may be reduce significantly. Thus, generating a message card for each of a plurality of delivery related messages of a single order may cause problems in terms of reducing the efficiency of the event panel. According to an exemplary embodiment of the present invention, the delivery-related messages for one order may be displayed on one message card reflecting the most up-to-date contents. Specifically, when the initial delivery related message regarding one product order is received, the interface managing unit 1120 generates a message card in accordance with the above-described process, then extracts information (e.g., delivery ID number)

that can identify the order from the received text message, and stores it in the memory 1600 in association with the generated message card.

The interface managing unit 1130 then determines whether newly received delivery related text message includes the delivery ID number stored. When a text message containing the stored delivery number is received, the message card information is generated as described above, and the message card is updated with the newly generated message card information. In this case, the updated message card may be displayed at its original location, or at a different location (e.g., at the forefront of the event panel). Alternatively, when a new text message including the stored delivery number is received, the interface may automatically delete the old message card, generate a new message card for the received text message, and display the new message card on the event panel.

In the above description, the messages related to the delivery of a product have been described as specific examples, however, a message card may also be generated and displayed for other text messages having a specific purpose, for example, notification of due date, notification of payment, and the like.

The user can transmit the schedule card, the memo card, and the message card displayed in the above-described event panel to other service subscribers. That is, the user can select one of the schedule card, the memo card, and the message card provided in the event panel, and transmit the selected card to a mobile terminal 10 of another user subscribed to the integrated message management service.

[Authentication Code Copying]

In online financial transactions and electronic commerce, a one-time authentication code is often used as a means of identity verification, which is generated by a certification authority and transmitted to a user in a form of a text message. Conventionally, when a text message including an authentication code is received from a certification authority, the user opens a text message, memorizes the authentication code, and input the code manually.

According to an exemplary embodiment of the present invention, the interface managing unit may be configured to provide a user interface that automatically copies the authentication code from the received message containing the authentication code sent from the certification authority. For example, the interface managing unit 1130 may be configured to determine whether a received message includes words, such as "authentication number (code)", "personal identification number (code)", "password" and provide a user interface for copying the authentication code.

The configuration and operation of the interface managing unit 1130 associated with the authentication code copy interface will be described in detail.

Figure 36:
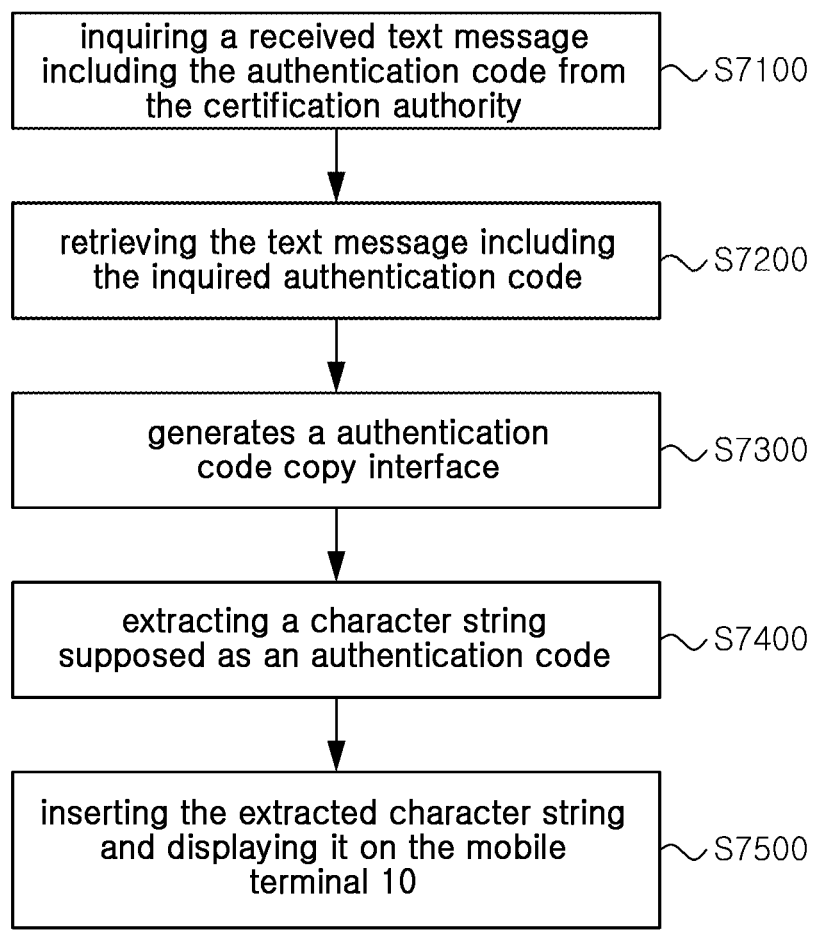
FIG. 36 is a flowchart illustrating a process for generating an authentication code copy interface.

FIG. 36 is a flowchart showing processes for generating an authentication code copy interface.

First, in step S7100, the interface managing unit 1130 inquires a received text message including the authentication code from the certification authority. The interface managing unit 1130 may be configured to determine whether the received text message is related to an authentication code. For example, the interface managing unit 1130 may determine whether the received text message includes any character strings indicating a message related to an authentication code. Examples of such character strings may be "authentication number (code)", "personal identification number (code)", "password", and the like.

In step S7200, the interface managing unit 1130 retrieves the text message including the inquired authentication code, and generates a authentication code copy interface including an authentication code display window, and a graphical user interface (GUI) for copying the and the authentication code at step S7300.

In step S7400, the interface managing unit 1130 extracts a character string determined as an authentication code. Since the authentication code is usually composed of random numeric strings or character strings, the interface managing unit 1130 may be configured to find and extract random numeric strings or strings from among the text messages.

The authentication code copy interface generating process at step S7300 and the character string extraction process at step S7400 may be performed simultaneously or independently.

In step S7500, the interface managing unit 1130 inserts the extracted character string into the authentication code copy interface, and displays it on the mobile terminal 10.

Figure 37:
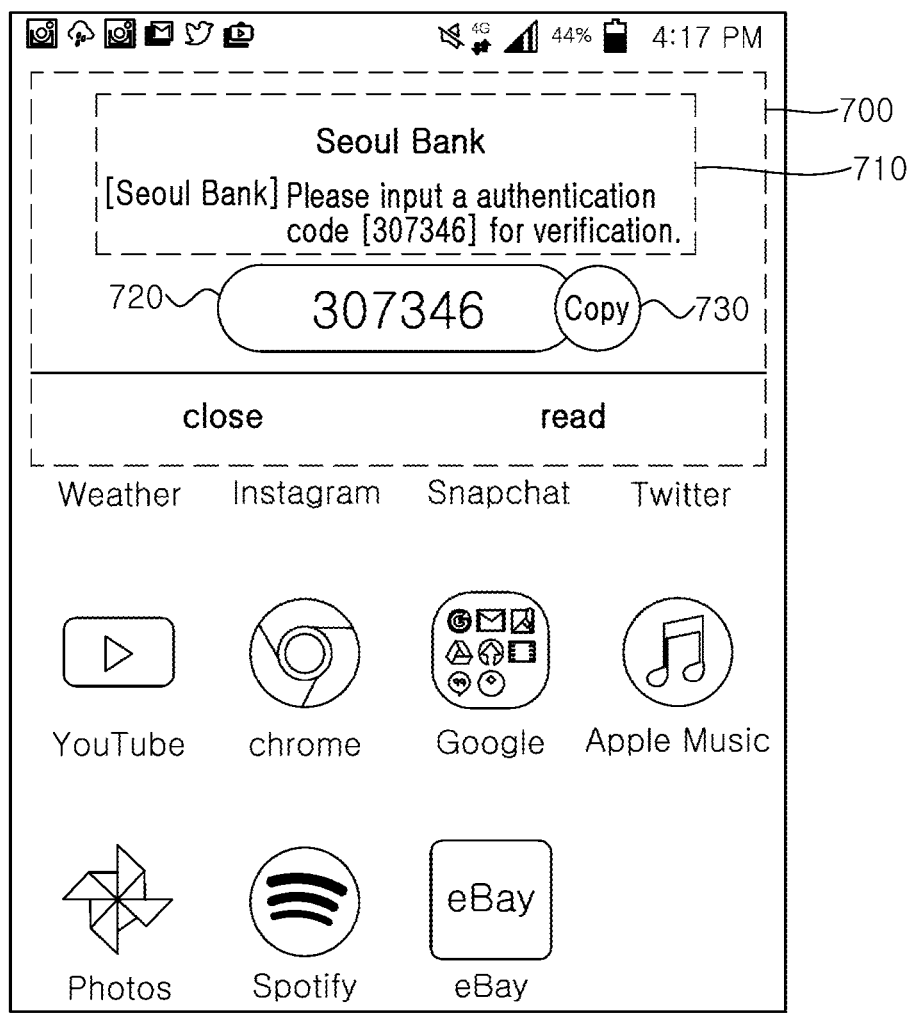
FIG. 37 is a screenshot illustrating an example of the authentication code copy interface provided by the present invention.

FIG. 37 is a screenshot showing an example of the authentication code copy interface.

Referring to FIG. 37, the received authentication code message is displayed on a card-shaped authentication code copy interface 700. The authentication code copy interface 700 may be displayed on the mobile terminal 10 without activating the text message application. At this time, the above-described steps S7100 to S7500 are performed upon receipt of the text message. The authentication number copy interface 700 includes a text message display window 710, an authentication code display window 720, and a copy GUI 730. The text message display window 710 displays the sender and the contents of the text message. The authentication code display window 720 displays the authentication code extracted from the text message. The copy GUI 730 may be used to receive a user input of copying the authorization code displayed in the authorization code display window 720. The user can simply copy the authorization code through a user input (e.g., touching the copy GUI 730). The "close" button and "read" button are provided at the bottom of the copy GUI 730. When the user selects "close", the card then disappears. When the user selects "read", the interface managing unit 1130 accesses the text message information managing unit 1120, and displays the original received message on the mobile terminal 10. In addition, the interface managing unit 1130 may be configured to automatically close the card when the user selects the copy GUI 730 to complete copying the authentication code. In FIG. 37, "307346" included in the text message is extracted as the authentication code.

In this manner, the user can copy the authentication code using the authentication code copy interface 700 and paste it into a desired place. Therefore, the user convenience is much improved compared to the conventional method, which requires troublesome user actions such as reading a text message, searching for a necessary authentication code, and memorizing the code to manually input the code into a desired place.

According to an exemplary embodiment of the present invention, the integrated message management part 1100 may be configured to perform a process for customizing a text message according to a text type instruction inserted in a text message. A subscribers of the integrated message management service can write a simple instruction as a part of the text message, so that the text message can be customized according to a purpose. The customizing processes according to the instruction included in the text message may be performed by the interface managing unit 1130. That is, interface managing unit 1130 recognizes an instruction included in the text message body and performs processes corresponding to the instruction.

Figure 38:
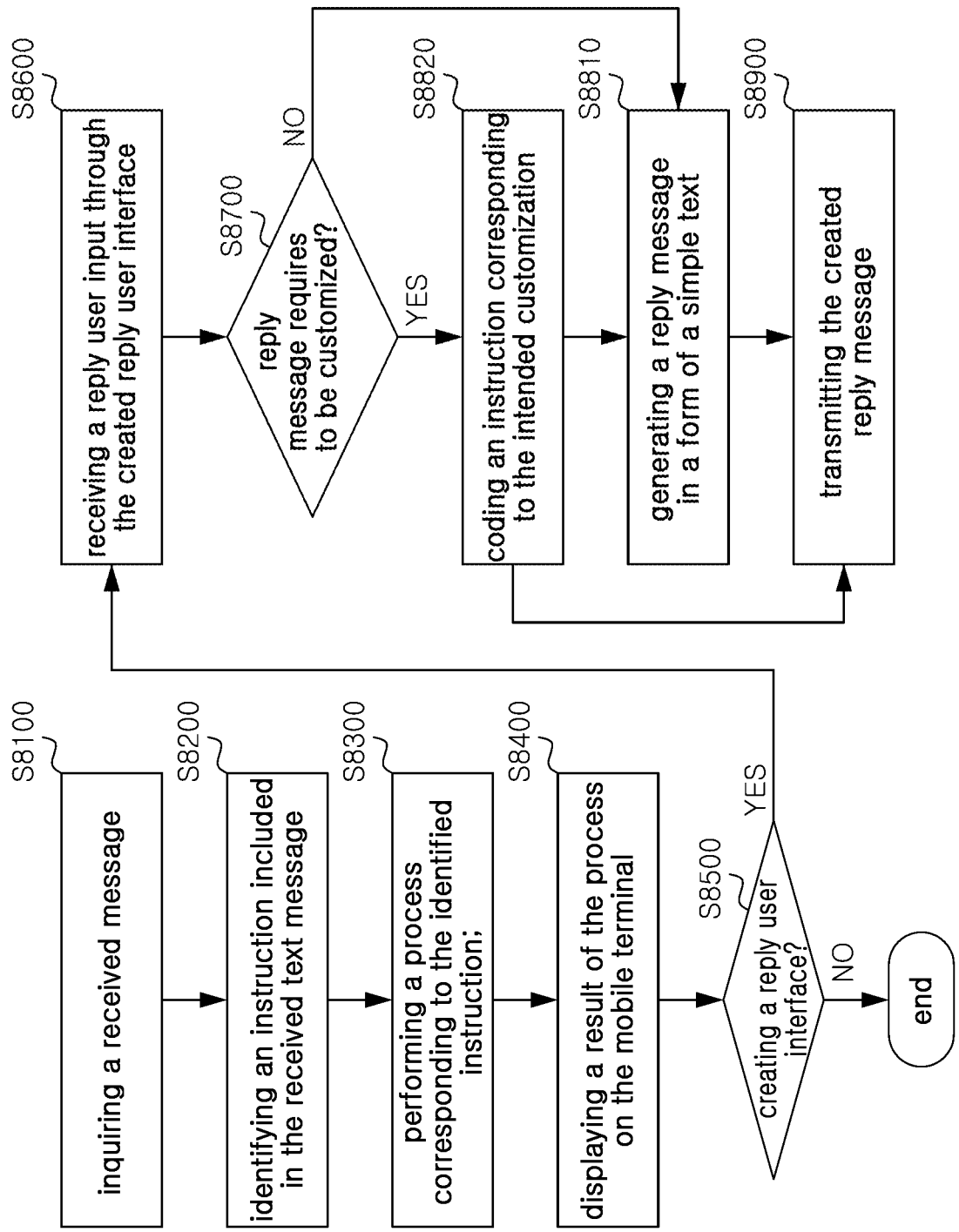
FIG. 38 is a flowchart illustrating a process of a received text message including a visualization instruction according to an exemplary embodiment of the present invention.

FIG. 38 is a flowchart illustrating processes for customizing a text message according to a customization instruction included in the text message according to an exemplary embodiment of the present invention.

Referring to FIG. 38, in step S8100, the integrated message management part 1100 of the receiving-side mobile terminal 10 inquires the received message.

In step S8200, the interface managing unit 1130 identifies the instruction included in the received text message. The instruction may have a format of Markdown language, where the instructions begin with "#". Therefore, the instruction can be identified by the presence of a character string starting with the special character "#".

In step S8300, the interface managing unit 1130 performs a process corresponding to the identified instruction, and displays the result of the process on the mobile terminal 10 at step S8400. The result of the process may be displayed on the first and second message management user interfaces 100 and 500.

In step S8500, it is determined whether the process performed by the instruction is creating a reply user interface for creating a reply text message.

If the process performed by the instruction is not for creating a reply message that generates a customized user interface, the process is terminated (END) without further process.

If the process defined in the instruction is for creating a reply text message that generates a user interface, the following steps are further processed. In step S8600, the interface managing unit 1130 receives the reply user input through the created reply user interface, and performs a process for creating a reply message according to the return user input. In step S8700, the reply text message creation process is performed in different manners depending on whether the reply message is to be customized at a mobile terminal that will receive the reply text message. If the reply text message is not customized at the terminal receiving the reply text message, then in step S8810, the interface managing unit 1130 generates a reply message in a form of a simple text.

On the other hand, when the reply text message is intended to be customized at the terminal receiving the reply text message, then in step S880, the interface managing unit 1130 codes an instruction corresponding to the intended customization as a part of a text message.

In step S8900, the reply message created in the process of S8810 or S8820 is transmitted to the original sender by the text message management part 1120 over the mobile telephone switching network.

Examples of instruction provided for the customizing a text message are listed in the Table 1 as below.

TABLE 1

| Type of instruction | Format | Process to be performed | Recipient Reply |
|---|---|---|---|
| Multiple choice Question | #{A/B/C/ . . . } | Generating a UI for receiving a user input of choice among entries A, B, C . . . | Returning user's selection in form of text. |
| Visual emphasis | #EM | Emphasizing a text message visually | No Reply |
| Completion Type question. | #[A/B/C] | Generating a UI for receiving user input of a values for each entry A, B, C, . . . | Returning user input value using a table generating instruction |
| Table | #[A=a/B=b/C=c] | Generating a table where entry A, B, C has value a, b, c, respectively. | No Reply |

In order to perform a process corresponding such instructions, an integrated message information management application compiling the instructions coded in Markup language is required to be installed in the receiving mobile terminal 10. When a mobile terminal 10 does not have an integrated message information management application installed, the instruction may not be executed even if such a instruction is included in the received text message, and the instruction may be displayed in the character string as coded (for example, "#{Yes/No}"). The process of customizing the text message will be described in more detail as follows.

First, a user of the originating mobile terminal 10 creates a text message including an instruction through the text message creating interface provided by the integrated message information management part 1100 or the text message management part 1300. The interface managing unit 1130 transfers the input text message to the text message management part 1300, and the text message management part 1300 transmits the created text message through the transceiver of the originating mobile terminal 10 to the receiving mobile terminal 10. The transceiver of the receiving mobile terminal 10 receives the text message sent from the originating mobile terminal 10. The text message management part 1300 of the receiving mobile terminal 10 transfers the received message to the interface managing unit 1130 via the message monitoring unit 1110. The interface managing unit 1130 identifies the instruction included in the received text message. The instruction may be identified by the presence of a character string starting with the special character "#". Then, the interface managing unit 1130 performs the process corresponding to the identified instruction, and displays the result through the user interface.

Hereinafter, a text message customizing process will be described for each instruction of the Table 1 in detail with reference to FIGS. 39 to 46.

Figure 39:
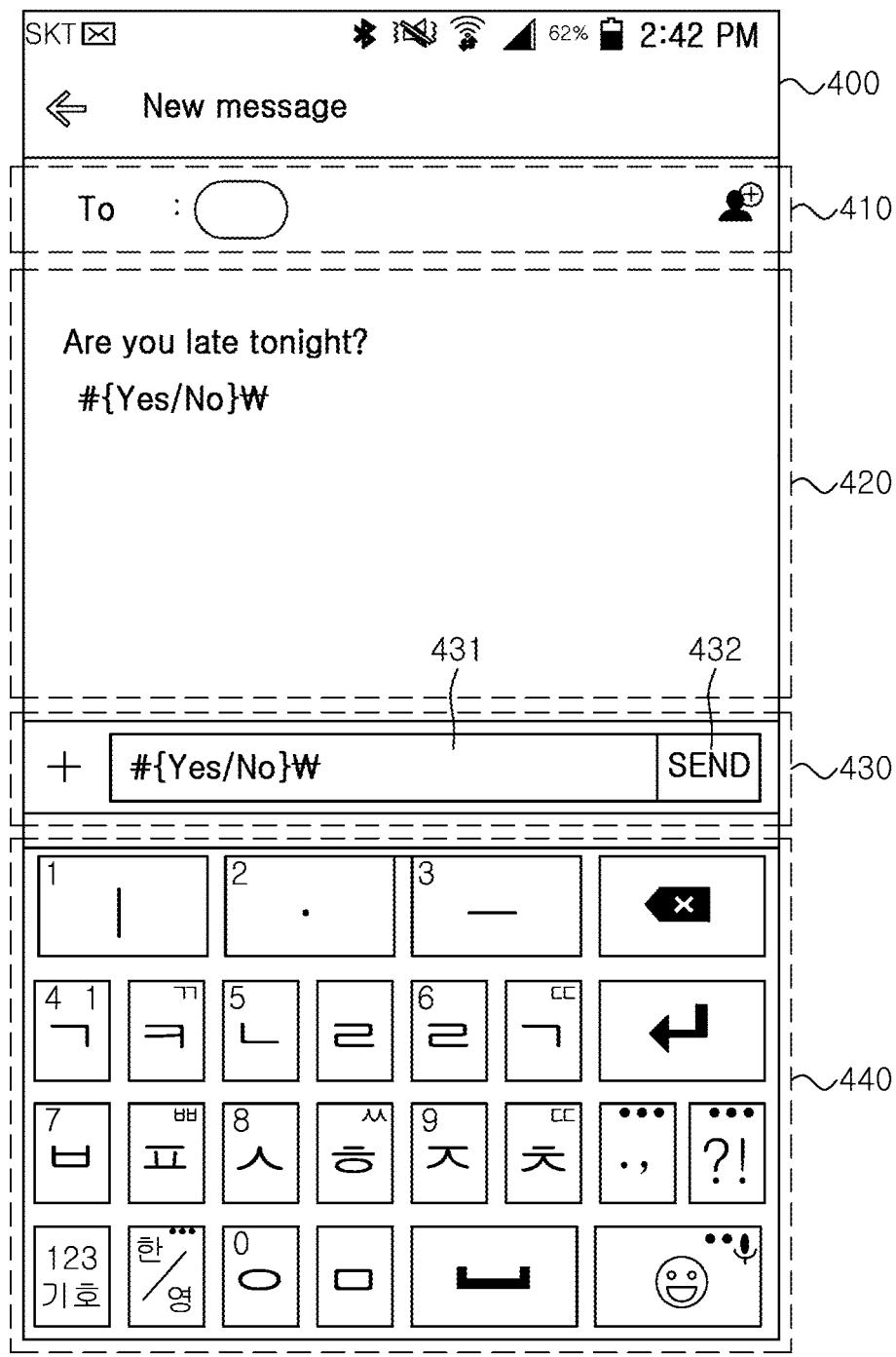
FIG. 39 is a screenshot illustrating an example where a text message including a multiple choice response user interface creation instruction is written by a sender's mobile terminal of a sender.
Figure 40:
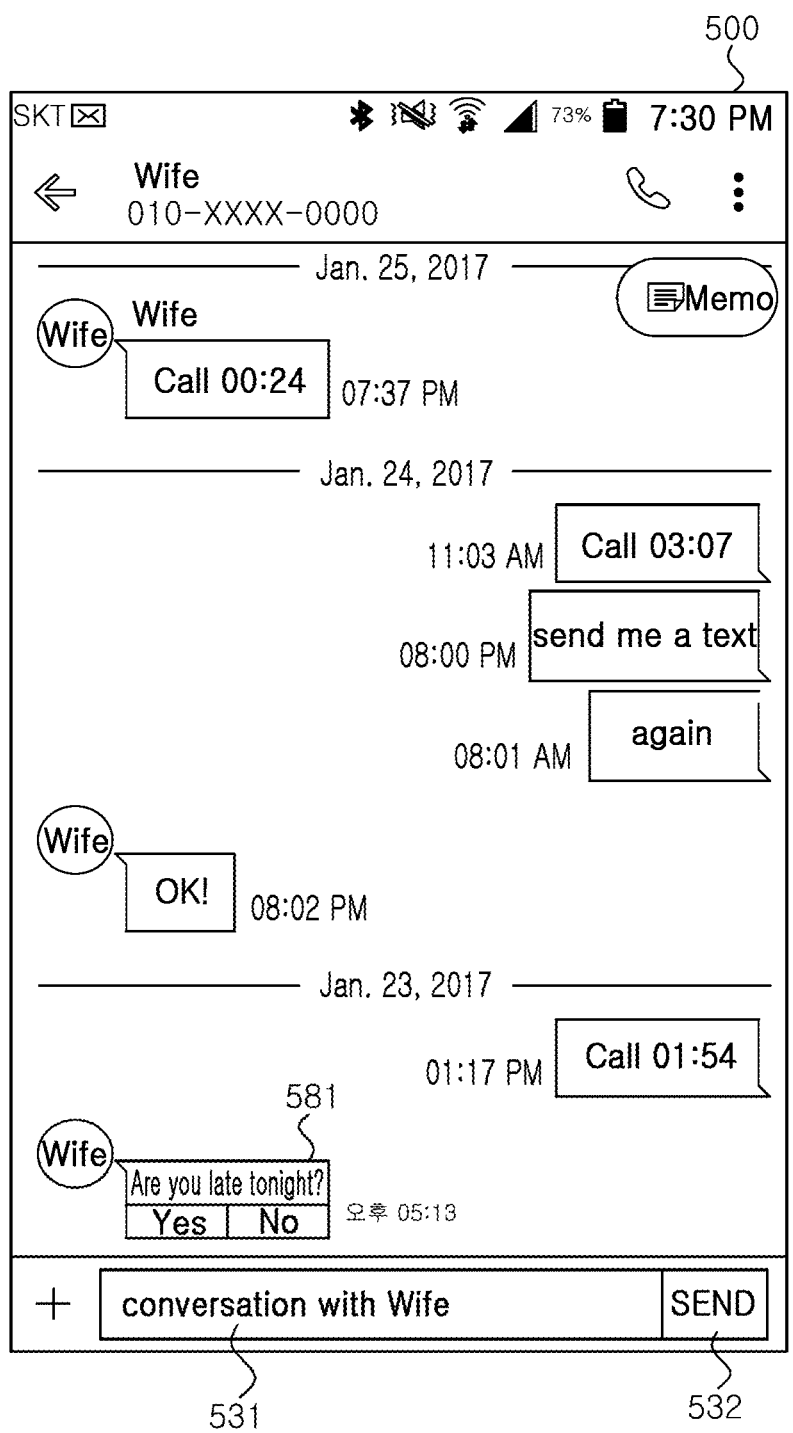
FIG. 40 is a screenshot illustrating a result of performing a process according to a multiple choice response user interface creation instruction by a receiver's mobile terminal.

FIG. 39 is a screenshot of an originating mobile terminal 10 where a text message including an instruction for creating a multiple choice question user interface is being written, and FIG. 40 is a screenshot of a receiving mobile terminal 10 where a result of the process according to the instruction for creating a multiple choice question user interface is displayed.

As shown in FIG. 39, the originating terminal 10 creates a text message "Are you late tonight?", including the instruction "# {Yes/No}", according to user input through the text message creating interface 400, and sends the text message to the receiving mobile terminal 10. The interface managing unit 1130 of the receiving terminal 10 that has received the text message identifies the instruction '# {Yes/No}' from the text message, and performs a process corresponding to the instruction. In this case, the process corresponding to the instruction "# {Yes/No}" is generating a selection button marked with "Yes" and a selection button marked with "No" (see Table 1). Accordingly, the receiving mobile terminal 10 performs this process and displays the result on the second message management user interface 500 as shown in FIG. 40. More specifically, the interface managing unit 1130 generates a "Yes" selection button and a "No" selection button 581, and displays them with the message content "Are you late tonight?" within a speech bubble 581 of the second message management user interface 500.

Referring in Table 1, recipient's reply to the messages including an instruction code "# {Yes/No}" is created according to a format returning the recipient's selection as a text. Accordingly, when the user of the receiving terminal 10 touches the "Yes" button, the interface managing unit 1130 creates a text message having a character string "Yes" which is an entry selected by the user, and sends the created text message to the original originating terminal 10. The reply text message including the character string "Yes" is then received on the original originating terminal 10.

Figure 41:
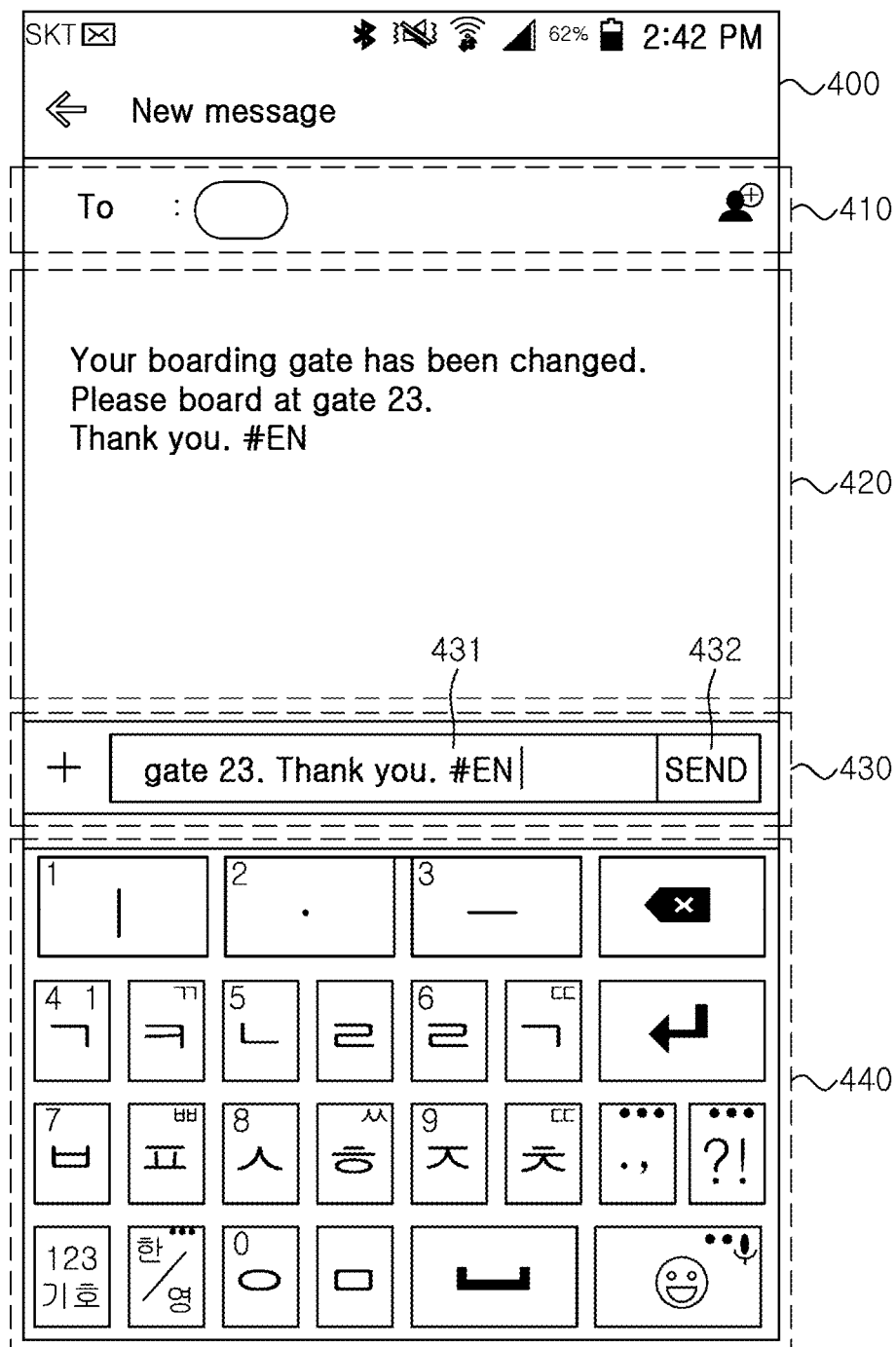
FIG. 41 is a screenshot illustrating an example in which a text message including a visual highlight instruction is written by a sender's mobile terminal.
Figure 42:
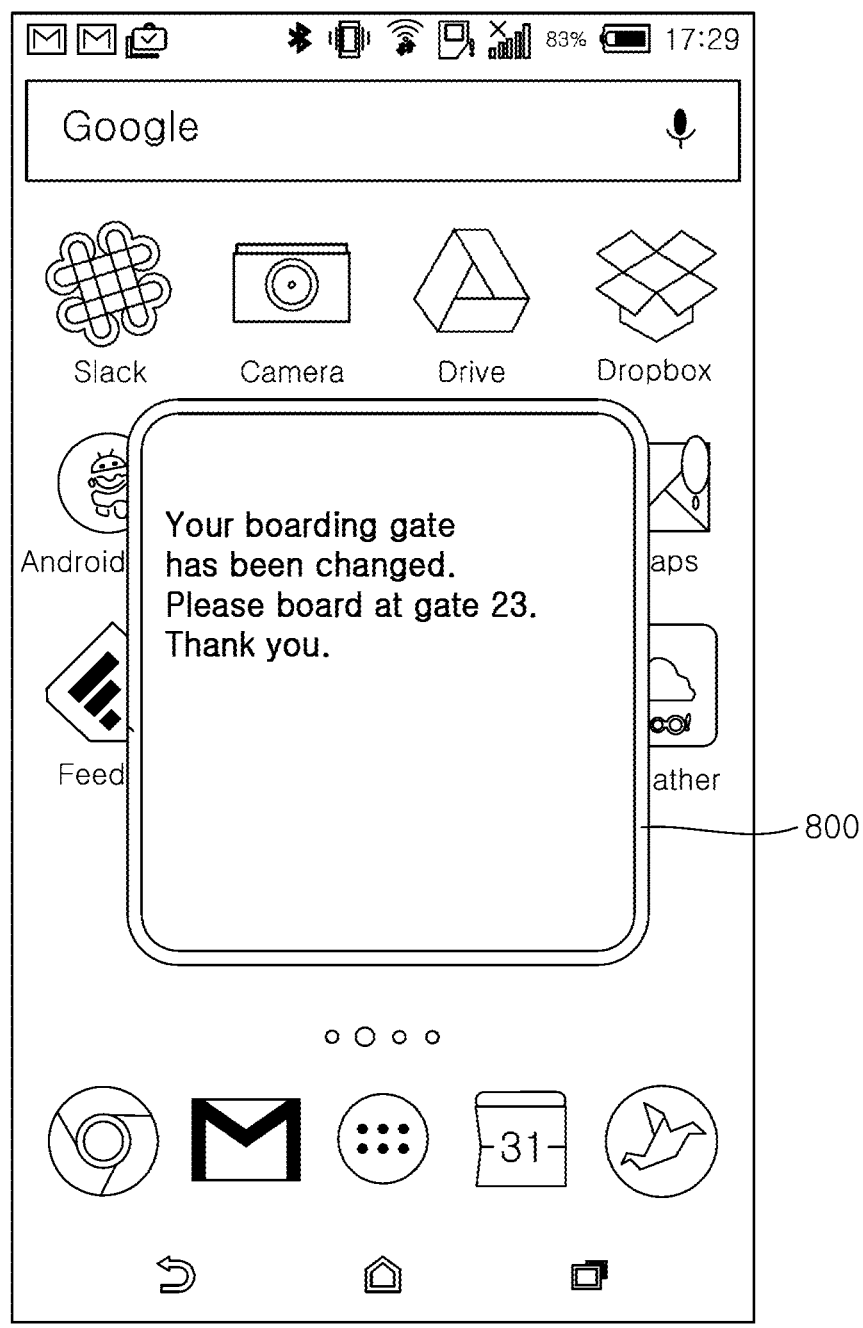
FIG. 42 is a screenshot showing the result of performing a process according to the visual highlight instruction by a receiver's mobile terminal.

FIG. 41 is a screenshot of an originating mobile terminal 10 where a text message including the visual emphasis instruction of Table 1 is being input, and FIG. 42 is a screenshot of a receiving mobile terminal 10 where a result of the process according to the visual emphasis instruction is displayed.

As shown in FIG. 41, when the originating user inputs a text message including the instruction "#EN" and sends it, the receiving terminal 10 receiving the message identifies the instruction included in the text message, and performs a process corresponding to the identified instruction. Referring to Table 1, the instruction "#EN" corresponds to a process for visually emphasizing a text message. For example, as shown in FIG. 42, the visual emphasis process may be defined as inserting the message content into a graphic panel 800 and displaying the graphic panel 800 on the home screen of the mobile terminal 10. The visual emphasis process according to the visual emphasis instruction may be performed in various way other than the example of FIG. 42. For example, the font of a text message (use of bold, use of color, use of underline, enlargement of font size, etc.), modification of text message alarm (increasing intensity of vibration or sound volume, increasing duration of alarm, etc.) may be changed. The emphasis process to be performed may be changed and added by the user or the integrated message management service server 20.

Figure 43:
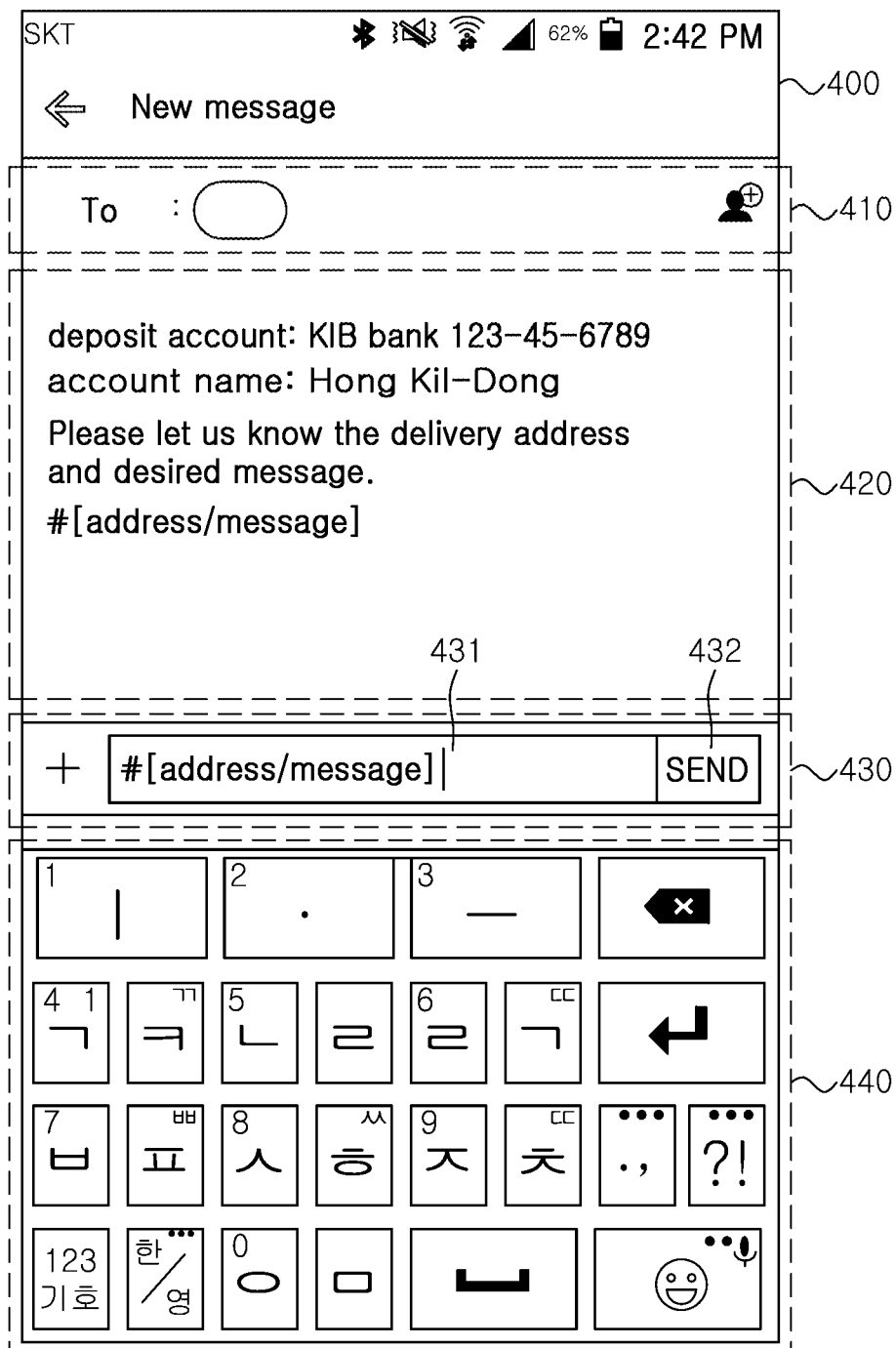
FIG. 43 is a screenshot showing an example in which a text message including a fill-in response user interface creation instruction is created in a sender's mobile terminal.
Figure 44:
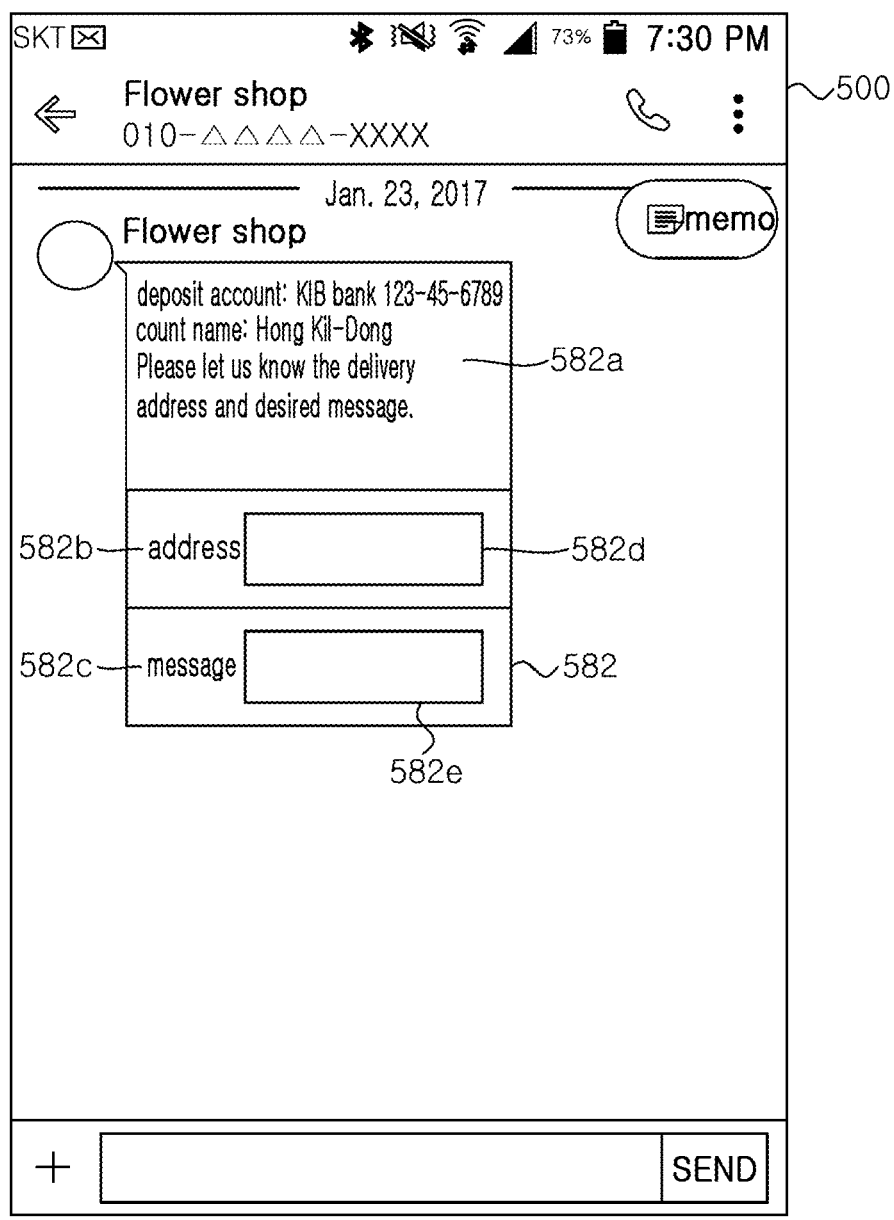
FIG. 44 is a screenshot showing a result of performing a process according to a fill-in response user interface creation instruction by a receiver's mobile terminal.

FIG. 43 is a screenshot of an originating mobile terminal 10 where a text message including an instruction for creating the completion type question user interface is shown, and FIG. 44 is a screenshot of a receiving mobile terminal 10 where a result of the process according to the instruction is displayed.

As shown in FIG. 43, the originating terminal 10 creates a text message including message body "deposit account: KM bank 123-45-6789 (enter) account name: Hong Kil-Dong (enter) Please let us know the delivery address and desired message," and an instruction "# [address/desired message]", according to user input through the character input interface 400, and sends the text message to the receiving mobile terminal 10. The interface managing unit of the receiving terminal 10 receiving the text message identifies the instruction "# [address/desired message]" from the text message, and performs process corresponding to this instruction. Referring to Table 1, the process corresponding to the instruction "# [address/desired message]" is creating a user interface for receiving the entries of "address" and "desired message". Thus, the receiving mobile terminal 10 performs this process and displays the result on the second message management user interface 500 as shown in FIG. 44.

Referring to FIG. 44, the interface managing unit 1130 of the receiving mobile terminal 10 creates input boxes 582b and 582c including input windows 582d and 582e, respectively, which may receive user input for entries 'address' and 'desired message,' and displays them with the message body 582a within a speech bubble 582 of the second message management user interface 500.

Referring Table 1, recipient's reply to the messages including an instruction code "# [address/message]" is created according to the recipient's inputs in a form of a table using a table generating instruction. Accordingly, when the user of the receiving terminal 10 inputs the address and the desired message through the input windows 582d and 582e, the interface managing unit 1130 automatically generates a text message including the table generating instruction corresponding to the user input. The process for generating a reply to a text message including a completion type question instruction will be described with reference to FIG. 45 and FIG. 46.

Figure 45:
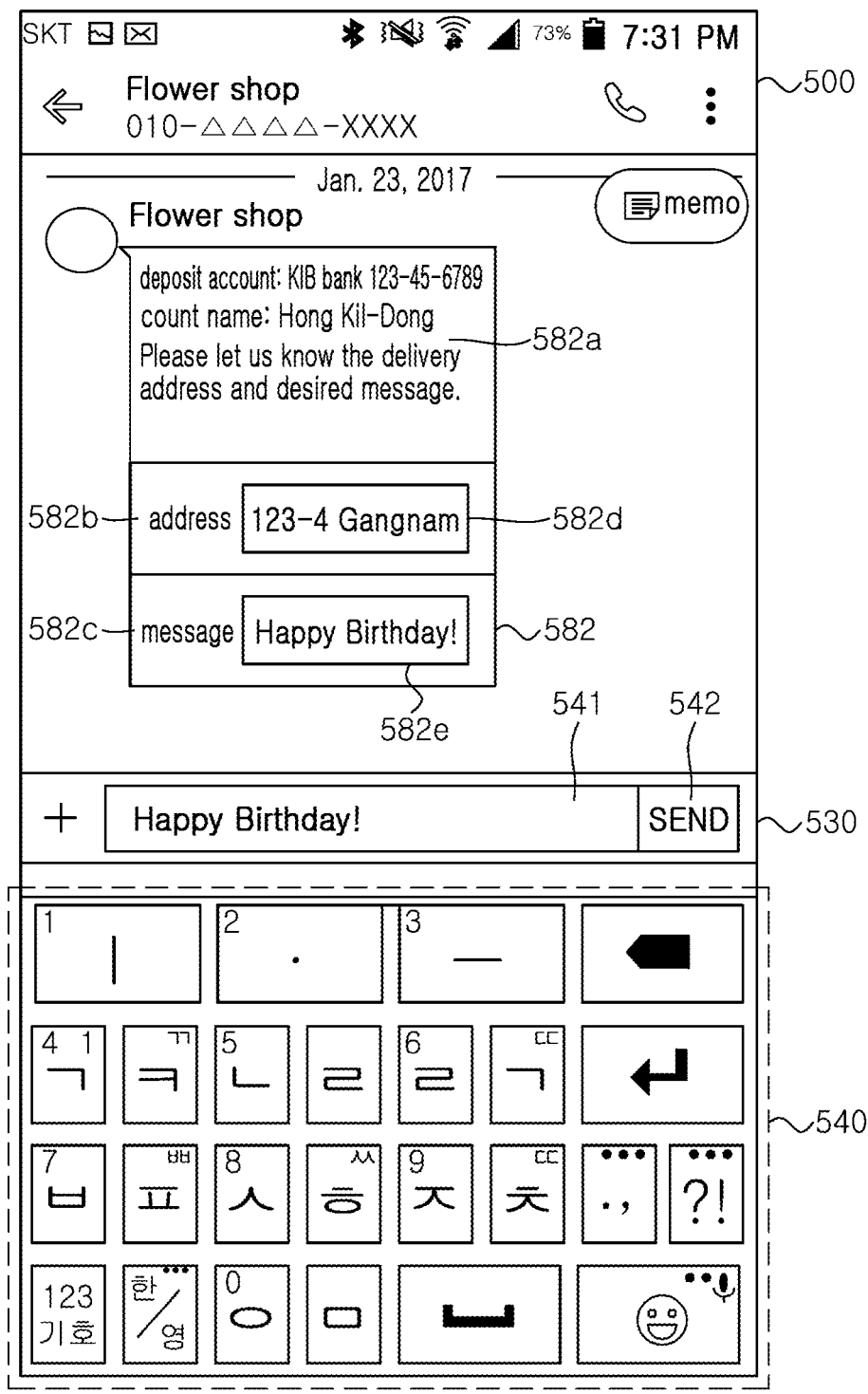
FIG. 45 is a screenshot illustrating an example where a reply message is written using the fill-in response user interface by a receiver's mobile terminal.
Figure 46:
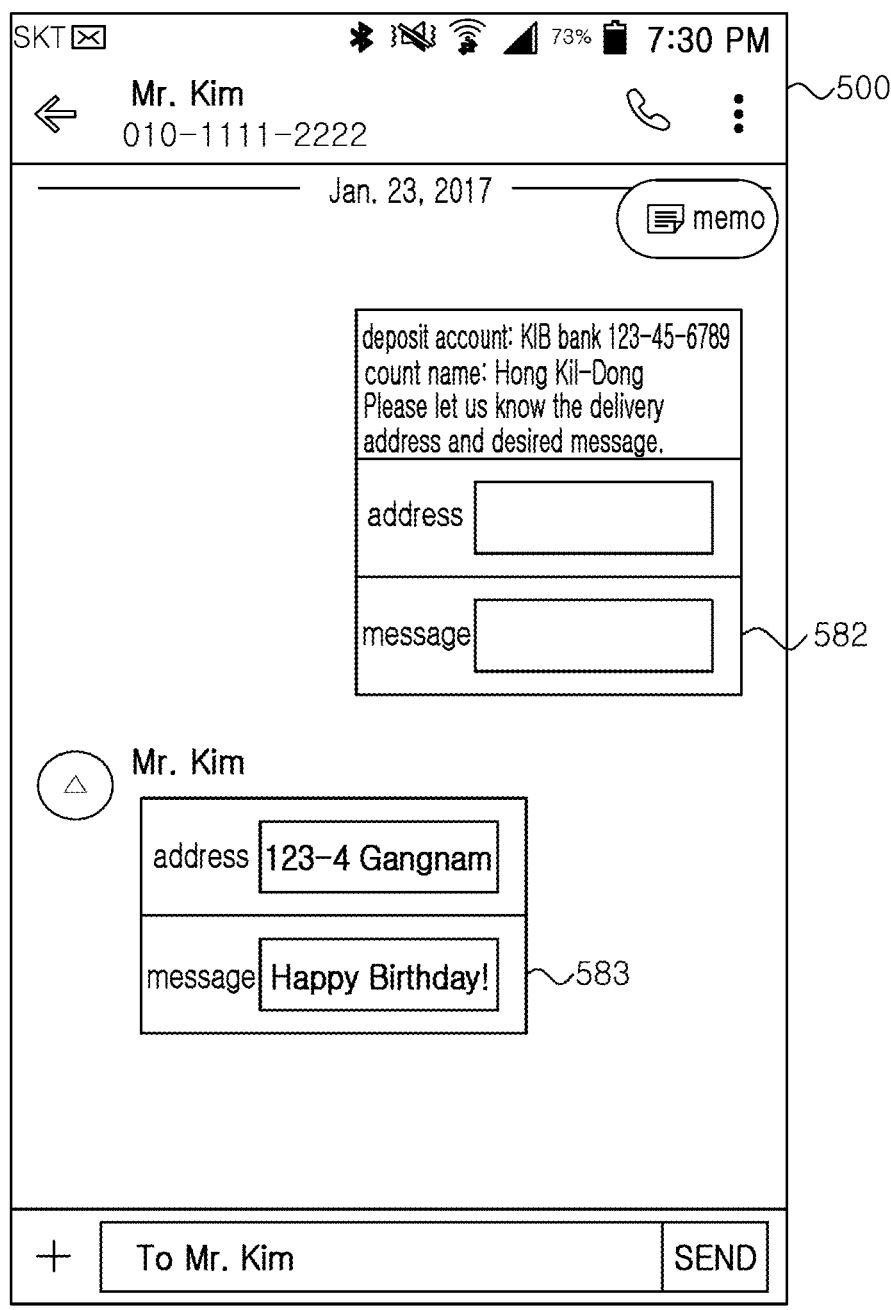
FIG. 46 is a screenshot illustrating an example where the reply text message created in FIG. 45 is displayed on the sender's mobile terminal.

FIG. 45 is a screenshot of the receiving mobile terminal where a reply to a text message including a completion type question instruction is created, and FIG. 46 is a screenshot of the original originating mobile terminal where the reply message created in a mobile terminal of FIG. 45 is displayed.

As shown in FIG. 45, the user of the receiving mobile terminal 10 can input an address and a desired message by filling the input boxes 582d and 582e. The user input is automatically coded into a table-generating instruction by the interface managing unit 1130. In the example of FIG. 45, the interface managing unit 1130 creates a text message including a table generating instruction text code "# [address=123-4 Gangnam/message=Happy Birthday!]" using the text message creating application, and sends it to the originating mobile terminal 10.

The original originating mobile terminal 10 receiving the reply text message including the table creation instruction performs a process corresponding to the instruction (e.g., generating a table including the address and desired message shown in FIG. 45). More specifically, as shown in FIG. 46, the interface managing unit 1130 of the original originating mobile terminal creates a table in which "123-4 Gangnam" and "Happy Birthday!" is displayed for 'address' entry and 'desired message' entry, respectively, and displays the created table within a speech bubble 583 of second message management user interface 500.

When the integrated message information management application according to the exemplary embodiments is not installed in the receiving mobile terminal 10, the process according to the instruction may not be performed. In this case, since the instructions are coded and transmitted as a part of a text message, the instructions included in the message are displayed as coded in the receiving mobile terminal 10.

In addition, as described above, the user can transmit a schedule card, a memo card, and a message card displayed in the above-described event panel to other service subscribers. At this time, a user can create a text message using the customization instruction described above. More specifically, when interface managing unit 1130 receives a user input of selecting a schedule card displayed on the event panel to transmit it to a specific counterpart, the interface managing unit 1130 retrieves the schedule information corresponding to the selected schedule card. Then, the interface managing unit 1130 (or the message managing unit 1120) generates a text message including the schedule information and an instruction to display the retrieved schedule information in the event panel. This instruction may, for example, facilitate the receiving mobile terminal 10 to perform the above-described processes of S5300 to S5500 (or S5320 to S5520) on the schedule information included in the text message. The interface managing unit 1130 transmits the created text message to the receiving terminal.

The integrated message management part of the receiving terminal that has received the text message identifies the instruction coded in the text message, and performs processes of S5300 to S5500 (or S5320 to S5520), that is, creating a message card using the schedule information included in the text message and displaying it on the receiving terminal. In this manner, various types of messages can be exchanged through the processes of the customization instruction.

According to an exemplary embodiment of the present invention, the integrated message management part 1100 may be configured to manage location information of a receiving location of a text message.

When the message monitoring unit 1110 detects that a voice call or a text message is received or transmitted, the message information managing unit 1200 adds the receiving position (or transmitting position) to the received text message information, and stores the receiving position information (or the transmitting position information) in the memory 1600. The stored text message information is displayed on the first message management user interface 100 and the second message management user interface 500 through the above-described processes. The location information included in the message information may be displayed directly on the first and second message management user interfaces 100 and 500.

At this time, the message block format or the dialogue information format may define the receiving position information as a display entry. Even if the location information is not directly displayed in the first and second message management user interfaces 100 and 500, the user can access the text message information through the first and second message management user interfaces 100 and 500, so that the user may check the receiving position.

Meanwhile, according to an exemplary embodiment of the present invention, receiving position of a voice call and a text message may be provided in association with a geographic information application. A geographic information application is an application that provides various services to a user terminal by using geographical information, such as a map, a satellite photograph, an aerial photograph, and the like. The geographic information application may be an external application, such as Google map, Naver map, and the like, or may be embedded in the integrated message management application. Processes for inquiring and storing receiving/transmitting position of a voice call and a text message may be performed in substantially the same manner as described above. The stored receiving/transmitting position of voice call and text message may be provided in various ways.

As a first example, the interface managing unit 1130 may be configured to generate a graphical user interface (for example, a "location information" button) for showing receiving/transmitting location information to provide it on the message block 111 and 112 of the first message management user interface 100. In this case, the interface managing unit 1130 may be configured to execute a geographic information application to display the receiving/transmitting position of the message in a map of the geographic information application when the user touches the corresponding graphical user interface.

As a second example, when the user selects a specific unit conversation of the second message management user interface 500, the interface managing unit 1130 generates a graphic user interface to check whether to inquire the position at which the selected unit conversation was received or transmitted. If a user request for inquiring the receiving/transmitting position information is received through the graphic user interface, interface managing unit 1130 may activate the geographic information application and display the receiving/transmitting position of the message corresponding to the unit conversation on a map or the like.

As a third example, when the user selects a message block 111 and 112 of the first message management user interface 500, the interface managing unit 1130 generates a graphic user interface for inquiring the position at which the selected unit conversation was received or transmitted. If the user request for inquiring the receiving/transmitting position information is received through the graphic user interface, interface managing unit 1130 may execute the geographic information application, and display the receiving/transmitting position of the message corresponding to the message block 111 and 112 on a map or the like.

As a fourth example, the interface managing unit 1130 may be configured to generate a graphical user interface (for example, a "location information" button) for providing the location information and to insert the graphical user interface into the conversation title region 510 of the second message management user interface 500. In this case, the interface managing unit 1130 may be configured to execute a geographic information application to display the receiving/transmitting position of the message in a map of the geographic information application when the user touches the corresponding graphical user interface.

As a fifth example, the interface managing unit 1130 may be configured to provide a separate menu for providing the receiving/transmitting location information of the message to the menu bar 120 of the first message management user interface 100. When the user selects the receiving/transmitting location information menu, the interface managing unit 1130 may be configured to execute a geographic information application to display the receiving/transmitting position of the message in a map of the geographic information application.

In the first to third examples, the receiving/transmitting location information of one message is provided in association with the geographic information application. On the other hand, in the fourth and fifth examples, receiving/transmitting location information of a plurality of messages are provided in cooperation with a geographic information application.

Figure 47:
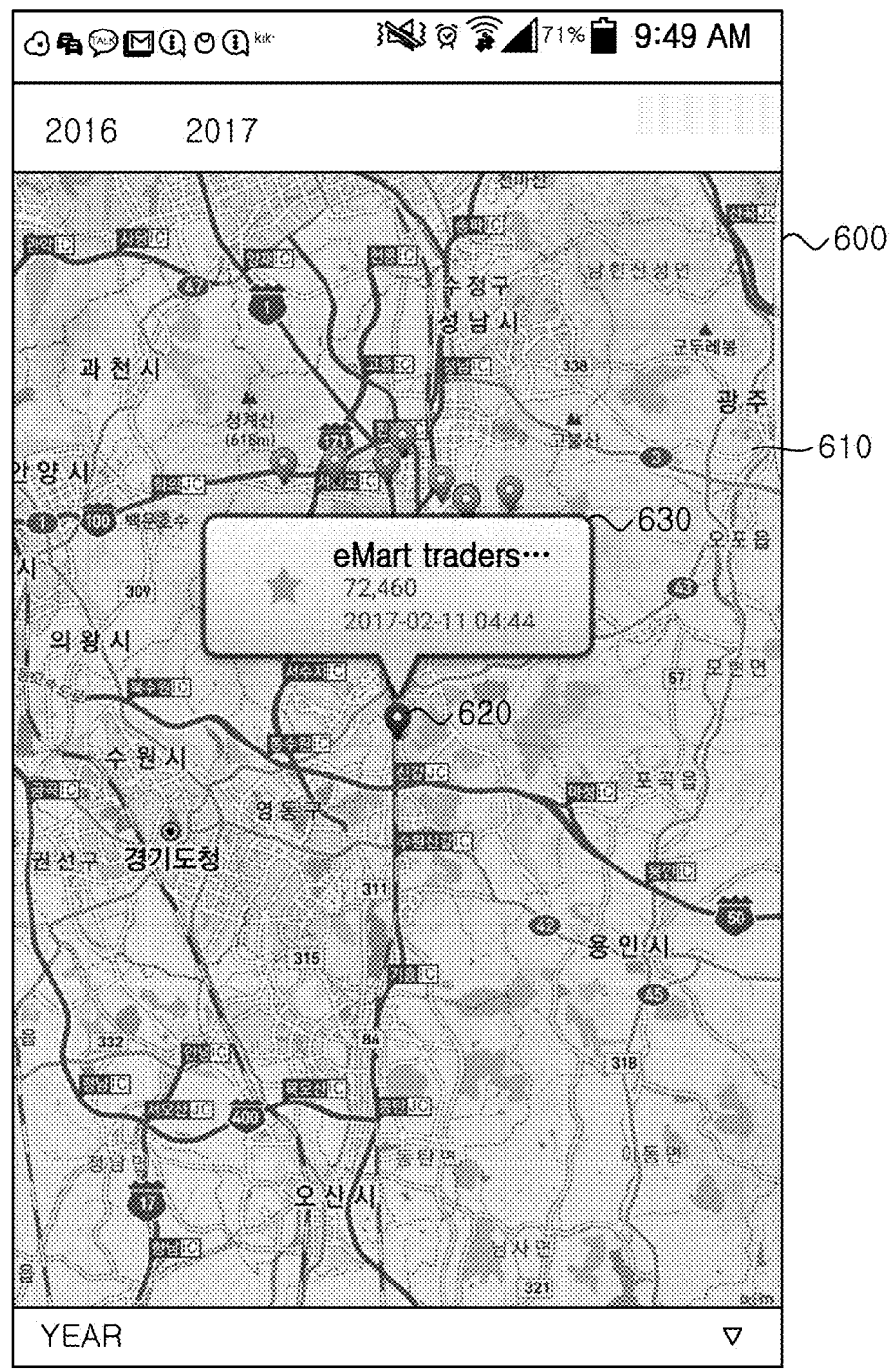
FIG. 47 is a screenshot illustrating an example where geographic information related to location of transmitting/receiving messages is provided in association with a geographic information application according to an exemplary embodiment of the present invention.

FIG. 47 is a screenshot illustrating receiving/transmitting location information provided in cooperation with a geographic information application, in response to user selection of location information menu provided on a first message management user interface in the timeline mode.

Referring to FIG. 47, a map 610 is displayed on the message location information user interface 600. In the map 610, graphical user interface 620 in the form of a marker is displayed. Each of the markers corresponds to a position where the user terminal received or transmitted messages during one year. When the user selects a marker 620 displayed on the map 610, the interface managing unit 1130 generates and displays a message information signboard 630 regarding the messages corresponding to the selected marker 620. The entries and the notation form of the message information signboard 630 are defined by a message information signboard format.

In the example of FIG. 47, the message information sign 630 has a format defining that a part of a received text message is in a bold type, a payment amount included in a text message, and a receiving date and time are arranged in three rows, respectively, within a dialogue box. The message information signboard format may be set in a manner similar to the above-described message block format, and dialogue information format. Thus the process for generating and displaying the message information signboard according to the message information signboard format may performed in a manner substantially similar to the process for generating and displaying the message blocks 111 and 112 of the first message management user interface 100 done by the interface managing unit 1130.

In the above-described examples, location information is provided for all of the incoming and outgoing voice calls and text messages. However, the system and method for integrated message information management according to exemplary embodiments of the present invention may be configured to provide location information for either of voice call or text message, or may be configured to provide location information for either the incoming or outgoing messages. It may also be configured to provide location information only for messages related to a particular party.

According to an exemplary embodiment of the present invention, the above-described restriction of providing the location information may be done by a user setting or the server setting. For example, the user may designate a specific telephone number from which the text messages relating to the credit card payment are sent as an object of providing the location information. In this case, the message integration management application may be set, so as to display receiving position for the credit card payment notification text messages. The function of providing message receiving/transmitting location information can be used for grasping a user's life pattern. In addition, it may also be possible to verify the illegal use of the credit card by comparing the usage location of the credit card with the receiving location of the payment text message.

According to an exemplary embodiment may provide a computer-readable storage medium including instructions to cause a processor of the mobile terminal 10 to perform the processes described above. As described above, the integrated message management part 1100 according to the exemplary embodiments may be a combination a processor embedded in the mobile terminal 10 and an application executed on the processor. The application may be downloaded from the integrated message management service server 20 and installed in the memory 1600 of the mobile terminal 10. The application may include a plurality of instructions for causing the processor to perform some or all processes necessary for providing integrated message information management and additional functions described above.

[The Integrated Message Information Management Server

Figure 48:
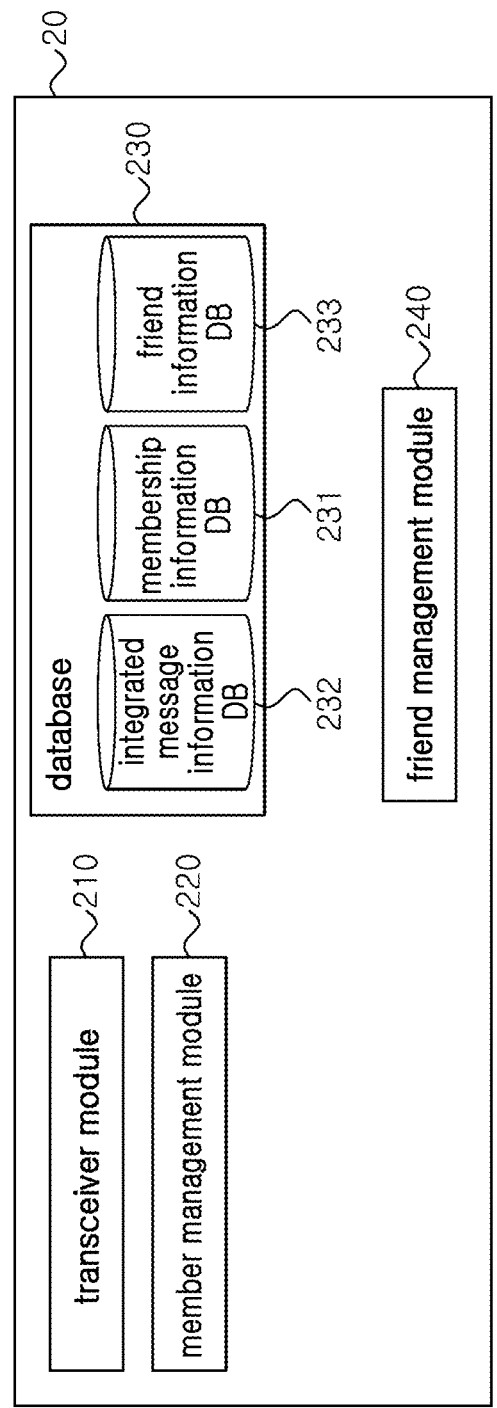
FIG. 48 is a block diagram illustrating an integrated message management service server configured according to a first system configuration according to an exemplary embodiment of the present invention.

FIG. 48 is a block diagram showing a configuration of the integrated message management service server 20 having a first system configuration according to an exemplary embodiment of the present invention.

The integrated message management service server 20 having the first system configuration according to an exemplary embodiment may include a data transceiver module 210, a member management module 220, a database 230, and a friend management module 240.

The data transceiver module 210 receives information generated in association with the integrated message information management application (e.g., integrated message information, schedule information, memo information, and the like) from the user's mobile terminal 10, and transmits the information managed by the integrated message information management service server 20 to the mobile terminal 10.

The membership management module 220 may include a member information managing unit, a membership authentication unit, and a friend registration managing unit. The member information managing unit stores various member related information, which is obtained when each user subscribes to a service or a database, and updates of changes to the membership-related information.

The membership authentication unit performs authentication in cooperation with an authentication server, when a user accesses the integrated message management service server 20. In addition, when the user who does not subscribe to the integrated message management service accesses the integrated message management service server 20, the membership authentication unit may provide the above-described integrated message information management application to the mobile terminal of the user (e.g., providing a link to download and install the integrated message information management application, or automatically providing the application).

The friend registration managing unit manages integrated message management service to a friend, who is registered as a friend in various methods for each member.

The friend management module 240 may include an address book friend managing part and an SNS friend managing part to perform functions described above. The address book friend managing part searches the address book stored in the client terminal 10, and automatically registers the searched friend in the address book as an the integrated message management service friend. The SNS friend managing part searches the SNS friend registered by himself/herself in the SNS service (e.g., 'Facebook' or 'Kakao Talk' service), and automatically registers the searched SNS friend as an the integrated message management service friend. As described above, the friend management module provides a function of registering an acquaintance as an integrated message management service friend of in various ways.

For example, when an integrated message management service application installed in the client terminal 10 is executed, the client application directly reads the address book data stored in the client terminal 10, and transmits the address book data to the service server 20. Then, the integrated message management service server 20 inquires the member information stored in the member information database to determine whether each contact in the address book data has been registered as a member of the integrated message management service, and then transmits the determination results to the client terminal 10 such that the client terminal 10 may perform a integrated message management service friend registration.

The database 230 for storing various data may include a membership information database 231, an integrated message information database 232, a friend information database 233, and other databases necessary for providing the integrated message management service.

The membership information database 231 stores various information of members who subscribe to the integrated message information management service. For example, the member information may include personal information, a profile photograph, the nickname, the latest access time, the SNS subscription information, the personal information exposure setting information, and the login setting information.

The integrated message information database 232 stores the integrated message information generated through the integrated message information management application of the mobile terminal 10.

The friend information database 233 stores various kinds of information on integrated message management service friends registered automatically or by a member. For example, the information may include ID and nickname of registered friends, registration path information, friend blocking information, and the like.

Figure 49:
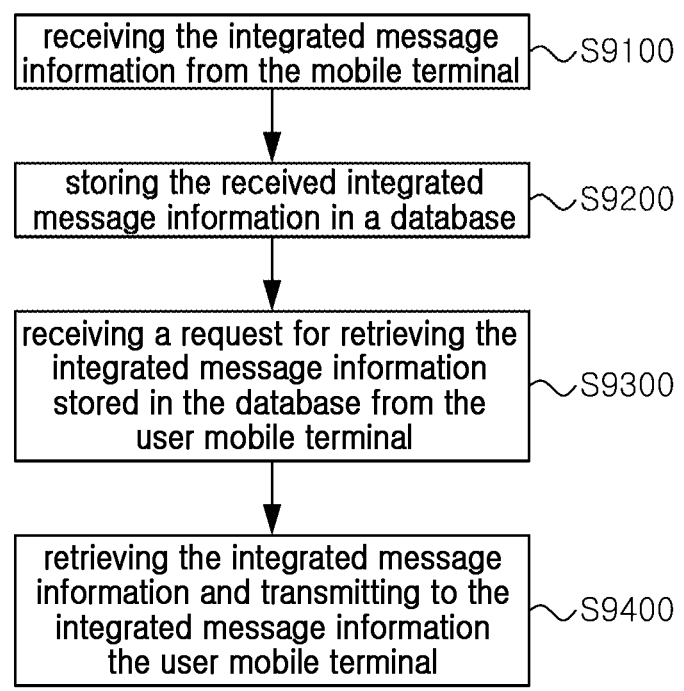
FIG. 49 is a flowchart illustrating an operation of the integrated message management service server according to the first system configuration according to an exemplary embodiment of the present invention.

FIG. 49 is a flowchart illustrating an operation of the integrated message management service server 20 having the first system configuration according to an exemplary embodiment.

First, in step S9100, the data transceiver module 210 receives the integrated message information from the mobile terminal 10. Receiving the integrated message information may be initiated in various ways. For example, the user's mobile terminal 10 may be configured to immediately transmit the integrated message information to the integrated message management service server 20 whenever the integrated message information is created or changed. Alternatively, the user mobile terminal 10 may be configured to transmit the integrated message information to the integrated message management service server 20 according to a predetermined period. In this case, if there is no integrated message information added or changed after the previous period, the transmission operation may be skipped. As another alternative, the user mobile terminal 10 may be configured to transmit updated integrated message information to the integrated message information management service server 20 only upon execution of the integrated message information management application. Unlike the above-mentioned transmission schemes, still alternatively, the integrated message management service server 20 may be configured to access the mobile terminal 10 to inquire the updated integrated message information, and directly retrieve the updated integrated message information.

In step S9200, the integrated message management service server 20 stores the received integrated message information in a database. The database stores each integrated message information received from the mobile terminal 10 in association with the user of the mobile terminal 10.

Next, in step S9300, when the data transceiver module 210 receives a request for retrieving the integrated message information stored in the database from the user mobile terminal 10, the integrated message management service server 20 may read out the integrated message information and transmits to the user mobile terminal 10 at step S9400.

Upon receiving the integrated message information, the mobile terminal 10 displays the received integrated message information on the first message management user interface 100 and the second message management user interface 500 after performing the above described processes.

Although the above steps of exchanging and processing have been described with respect to message information between the integrated message management service server 20 and the user mobile terminal 10, the substantially same method may be applied to the additional function information created or changed by the user mobile terminal 10.

According to an exemplary embodiment, the integrated message management service server 20 may have a second system configuration. In the first system configuration, most functions related to the integrated message management service, such as generation and management of integrated message information, processing of additional functions, and management of user interface are performed in the user mobile terminal 10, and the server 20 stores the processed result data and retrieves the stored data in response to a request from the mobile terminal 10.

On the other hand, the integrated message management service server 20 having the second system configuration according to an exemplary embodiment may be configured to provide a part of above-described various functions performed in the integrated message information management part 1100 of the user mobile terminal 10 in the first system configuration. That is, some of the components of the integrated message information management part 1100 of the user mobile terminal 10 of the first system configuration may be included in the integrated message management service server 20 having the second system configuration, and the corresponding functions may be performed by the integrated message information management service server 20 without involvement of the user mobile terminal 10.

Figure 50:
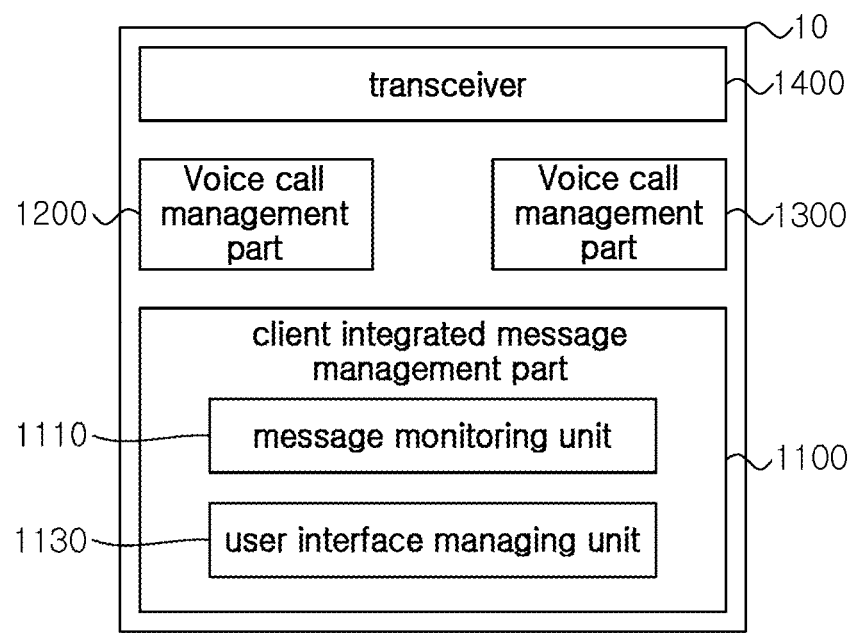
FIG. 50 is a block diagram illustrating a mobile terminal configured according to a second system configuration according to an exemplary embodiment of the present invention.
Figure 51:
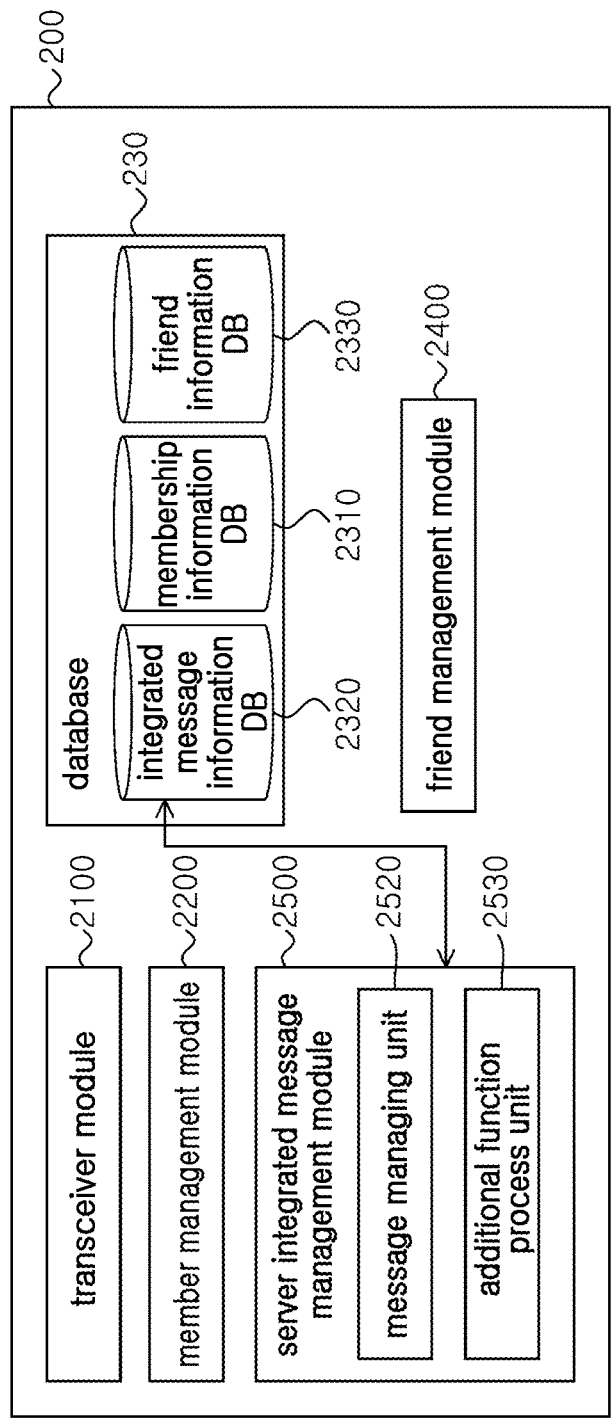
FIG. 51 is a block diagram illustrating an integrated message management service server configured according to the second system configuration according to an exemplary embodiment of the present invention.

FIGS. 50 and 51 are block diagrams showing a user mobile terminal and an integrated message information management service server having the second system configuration according to exemplary embodiments.

Referring to FIG. 50, a user mobile terminal 10 includes a voice call management part 1200, a text message management part 1300, and an integrated message management part 1100. The integrated message management part 1100 includes a message monitoring unit 1110, an user interface managing unit 1130, and a memory. Meanwhile, referring to FIG. 51, the integrated message information management service server 200 further includes a server integrated message management module 2500 including a message managing unit 2520 and an additional function processing unit 2530 in addition to the components of the integrated message information management service server 20 having the first system configuration shown in FIG. 48.

Among the components of the user mobile terminal 10, the same component as those of the first system configuration performs the same function as the first system configuration. Therefore, duplicated description of the same functions and operations will be omitted. However, since some operations is necessary to be performed in association with the integrated message management service server 20 having the second system configuration, those will be described again. Similarly, with respect to the integrated message management service server 20, only the operations performed in connection with the user mobile terminal 10 will be described, and the same components as those in the first system configuration example will be omitted to avoid redundancy.

The message monitoring unit 1110 of the user mobile terminal 10 inquires whether the voice call information and the text message information are updated. The access to the voice call management part 1200 and the text message management part 20, and the inquiry about the update of the voice call information and the text message information are performed in substantially the same manner as those described in the first system configuration. As a result of the inquiry, if there are newly received/transmitted voice call information and text message information, the message monitoring unit 1110 transmits the corresponding voice call information and the text message information to the integrated message management service server 20 via the transceiver 1400.

Upon receiving the voice call information and the text message information from the user mobile terminal 10, the message managing unit 2520 of the integrated message management service server 200 generates integrated message information, which is to be provided for the user through the integrated message management application, to the user mobile terminal 10. The detailed operation of the message information managing unit 2520 is substantially the same as that of the message information managing unit 2520 of the mobile terminal 10 in the first system configuration. In other words, the message managing unit 2520 of the integrated message management service server 200 is configured to perform substantially the same process performed by the message information managing unit 2520 of the mobile terminal 10 in the first system configuration. For example, the message managing unit 2520 of the integrated message management service server 200 performs a process for generating the integrated message information according to a message block format, which is the same as the step S1300 of FIG. 6.

The integrated message information generated by the message managing unit 2520 is stored in the integrated message information database 2320. The data transceiver module 2100 of the integrated message information service server 200 transmits the integrated message information to the user mobile terminal 10.

The interface managing unit 1130 of the user mobile terminal 10 generates the first message management user interface 100 and the second message management user interface 500 using the integrated message information received from the integrated message management service server 200. The details of the operation of the interface managing unit 1130, the first message management user interface 100, and the second message management user interface 500 are substantially the same as those in the first system configuration. Information on the text message and the voice call newly exchanged through the first and second message management user interfaces 100 and 500 are transmitted to the server 200, and the message managing unit 2520 of the server 200 processes information on the received text message and voice call, and stores it in the integrated message information database 2320.

The additional function processing unit 2530 of the integrated message management service server 200 performs substantially the same operation as the additional function processing part 1400 of the user mobile terminal 10 in the first system configuration, in response to the user input performed on the first and second message management user interfaces 100 and 500. That is, upon receiving a user request for activating a specific additional function, in which the request is input through the first and second message management user interfaces 100 and 500 provided to the user's mobile terminal 10, the additional function processing unit 2530 runs a server application performing the requested additional function. The server application provides the user mobile terminal with an additional function user interface capable of receiving user input related to the additional function.

When the user input related to the additional function is inputted through the additional function user interface, the user mobile terminal 10 transmits the inputted user input to the integrated message management service server 200. The additional function processing unit 2530 of the integrated message management service server 200 performs the process corresponding to the received user input, stores the result in the database, and transmits the result to the user mobile terminal 10. The interface managing unit 1130 of the user mobile terminal 10 performs substantially the same process as those described in the first system configuration to display the received additional function processing result on the first and second message management user interfaces 100 and 500.

For example, when the user touches the schedule management icon displayed on the first message management user interface 100, the user mobile terminal 10 transmits a signal requesting the schedule management function to the integrated message management service server 200. The integrated message management service server 200 executes the schedule management server application in response to the user request, and provides the user terminal 10 with a schedule management user input interface as shown in FIG. 27 and FIG. 29 for the mobile terminal 10. The schedule management user input interface may be stored in the user mobile terminal 10 to be provided through the first and second message management user interfaces 100 and 500 when the schedule management server application is executed on the integrated message management service server 200.

When the user inputs necessary information through the schedule management user interface, the user mobile terminal 10 transmits the inputted information to the integrated message management service server 200. The schedule management server application of the integrated message management service server 200 generates schedule information using the received user input information, and transmits the result to the user mobile terminal 10. The interface managing unit 1130 of the user mobile terminal 10 displays the received schedule information on the first and second message management user interfaces 100 and 500.

The above-described methods and the process flow diagrams are provided as illustrative examples and are not intended to require or imply that the steps of the various exemplary embodiments must be performed in the order presented. Instead, the order of steps in the foregoing exemplary embodiments may be performed in any order. Words such as "after", "then," "next," etc. are merely intended to aid the reader through description of the methods.

The various illustrative logical blocks, units, modules, circuits, and algorithm steps described in connection with the exemplary embodiments may be implemented as electronic hardware, computer software, or combinations of both. In order to describe the interchangeability of hardware and software, various illustrative features, blocks, units, modules, circuits, and steps have been described above in terms of their general functionality. Whether such functionality is implemented as hardware or software depends upon the particular application and design constraints for the overall system. A person of ordinary skill in the art may implement the functionality in various ways for each particular application without departing from the scope of the present invention.

The hardware such as the server 20 and the terminal 10 used to implement the various illustrative logics, logical blocks, units, modules, and circuits described in connection with the exemplary embodiments disclosed herein may be implemented or performed with a general purpose processor, a digital signal processor (DSP) an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory processor-readable storage medium or a non-transitory computer-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disc includes optically reproducible data such as a compact disc (CD), laser disc, optical disc, digital versatile disc (DVD), and Blu-ray disc. Disk includes magnetically reproducible data such as a floppy disk. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A non-transitory computer-readable storage medium comprising computer-executable instructions executed by a mobile device to perform a method of providing a user interface for integrated management of voice call information and text message information, the instructions control a processor of the mobile device to perform steps comprising:

accessing a voice call management unit and a text message management unit to retrieve the voice call information and the text message information;

editing the retrieved voice call information and the text message information according to a predetermined message block format to generate integrated message information;

generating message blocks comprising the integrated message information;

arranging the message blocks according to the receiving and transmitting time included in the voice call information and the text message information to display the message blocks on a first message management user interface;

receiving a user input selecting one of the message blocks displayed in the first message management user interface;

identifying a counterpart of a voice call or a text message corresponding to the selected message block;

retrieving the voice call information and the text message information of which the counterpart is a receiver or a sender;

generating dialogue information by editing the retrieved voice call information and the text message information according to a predetermined dialogue information format;

generating a second message management user interface to which the dialogue information is arranged;

switching the first message management user interface to the second message management user interface to display the second message management user interface on a display device of the mobile terminal; and visualizing the generated dialog information, wherein the second message management user interface is generated according to a receiving time and a transmitting time of each of the voice call and text message.

2. The non-transitory computer-readable storage medium of claim 1, wherein the instructions control the processor to further perform the step of generating a second graphical user interface for activating a memo creation function in the first and second message management user interfaces.

3. The non-transitory computer-readable storage medium of claim 2, wherein the instructions control the processor to further perform the steps of:

accessing a memo creating application in response to a user input selecting the second graphical user interface displayed in the first message management user interface;

providing a memo creating user interface on the first message managing user interface;

storing the created memo and creating a memo object comprising at least a part of the created memo; and displaying the memo object on the first message management user interface.

4. The non-transitory computer-readable storage medium of claim 2, wherein the instructions control the processor to further perform the steps of:

accessing a memo creating application in response to a user input selecting the second graphical user interface displayed in the second message management user interface;

providing a memo creating user interface provided by the memo creating application on the second message management user interface;

storing the created memo in association with a counterpart of the second message management user interface and generating a memo object comprising at least a part of the memo; and displaying the memo object on the second message management user interface.

5. The non-transitory computer-readable storage medium of claim 3, wherein the instructions control the processor to further perform the step of generating a shortcut input button for inputting at least one frequently used phrase.

6. The non-transitory computer-readable storage medium of claim 4, wherein the instructions control the processor to further perform the steps of:

determining whether a call connection failure indicator is included in the voice call information;

accessing the memo creating application to automatically create a memo having a predetermined reminding phrase when voice call information comprises the call connection failure indicator;

storing the created memo in association with counterpart of the voice call comprising the call connection failure indicator; and generating the memo object comprising the predetermined reminding phrase.

7. The non-transitory computer-readable storage medium of claim 1, wherein the instructions control the processor to further perform the step of generating a first event panel configured to display at least a part of the schedule information and provide the first event panel on the first message management user interface.

8. The non-transitory computer-readable storage medium of claim 7, wherein the instructions control the processor to further perform the steps of:

retrieving a plurality of schedule information generated by the schedule information management application;

generating schedule summary information for each of the plurality of schedule information;

generating a schedule card that visualizes the schedule summary information according to a predetermined rule; and displaying the generated schedule card on the first event panel.

9. The non-transitory computer-readable storage medium of claim 1, wherein the instructions control the processor to further perform the step of generating a second event panel configured to display at least a part of the schedule information and provide the second event panel on the second message management user interface.

10. The non-transitory computer-readable storage medium of claim 9, wherein the instructions control the processor to further perform the steps of:

retrieving schedule information associated with a counterpart of an activated second message management user interface;

generating schedule summary information for schedule information associated with the counterpart of the second message management user interface;

generating a schedule card that visualizes the generated schedule summary information according to a predetermined rule; and displaying the created schedule card on the second event panel.

11. The non-transitory computer-readable storage medium of claim 7, wherein the instructions control the processor to further perform the steps of:

inquiring whether a memo created by a memo application is updated;

retrieving the memo;

editing the retrieved memo according to a memo card information format to generate memo summary information;

visualizing the memo summary information according to a predetermined rule to generate a memo card; and displaying the generated memo card on the first event panel.

12. The non-transitory computer-readable storage medium of claim 9, wherein the instructions control the processor to further perform the steps of:

inquiring whether a memo created by a memo application in association with a counterpart of the second message management user interface is updated;

retrieving the memo;

editing the retrieved memo information according to a memo card information format to generate memo summary information;

visualizing the memo summary information according to a predetermined rule to generate a memo card; and displaying the generated memo card on the second event panel.

13. The non-transitory computer-readable storage medium of claim 7, wherein the instructions control the processor to further perform the steps of:

determining whether a received text message has a specific purpose based on the received message information or the integrated message information;

reading the received text message if the received text message has the specific purpose;

extracting information for constructing a message card from the text message;

editing the extracted information according to a message card information format to generate text message summary information;

visualizing the text message summary information according to a predetermined rule to generate a message card comprising the text message summary information; and displaying the message card on the first event panel.

14. The non-transitory computer-readable storage medium of claim 1, wherein the instructions control the processor to further perform the steps of:

determining whether a received text message information comprises an authentication code transmitted from an authentication authority;

generating an authentication code copy interface comprising an authentication code display window and a graphical user interface for executing a function of copying a character string displayed in the authentication code display window, when the received text message information comprises the authentication code;

extracting the authentication code from the received text message information;

inserting the extracted authentication code into the authentication code display window; and displaying the authentication code copy interface through the display device of the mobile terminal.

15. The non-transitory computer-readable storage medium of claim 1, wherein the instructions control the processor to further perform the steps of:

identifying an instruction included in a received text message;

performing a process corresponding to the identified instruction; and displaying a result of the process on the mobile terminal.

16. The non-transitory computer-readable storage medium of claim 15, wherein the process corresponding to the identified instruction comprises generating a reply user interface for creating a reply message; and the instructions control the processor to further perform the processes of:
generating the reply user interface;
receiving a reply user input via the reply user interface;
automatically generating a reply text message corresponding to the reply input of the user; and
transmitting the created reply text message to a mobile terminal that sent the received text message through the text message management part.

17. The non-transitory computer-readable storage medium of claim 16, wherein the step of automatically generating a reply text message comprises coding an instruction to be executed on the mobile terminal of a recipient of the reply message.

\* \* \* \* \*